(12) United States Patent
Schaffert

(10) Patent No.: US 6,453,832 B1
(45) Date of Patent: Sep. 24, 2002

(54) LIQUID DISTRIBUTION APPARATUS FOR DISTRIBUTING LIQUID INTO A SEED FURROW

(76) Inventor: Paul E. Schaffert, R.R. 1, Box 157, Indianola, NE (US) 69034

(*) Notice: Subject to any disclaimer, the term of this patent is extended or adjusted under 35 U.S.C. 154(b) by 0 days.

(21) Appl. No.: 09/832,740

(22) Filed: Apr. 9, 2001

Related U.S. Application Data

(63) Continuation-in-part of application No. 09/563,106, filed on May 2, 2000, now Pat. No. 6,283,050, which is a continuation of application No. 08/881,177, filed on Jun. 23, 1997, now Pat. No. 6,082,275.
(60) Provisional application No. 60/195,942, filed on Apr. 10, 2000.

(51) Int. Cl.[7] ................................................ A01C 5/00
(52) U.S. Cl. ........................................ 111/150; 111/164
(58) Field of Search ........................... 111/150, 164, 111/167, 170, 189, 118, 197, 200, 154, 155, 104, 374, 375; 172/570, 156

(56) References Cited

U.S. PATENT DOCUMENTS

| | | |
|---|---|---|
| 13,683 A | 10/1855 | McCormick |
| 35,510 A | 6/1862 | DeHaven |
| 122,299 A | 12/1871 | Wight et al. |
| 176,708 A | 4/1876 | Templin |
| 183,947 A | 10/1876 | Lewis |
| 203,207 A | 4/1878 | Springer |
| 211,601 A | 1/1879 | Springer |
| 221,004 A | 10/1879 | Strayer |
| 252,265 A | 1/1882 | Scofield |
| 288,661 A | 11/1883 | Purdy et al. |
| 308,327 A | 11/1884 | Runstetler |
| 410,438 A | 9/1889 | Patric et al. |
| 555,897 A | 3/1896 | Crane |
| 789,798 A | 5/1905 | Deterding |
| 889,947 A | 6/1908 | Miller |
| 909,137 A | 1/1909 | Bellerive |
| 1,104,602 A | 7/1914 | Akers |
| 1,473,297 A | 11/1923 | Knight |
| 1,691,466 A | 11/1928 | Burtner |
| 1,934,490 A | 11/1933 | Elliott |
| 2,096,230 A | 10/1937 | Elliott |
| 2,533,374 A | 12/1950 | Hyland |
| 2,554,205 A | 6/1951 | Oehler |

(List continued on next page.)

FOREIGN PATENT DOCUMENTS

| | | |
|---|---|---|
| DE | 3114771 | 10/1982 |
| DE | 3321490 | 12/1984 |
| DE | 3441610 | 5/1986 |

OTHER PUBLICATIONS

Keeton Seed Firmer; J & K Enterprises (1994 Brochure).
Tube Alignment Brackets; M & J Cotton Farms, Inc. Brochure.—No date.
Finck, Charlene; Put Seed In Its Place; Farm Journal, pp. 16–17 (Jan. 1995).
Seed to Soil Inforcer; Seed Flap (Spring 1995).
*Precision Planting Web Page, http://precisionplanting.com/html/keeton.html (web page printed on Dec. 30, 2000).
*Keeton Seed Firmer, Precision Planting (copy of Brochure), Date of publication of brochure is unknown.

*Primary Examiner*—Robert E. Pezzuto
(74) *Attorney, Agent, or Firm*—Dorsey & Whitney LLP

(57) ABSTRACT

A liquid distribution apparatus for use with a planter, drill or other farming implement having a seed tube that deposits seeds in a furrow. The liquid distribution apparatus includes a supply channel in fluid connection with a hose supplying a liquid to the furrow. The liquid distribution apparatus also includes a distribution channel that is oriented to distribute the liquid onto one or both sidewalls of the furrow. The apparatus may be used alone or along with an extension for reducing seed bounce.

49 Claims, 55 Drawing Sheets

U.S. PATENT DOCUMENTS

| | | |
|---|---|---|
| 2,849,969 A | 9/1958 | Taylor |
| 2,872,883 A | 2/1959 | Padrick |
| 3,182,345 A | 5/1965 | Smith |
| 4,108,089 A | 8/1978 | van der Lely |
| 4,253,412 A | 3/1981 | Hogenson |
| 4,276,836 A | 7/1981 | Pust |
| 4,373,455 A | 2/1983 | Friggstad |
| 4,420,516 A | 12/1983 | Emert et al. |
| 4,445,445 A | 5/1984 | Sterrett |
| 4,446,801 A | 5/1984 | Machnee et al. |
| 4,580,507 A | 4/1986 | Dreyer et al. |
| D285,205 S | 8/1986 | Johnson |
| 4,671,193 A | 6/1987 | States |
| 4,779,674 A | 10/1988 | McNulty |
| 4,911,090 A | 3/1990 | Schimke |
| 5,092,255 A | 3/1992 | Long et al. |
| 5,375,542 A | 12/1994 | Schaffert |
| 5,425,318 A | 6/1995 | Keeton |
| 5,640,915 A | 6/1997 | Schaffert |
| 5,673,638 A | 10/1997 | Keeton |
| 5,852,982 A | 12/1998 | Peter |
| 5,918,557 A | 7/1999 | Schaffert |
| 5,996,514 A | 12/1999 | Arriola et al. |
| 6,082,274 A | 7/2000 | Peter |
| 6,082,275 A | 7/2000 | Schaffert |

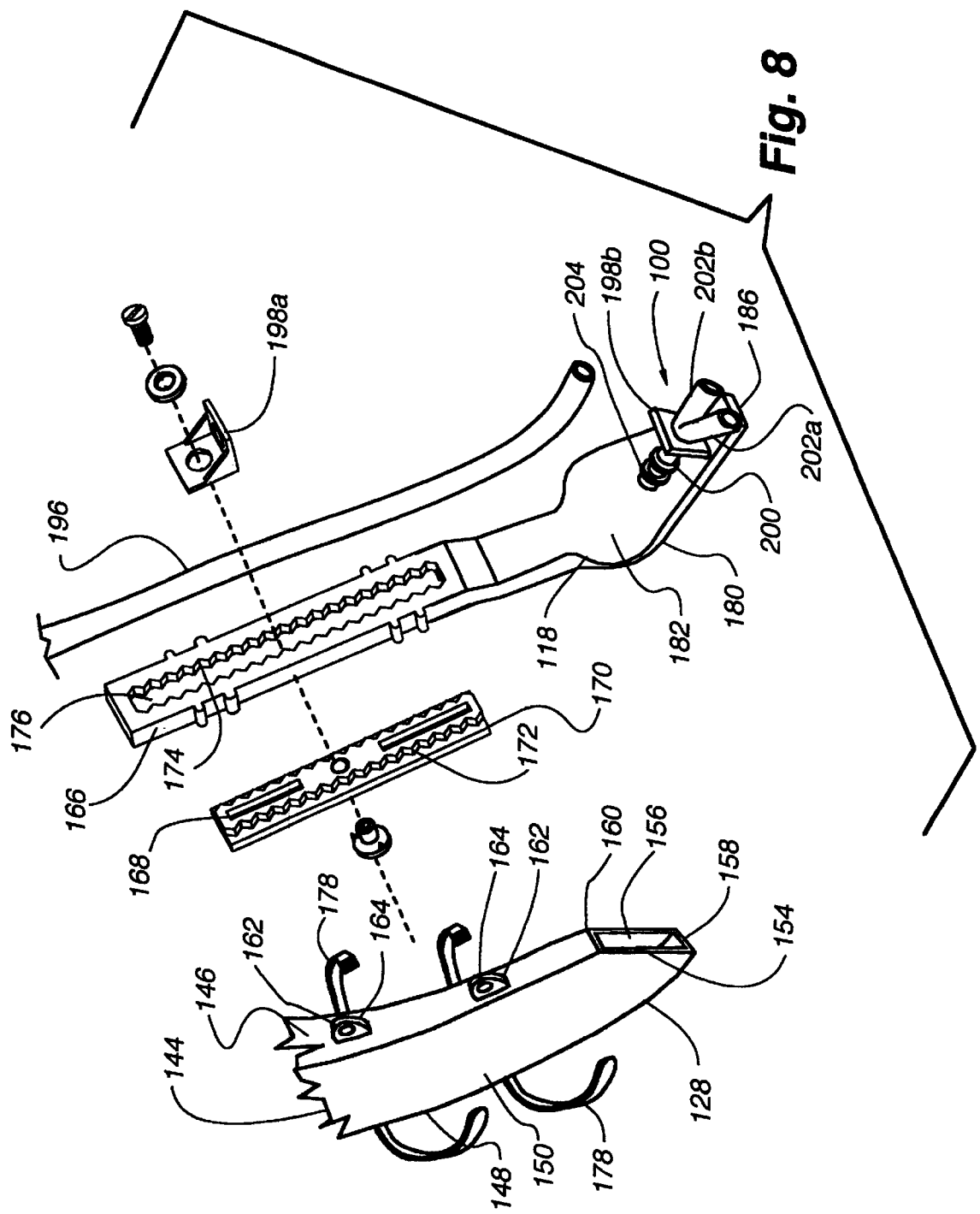

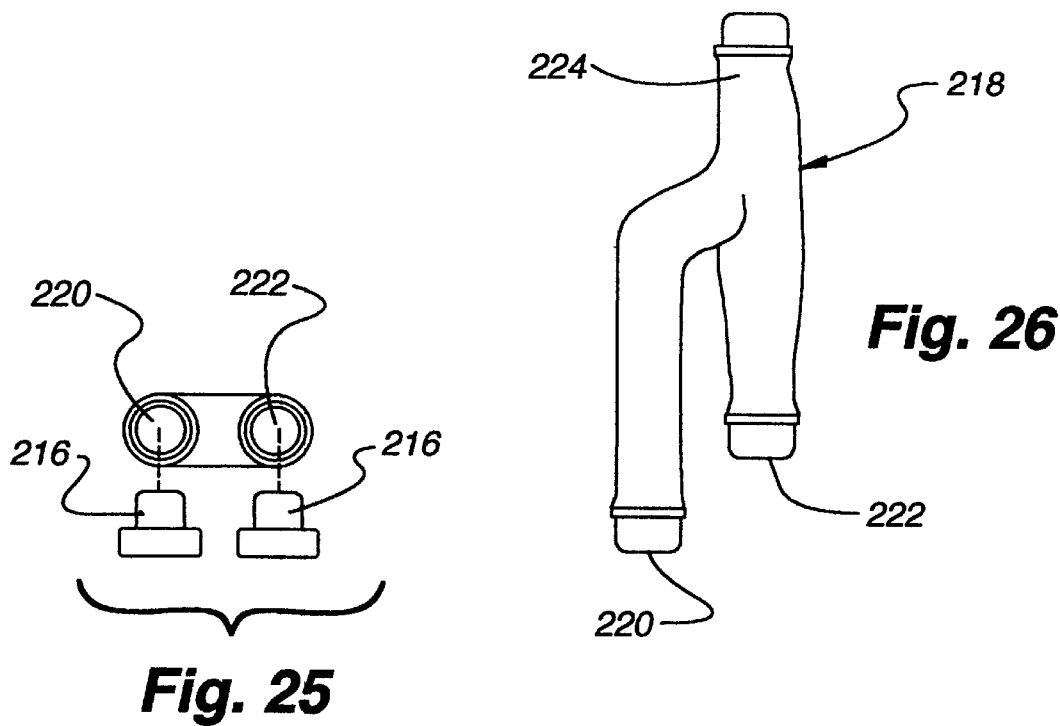
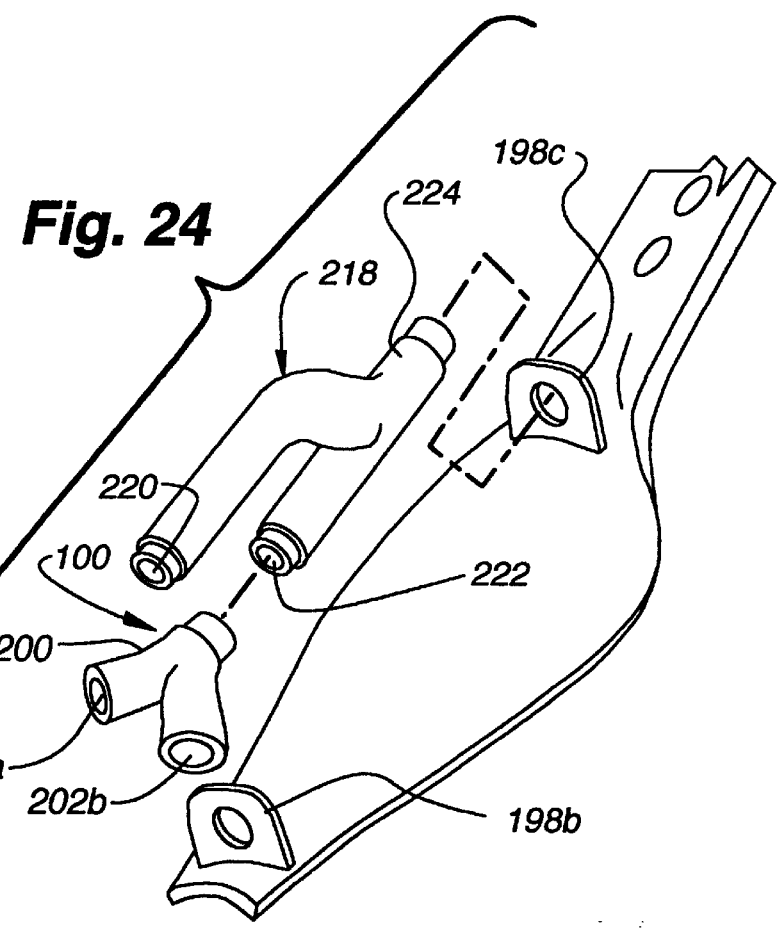

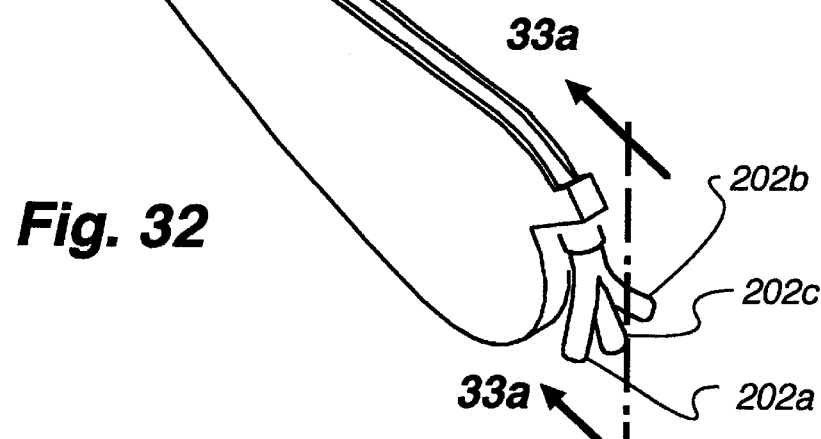
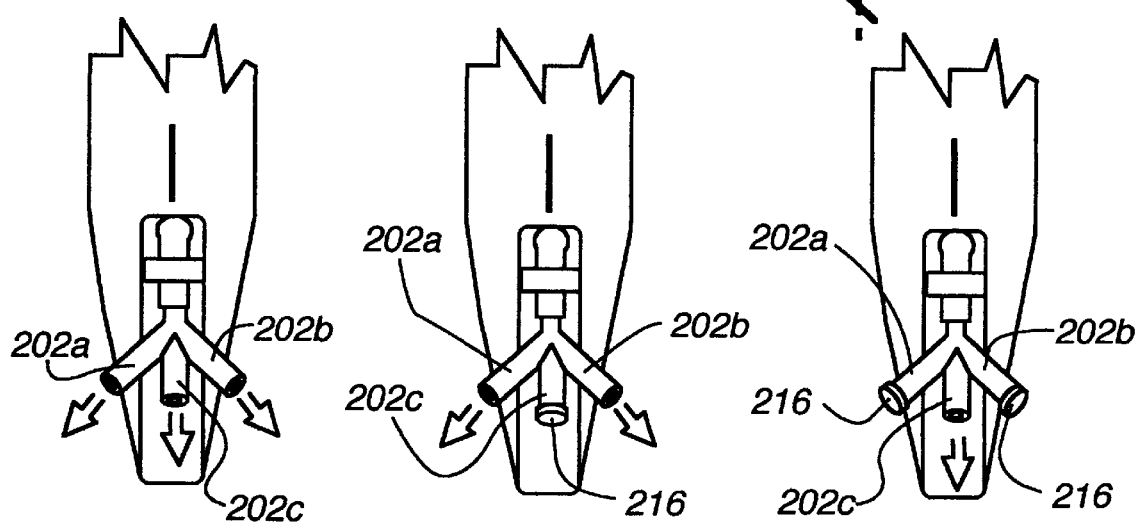
Fig. 34
Fig. 32
Fig. 33a  Fig. 33b  Fig. 33c

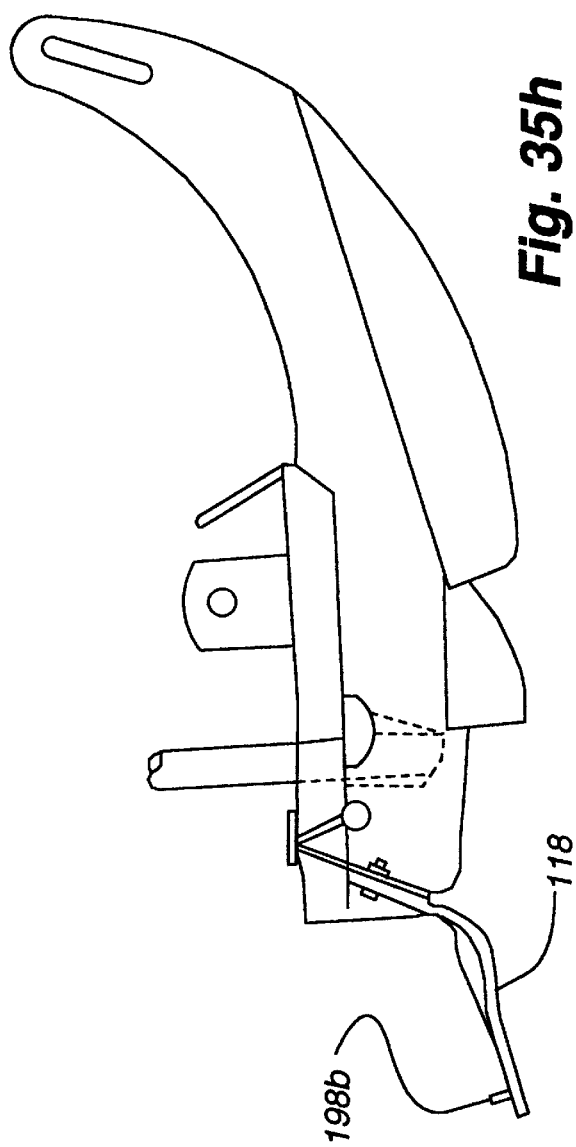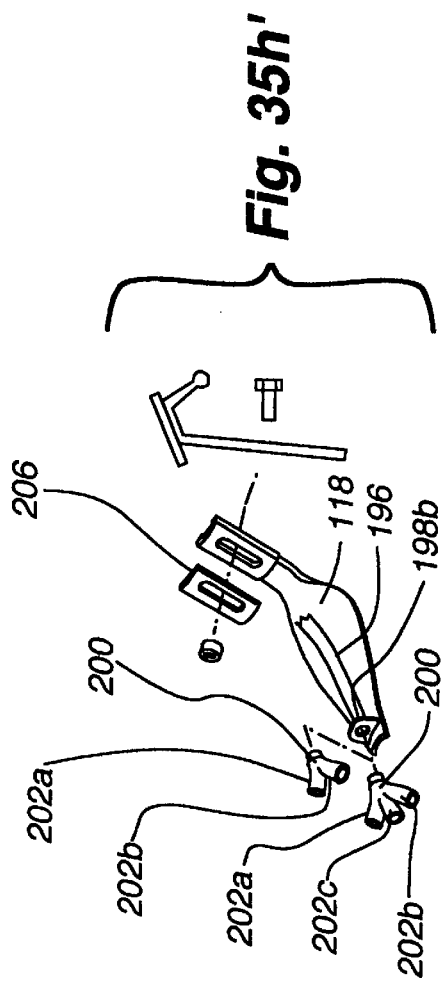

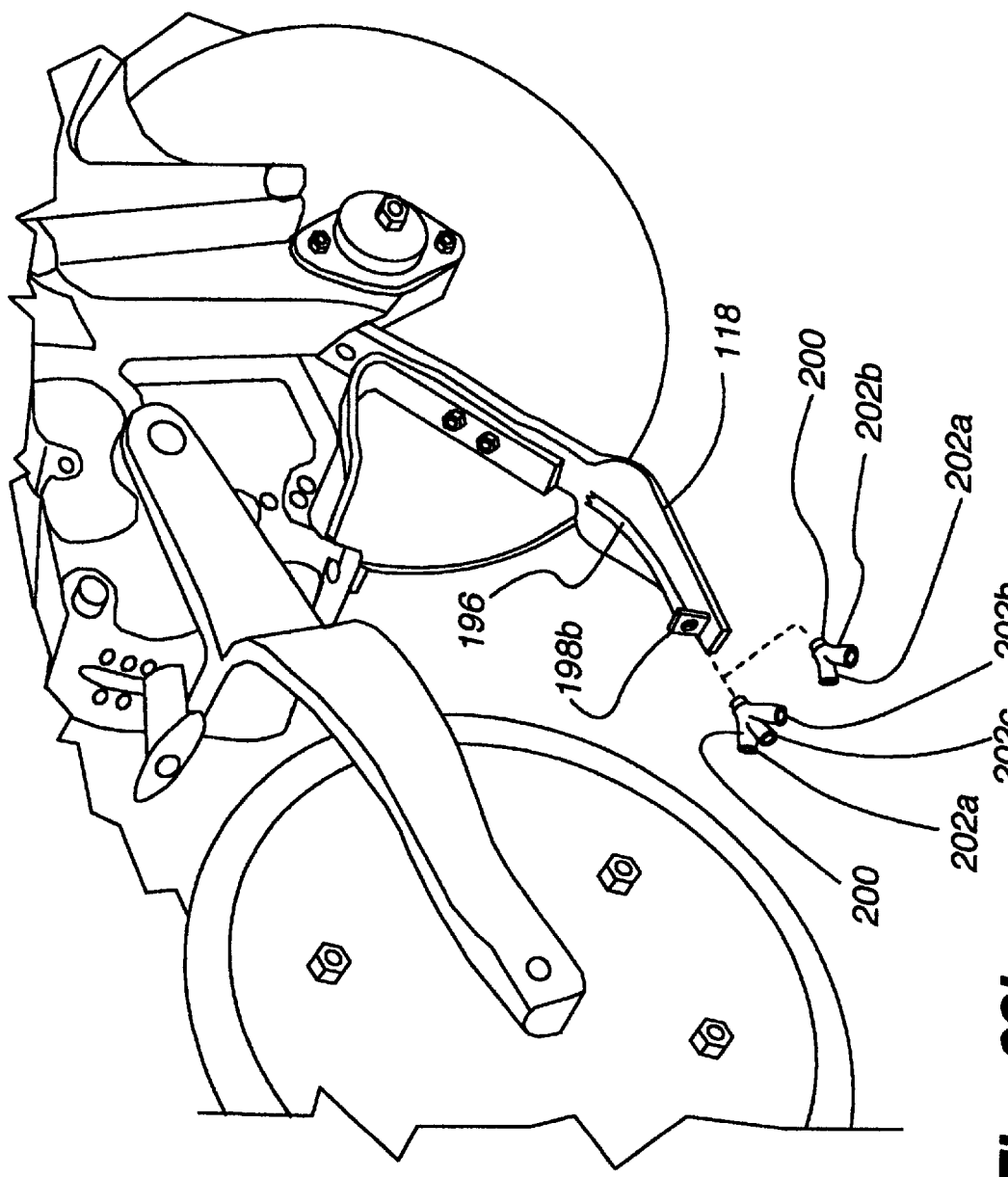

LIQUID DISTRIBUTION APPARATUS FOR DISTRIBUTING LIQUID INTO A SEED FURROW

CROSS REFERENCES TO RELATED APPLICATIONS

This application is a continuation-in-part of prior application Ser. No. 09/563,106, filing date May 2, 2000 now U.S. Pat. No. 6,233,050, which is a continuation of prior application Ser. No. 08/881,177, now U.S. Pat. No. 6,082,275, filing date Jun. 23, 1997. The contents of these applications are hereby incorporated by reference in their entirety. This application also claims priority from provisional application No. 60/195,942, filing date Apr. 10, 2000 which is hereby incorporated by reference in its entirety.

FIELD OF THE INVENTION

The invention relates to agricultural seed planters and drills, and more particularly to seed planters and drills that include apparatus adapted to properly place seeds in a seed furrow and further include liquid distribution apparatus for distributing liquids within the seed furrow.

BACKGROUND OF THE INVENTION

Agricultural seed planting is typically accomplished by multi-row planters and drills. Each planter and drill comprise a plurality of row units adapted for opening a seed furrow, depositing seeds within the furrow, and closing the seed furrow around the seeds.

The placement of the seeds in the furrow greatly effects the growth characteristics of the plants. The seeds are deposited in the seed furrow through a seed tube attached to the row unit. The seed tube is designed to deposit the seeds in the bottom of the furrow. However, as the seeds descend through the seed tube, they are prone to bouncing, which ultimately affects where the seeds lie in the furrow. In addition, the seeds may bounce off the soil when they land in the furrow, which also affects where the seeds lie in the furrow. To properly place the seeds in the bottom of the furrow an extension may be fixed to the seed tube to properly direct the seeds into the vertex of the furrow.

In addition to properly placing the seeds in the vertex of the furrow, it is oftentimes also desirable to provide various liquids in the furrow along with the seeds to facilitate plant growth and the ultimate crop yield. The liquids included in the furrow may be liquid fertilizers, liquid insecticides, liquid starters, inoculants, and water. However, problems can arise when providing liquid directly into the furrow along with the seeds. Drenching the seed in fertilizer may result in burning the seed which has a negative impact on plant growth and the ultimate crop yield. Accordingly, it is desirable to place liquids in the furrow along with the seeds without drenching seeds. Numerous benefits are derived from in-furrow liquid distribution, such as maximizing the effectiveness of the liquid introduced into the furrow, reducing the volume of a particular liquid required to achieve a desired effect, and minimizing the time required for a particular liquid to effect the seed.

Liquid fertilizer placement disks may be added to the planter row units for placing liquid in a separate trench next to the seed furrow. The liquid fertilizer placement disks create a trench about 2 inches to the side of the seed furrow and about two inches deep and deposit liquid into the trench, which is commonly referred to as 2×2 fertilizer application. The liquid fertilizer disks, however, are very expensive, require large amounts of fertilizer because of the remote location from the seeds, and do not provide for in-furrow distribution of liquid.

Referring to FIGS. A–E, a KEETON SIDE SHOOTER™ in-furrow liquid dispensing device is illustrated, the side shooter connected with a KEETON SEED FIRMER™. The seed firmer is adapted to press seeds into the seed furrow as shown in FIG. A. The side shooter includes a diverter, which is shown in FIG. D and shown in section in FIG. F, plugged into a hose running along the length of the seed firmer. The diverter defines a first liquid diversion channel and a second liquid diversion channel for diverting liquid adjacent the seeds embedded in the furrow by the seed firmer as shown in FIG. B. Referring to FIGS. F–G, a liquid dispensing device as illustrated in U.S. Pat. No. 6,082,274 is shown connected with a Keeton Seed Firmer.

There are several potential disadvantages and problems with the liquid dispensing devices illustrated in FIGS. A–G. One potential problem is that these liquid dispensing devices have small diameter openings for the liquids to pass through. For example, the liquid diversion channels of the side shooter diverter are about $\frac{1}{16}$" diameter outlets. Heavier fertilizers in some instances do not flow evenly from these small diameter outlets. Additionally, when used with heavy materials such as fertilizer that require a larger opening to pass through, these devices may plug-up and stop the flow of material. When plugging occurs, inadequate amounts of product will be placed in the furrow by the plugged lines.

Another problem is that to avoid plugging, the liquid must be diluted with water. For heavy liquid fertilizers, it has been found that the side shooter in some instances functions most efficiently if the liquid fertilizer is diluted so that the fertilizer flows evenly and without plugging. Diluting the fertilizer, however, causes problems for the application because to obtain the appropriate amount of liquid in the furrow a greater volume of liquid (fertilizer diluted with water) has to be delivered into the furrow through the smaller holes in the delivery system. The greater volume of liquid in the furrow additionally produces wetness in the furrow that can cause the press wheels to build up with mud, which, in turn, leads to closing problems with the press wheels.

Another important consideration is location-just where in the furrow the liquid is placed. The devices illustrated in FIGS. A–G in some instances distribute liquid on the seeds, or oftentimes within ¼" on each side of the seeds in the furrow. Accordingly, the seeds are many times drenched in liquid, or the liquid is within from about ⅛" to about ¼" of the seed. Besides the unwanted effects caused by drenching the seeds in some liquids, putting any fertilizer in such close proximity to the seed, especially in drier soil, draws the moisture out of the soil around it, pulling it in close to the seed. The concentration of liquid adjacent the seed may cause it to germinate more quickly than it would have under normal conditions, and early growth may be accelerated. If dry soil conditions persist, then the seed may run out of moisture for the tap root and nodule roots to pick up, which may stunt the growth of the emerging crop and in some instances result in the death of the crop.

It is to overcome the problems that arise when seeds are directly immersed in various liquids and the cost and effectiveness of other devices that may be used to introduce liquids into a furrow that the present invention and its various embodiments were developed.

There are some instances, however, when it is preferable to distribute liquids such as fertilizer directly on the seeds in the furrow, as is achieved with a single hose device used to distribute liquid directly unto the seeds in the furrow. Accordingly, it was recognized that it would be desirable to provide a single device that may distribute liquid in the furrow without drenching the seeds, and have the same device be convertible to also distribute fertilizer directly on the seeds, as needs dictate. This convertible embodiment of the present invention would have the benefit of allowing farmers to quickly reconfigure the device from, for example, a seed drenching configuration to an in-furrow liquid distribution that does not drench the seeds.

SUMMARY OF THE INVENTION

The liquid distribution apparatus of the present invention is for use with a planter, drill or other farm implement. The liquid distribution apparatus may be connected directly with the farm implement or connected with an extension for reducing seed bounce that, in one example, extends rearwardly from the seed tube to properly place seeds in a seed furrow having a centrally located bottom portion and upwardly and outwardly extending opposing sidewalls.

The liquid distribution apparatus includes a supply channel adapted to fluidly connect to the liquid supply hose. Preferably, the supply channel is a tubular structure including a ribbed portion that fluidly engages the liquid supply hose.

The liquid distribution apparatus also includes a distribution channel in fluid connection with the supply channel. The distribution channel includes at least one outlet angularly oriented with respect to the supply channel. In one example, the distribution channel includes two tubular outlets in a Y-shaped configuration with respect to the supply channel wherein the two tubular outlets are oriented to distribute liquid on opposing sidewalls of the furrow. Preferably, the outlets are about ⅛" in diameter and distribute liquid more than about ½" above the seeds in the bottom portion of the furrow. In another example, the distribution channel includes three outlets, preferably tubular, in a ψ-shaped configuration, the first outlet and the second outlet are oriented to distribute the liquid on the sidewalls of the furrow, and the third outlet is oriented to distribute liquid in the centrally located bottom portion of the furrow.

One embodiment of the present invention, has dispensing outlets of about ⅛" diameter, which allows heavier fertilizers to flow evenly from the outlets and not be restricted. Maximum flow through a ⅛" opening is about 16 to 18 gallons per acre. Currently, many liquid fertilizer suppliers suggest distributing about 7 to 12 gallons per acre of liquid fertilizer in the furrow.

A liquid distribution of only about 4 to 4.5 gallons per acre is likely with small diameter outlets such as ¹⁄₁₆". Many crops need that much to produce the maximum yield in any one year. Being limited on the quantity that can be applied with the devices illustrated in FIGS. A–G, farmers have to add expensive liquid discs to the planter/drill or broadcast the extra quantity.

In contrast to the various devices discussed in the Background, some embodiments of the present invention distribute liquids such as fertilizer and insecticides about ½ and higher above the vertex of the furrow where it is integrated in the soil without directly contacting or drenching the seeds in the vertex of the furrow. Preferably, some embodiments of the present invention distribute liquid from about ½ to about ¾" above the seeds in the vertex of the furrow. Accordingly, in the case of liquid fertilizers, the concentration of fertilizer around the seed is diluted and will not trigger untimely germination in drier soils. The same is true when liquids are put in-furrow in lighter textured soils (e.g., sandy loam). Throughout the U.S. any field can differ in soil type from one end to another. In sandy loam soils it is considered desirable by some farmers to distribute the fertilizer further up the sidewalls of the furrow, or seed V. In heavier textured clay-based soils, the fertilizer may be placed slightly closer to the seed, but, in the case of some liquids such as insecticide, it is still preferable to not drench the seed. If the condition of having different soil types within the same field exists, embodiments of the present invention may be used because liquid is distributed further up the sidewall, and the concentration is soaked up into the soil rather than bathing the seed.

With regard to bean seeds, fertilizing is more precarious than corn since the outer coating of the bean seed is very thin. This makes it very susceptible to injury, and the salt content of starter fertilizer can be devastating to bean seeds. Embodiments of the present invention having an extension with a liquid distribution apparatus, however, may be used to place liquid fertilizer in the furrow with such seeds due to the combined advantages of being able to focus the seeds in the vertex of the furrow, and distribute liquid far enough up on the sidewalls to not drench the seed.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 8 is an exploded view showing a seed tube, one embodiment of the extension for reducing seed bounce, a liquid supply hose and the liquid distribution apparatus of the present invention, with a mounting apparatus for mounting the extension to the seed tube;

FIG. 24 is perspective view of an alternative embodiment of a diverter for use, in one example, in conjunction with the two outlet embodiment of the liquid distribution apparatus;

FIG. 25 is a front view of the diverter illustrated in FIG. 24;

FIG. 26 is a side view of the diverter illustrated in FIG. 24;

FIG. 32 illustrates a seed firmer having a three outlet embodiment of the present invention connected therewith FIG. 33a is a section view taken along line 33—33 of FIG. 32 illustrating the three outlet embodiment of the present invention with all of the outlets unplugged;

FIG. 33b is a section view taken along line 33—33 of FIG. 32 illustrating the three outlet embodiment of the present invention with the center outlet plugged, the three outlet embodiment configured to distribute liquid on the sidewalls of the furrow;

FIG. 33c is a section view taken along line 33—33 of FIG. 32 illustrating the three outlet embodiment of the present invention with the side outlets plugged, the three outlet embodiment configured to distribute liquid in the vertex of the furrow;

FIG. 34 is a perspective view of one embodiment of a plug for use in plugging the outlets to reconfigure the three outlet embodiment;

FIGS. 35h & 35h' illustrates an exploded view of a Case IH™ 400 or 500 planter having an Acra-Plant runner with one embodiment of an extension for reducing seed bounce attached thereto, the extension having an embodiment of the liquid distribution apparatus of the present invention coupled therewith;

FIG. 38i illustrates a John Deere™ model 455, 515 or 8300 double disc drill having single or double press wheels with an embodiment of the liquid distribution apparatus of the present invention attached therewith;

DETAILED DESCRIPTION OF THE PREFERRED EMBODIMENT

While various embodiments of the liquid distribution apparatus can be used with a variety of planters, drills and liquid supply devices, it will be initially described as used with a double disk furrow opener style agricultural planter 102 pulled behind a tractor 104. Furthermore, the liquid distribution apparatus will be described in a configuration wherein a large liquid container 106 is pulled behind the planter 102 providing a liquid supply to the liquid distribution apparatus through a liquid supply hose 196. The liquid container 106, however, is oftentimes integrated with the planter 102 or the tractor 104. Nonetheless, the liquid distribution apparatus functions equally well regardless of the location of the liquid container 106.

Figure 1:
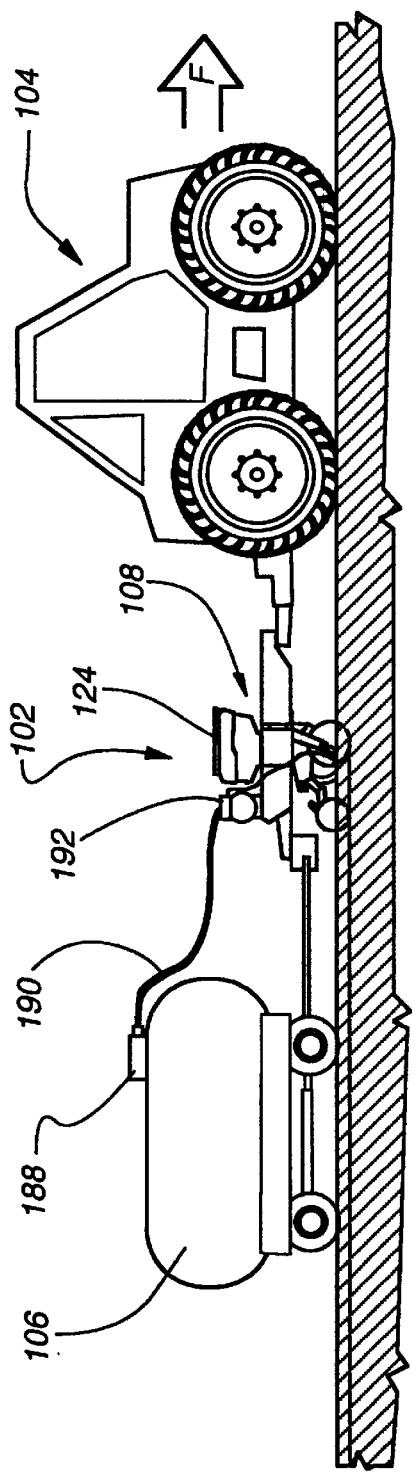
FIG. 1 is a side view of a tractor pulling an agricultural planter and associated liquid container.
Figure 2:
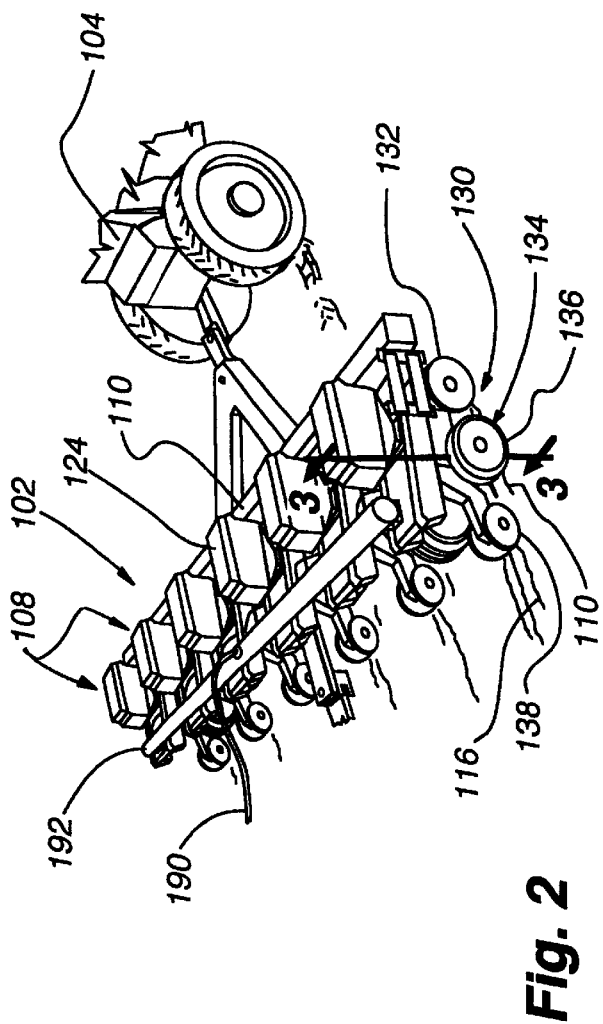
FIG. 2 is a perspective view of a planter encompassing one embodiment of the liquid distribution apparatus of the present invention, and illustrates a tractor pulling an agricultural planter including a plurality of row units.
Figure 1A:
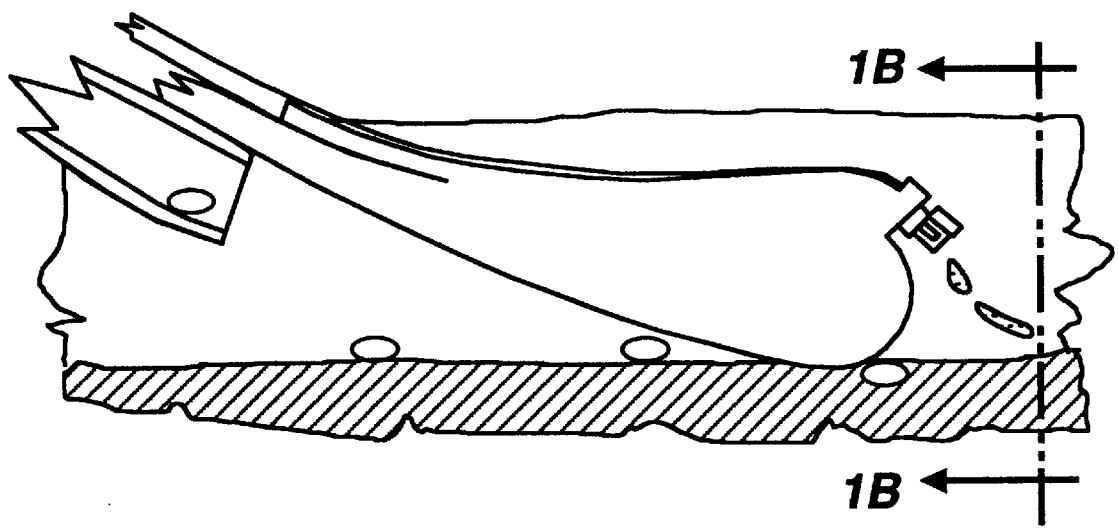
FIG. 1A is side view of a Keeton Seed Firmer™ having a Keeton Side Shooter™ connected therewith.
Figure 1B:
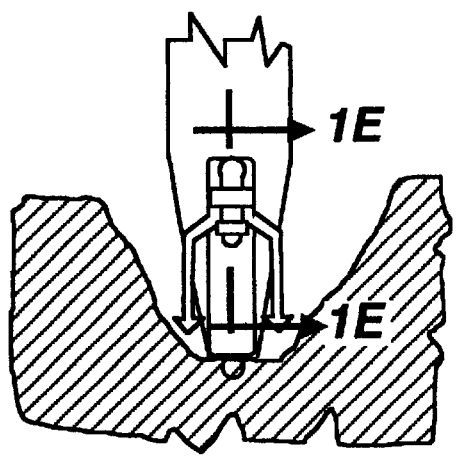
FIG. 1B is a section view taken along line B—B of FIG. A.
Figure 1C:
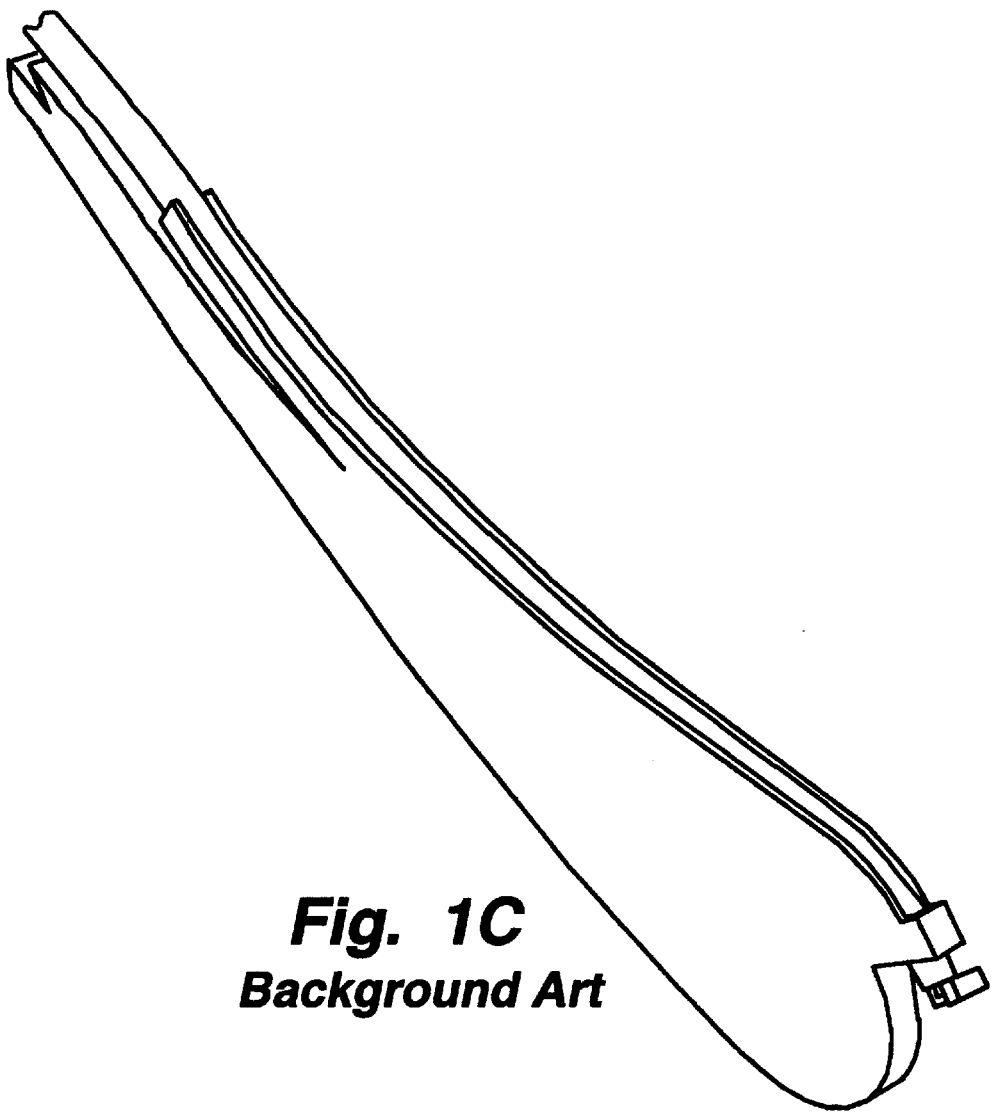
FIG. 1C is a perspective view of the Keeton Seed Firmer™ having the Keeton Side Shooter™ connected therewith.
Figure 1D:
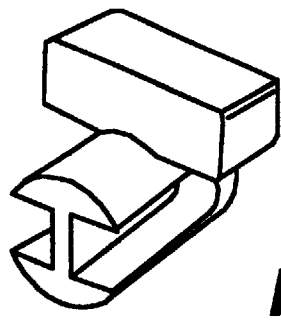
FIG. 1D is a perspective view of a diverter for use with a Keeton Side Shooter™.
Figure 1E:
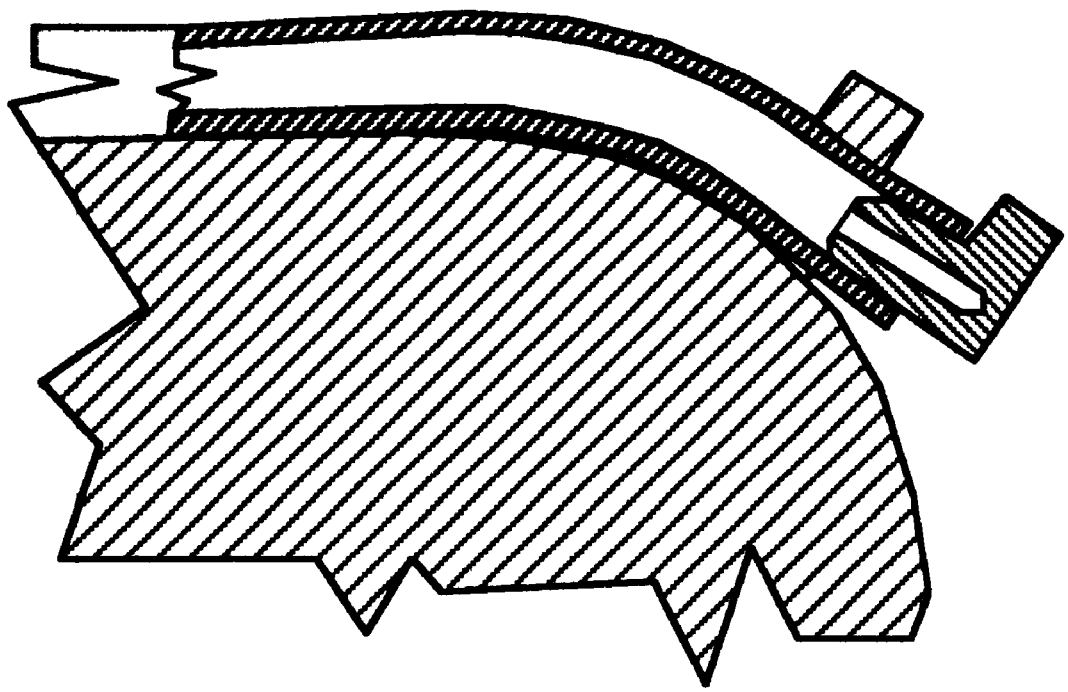
FIG. 1E is a section view taken along line E—E of FIG. B.
Figure 1F:
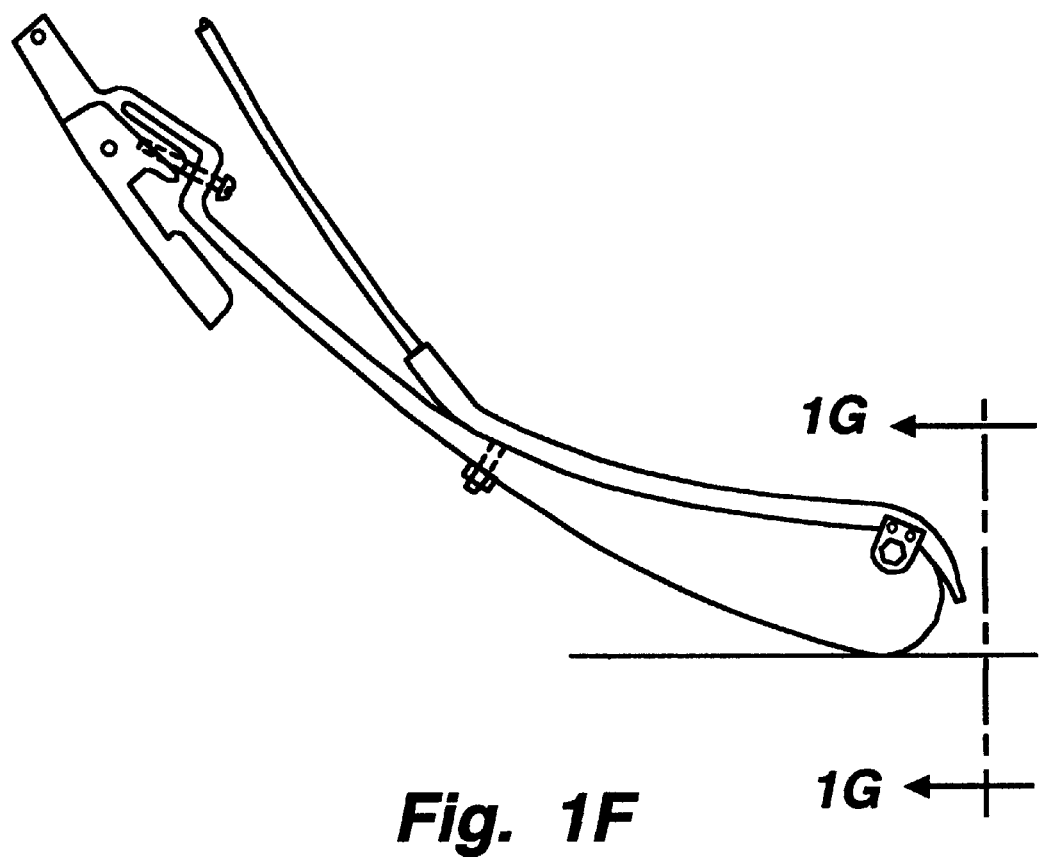
FIG. 1F is a side view of a liquid dispenser for a seed planter as shown in U.S. Pat. No. 6,082,274, the liquid dispenser connected with a Keeton Seed Firmer™.
Figure 1G:
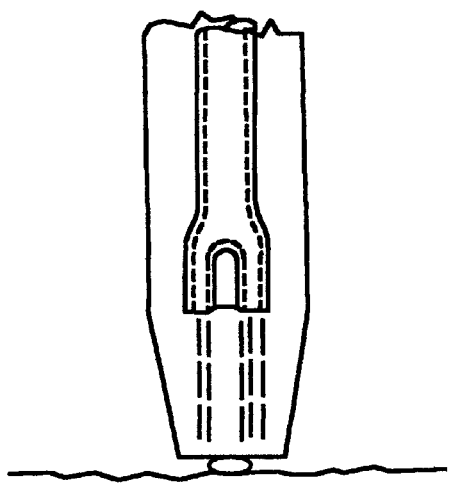
FIG. 1G is a front view of the liquid dispenser illustrated in FIG. F.
Figure 3:
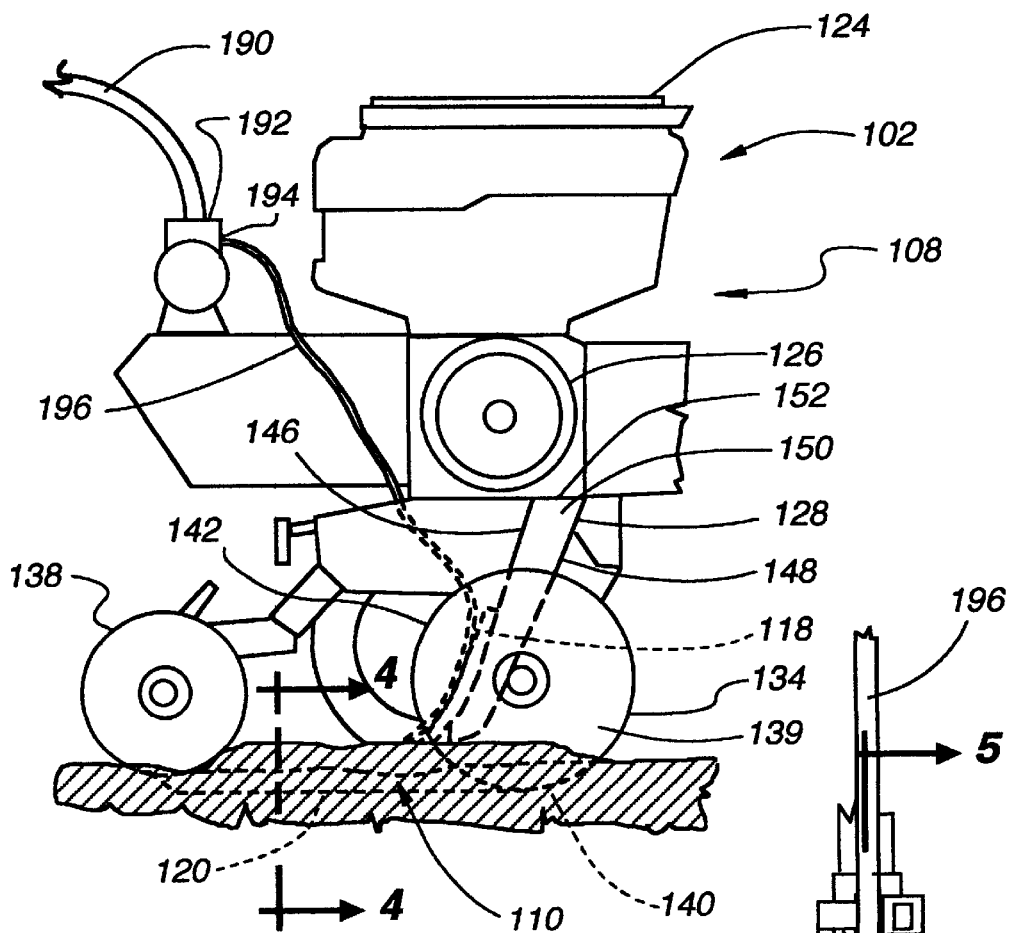
FIG. 3 is section taken along line 3—3 of FIG. 2, and illustrates a row unit having a hopper, a metering unit, a gage wheel, a closing wheel, a double disk blade furrow opener, and a seed tube depending from the metering unit with one embodiment of an extension for reducing seed bounce, with one embodiment of the liquid distribution apparatus depending from the attachment.

The agricultural planter 102, shown in FIGS. 1–3, typically includes a number of planter row units 108 mounted on a main frame member 110. The planter 102 is pulled in a forward direction F by the tractor 104. Each row unit 108 forms a seed furrow 110, deposits seeds 112 evenly along the seed furrow 110, supplies a liquid 114 in the furrow 110, and then closes the seed furrow 110 to form a seed bed 116. The liquid distribution apparatus 100 of the present invention is embodied in a two-outlet Y-shaped configuration 100, shown in FIGS. 4–10, that distributes the liquid 114 into the furrow 110 along with the seeds 112 without drenching the seeds 112. In this embodiment, the liquid distribution apparatus 100 is used along with an extension 118, shown in FIGS. 4–10, which reduces seed bounce as the seeds 112 exit each row unit 108, and helps position the seeds 112 optimally in the vertex or bottom portion 120 of the furrow 110 prior to closure of the furrow 110 by the row unit 108. To avoid drenching the seeds 112 in the liquid 114, the liquid distribution apparatus 100 deposits the liquid 114 on the sidewalls 122 of the furrow 110. Preferably, the liquid is deposited at least ½" above the bottom portion 120 of the furrow 110. More preferably, the liquid is deposited between about ½" and ¾" above the bottom portion 120 of the furrow 110.

Each row unit 108, as seen in FIGS. 1–3, comprises a seed hopper 124 for holding and dispensing seeds 112, a seed metering unit 126 positioned below the seed hopper 124 that receives the seeds 112 from the seed hopper 124, and a seed tube 128 positioned below the seed metering unit 126 that receives seeds 112 from the metering unit 126 to place in the furrow 110. A furrow opening apparatus 130 is positioned generally beneath the seed hopper 124, and includes a residue divider 132 at the leading edge of each row unit 108, and a furrow opener 134 positioned more centrally under the hopper 124. The furrow opener 134 is partially encompassed by a pair of gage wheels 136, and a pair of furrow closer wheels 138 which trail behind the furrow opener 134 and gage wheels 136.

The seed furrow 110 is formed by the furrow opener 134 attached to each row unit 108. Although numerous types of openers are known in the art such as double disc, single disc, shoe, boot, and runner style openers that the present invention may be used with, a double disk furrow opener 134 is shown in FIGS. 1–3. The double disk opener 134 includes two circular disk blades 139 rotatably mounted on a row unit 108 to form a V-shape at the point of seed placement. The disk blades 139 have a diameter, and the peripheral edges 140 of each disk blade 139 are adjacent to one another at the point where they form the V. The gage wheels 136 flank the disk blades 139 to support the row unit 108 and allow the disk blades 139 to mold a V-shaped seed furrow 110 at a predetermined depth within the soil.

Figure 4:
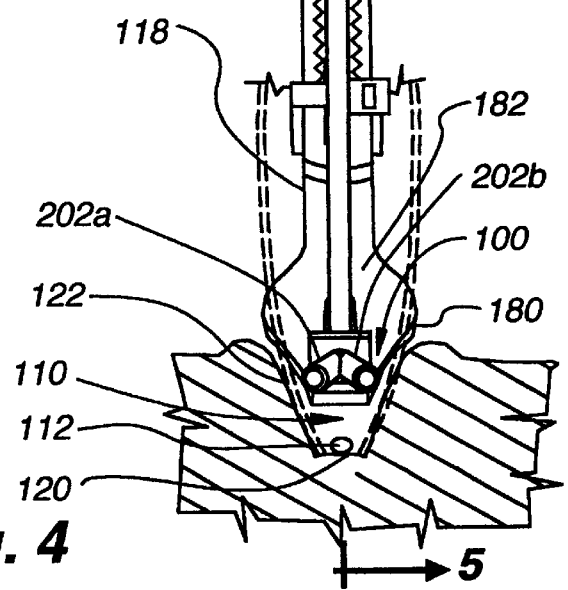
FIG. 4 is a section taken along line 4—4 of FIG. 3, and illustrates the liquid distribution apparatus connected to a liquid supply hose and attached to the extension.

The furrow 110 formed by the furrow opener 134 is generally V-shaped, as shown best in FIG. 4, with the bottom portion 120 forming the vertex where the upwardly and outwardly extending sidewalls 122 intersect. Under ideal soil conditions, the furrow 110 maintains the V-shape until closed by the furrow closer wheels 138. In moist conditions, the soil along the sidewalls 122 is pulled loose, causing portions of the soil to lodge in the bottom portion 120 of the furrow 110 and along the sidewalls 120. Also, as the disk blades 139 wear out, they become smaller in diameter and the adjacent edges 140 of the disk blades 139 become spaced apart. As the disk blades 139 wear down, the increased spacing between the adjacent edges 140 causes the furrow to gradually transform into a W-shape.

The seed tube 128 extends downwardly from the metering unit 126, between the disk blades 139 (or into the boot or shoe), and is positioned directly over the seed furrow 110 adjacent to the rear 142 of the double disk blades 139, as shown in FIG. 3. The metering unit 126 regulates the distribution of seeds 112 from the seed hopper 124 to the seed tube 128. Thus, the seeds 112 are optimally evenly spaced along the seed furrow 110 as they fall from the seed tube 128.

As shown in FIGS. 3, 5, 7 and 8 the seed tube 128 is attached to and extends downwardly from the meter unit 126. The seed tube 128 has an elongated hollow main body 144, with a generally rectangular cross-sectional structure defining a rearwardly facing surface 146, a forwardly facing surface 148, and opposing side facing surfaces 150. The seed tube 128 has a slight arcuate shape along its length in the rearward direction. An upper end 152 of the seed tube 128 is attached to the meter unit 126, while a downwardly depending lower and trailing end 154 of the seed tube 128 depends downwardly between the disk blades 139 so as to be positioned over the bottom portion 120 of the furrow 110. The downwardly depending end 154 defines an opening 156 through which the seeds 112 exit the seed tube 128 and fall into the furrow 110. The lower end 154 of the seed tube 128 is swept rearwardly from the upper end 152 as a result of the slight arcuate shape. The forwardly facing surface 148 of the seed tube 128 is longer than the rearwardly facing 146 surface of the seed tube 128, such that the forwardly facing surface 148 forms a lower edge 158 of the opening 156, while the rearwardly facing surface 146 of the seed tube 128 defines the upper edge 160 of the opening 156.

A pair of protrusions 162 extend from the rearwardly facing surface 146 of the seed tube 128. The protrusions 162 are spaced longitudinally with respect to one another along the length of the seed tube 128. Each protrusion 162 can have an aperture 164 formed laterally therethrough.

The seed tube 128 guides the seeds to the furrow 110, as seen in FIGS. 3-6. As the seeds 112 flow through the seed tube 128, they bounce around as a result of interaction with the walls 122 of the seed tube 128 as well as the movement of the planter 102 over the ground. The rearward curve of the seed tube 128, as well as the orientation of the exit opening 156, are designed to compensate for the forward motion of the planter 102, and ideally the seeds 112 drop into the furrow 110 very gently. However, since the seeds 112 bounce as they move through the seed tube 128, they oftentimes drop out of the seed tube 128 at a less than optimal angle, or the seeds 112 bounce outwardly from the opening 156 of the seed tube 128 prior to hitting the ground, causing the seeds 112 to then bounce upwardly when they hit the ground.

The bouncing of the seeds 112 results in the seeds being disbursed throughout the furrow 110, not only along the bottom portion 120, but along the side walls 122 and often outside the seed furrow. The bouncing seeds 112 result in the seeds being improperly positioned within the furrow 110. The improper placement of the seeds within the furrow 110 results in various growth related problems such as uneven pant emergence, poor stands, increased weed population, non uniform maturing, longer insect life cycles, higher susceptibility to chemical damage, and ultimately lower yields. Moving the planter 102 at a slower velocity reduces the bouncing problem, but does not eliminate it. Moving the planter 102 at a higher velocity to increase the planting process exacerbates the bouncing problem.

Figure 10:
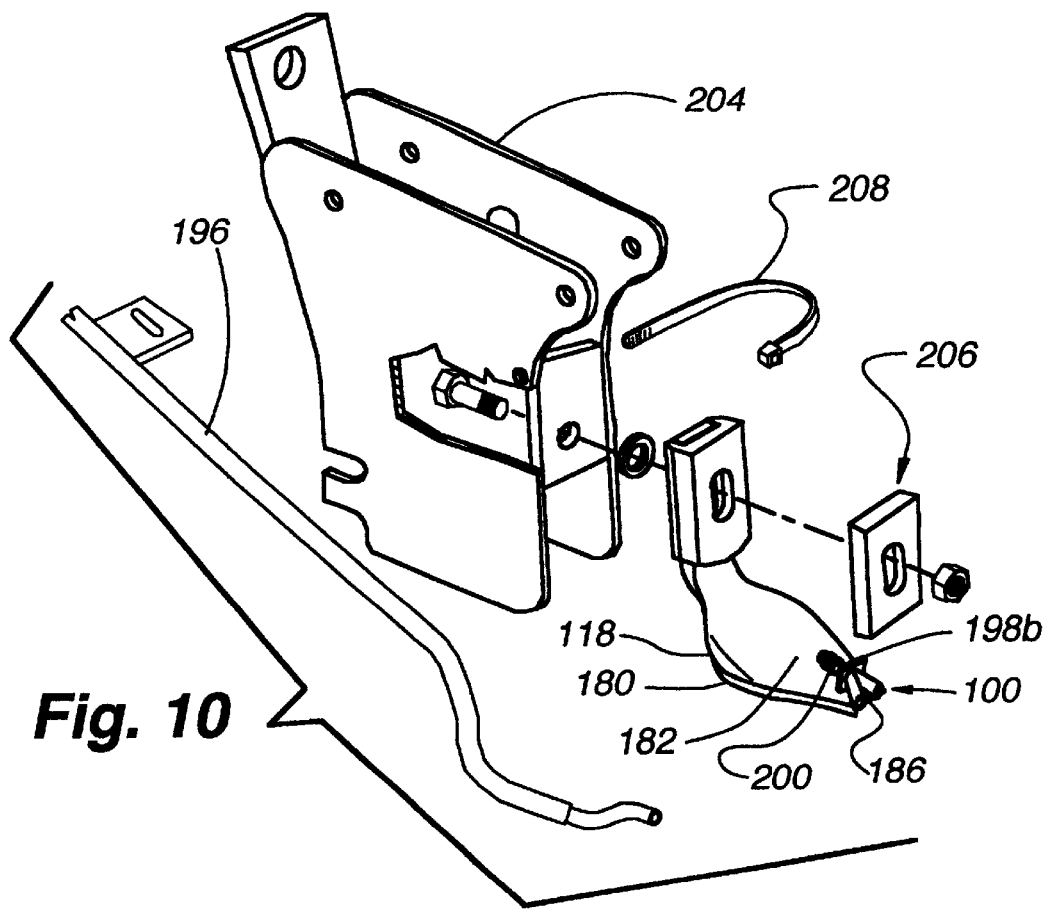
FIG. 10 is an exploded view of the Case/IH model planter shown in FIG. 9.
Figure 9:
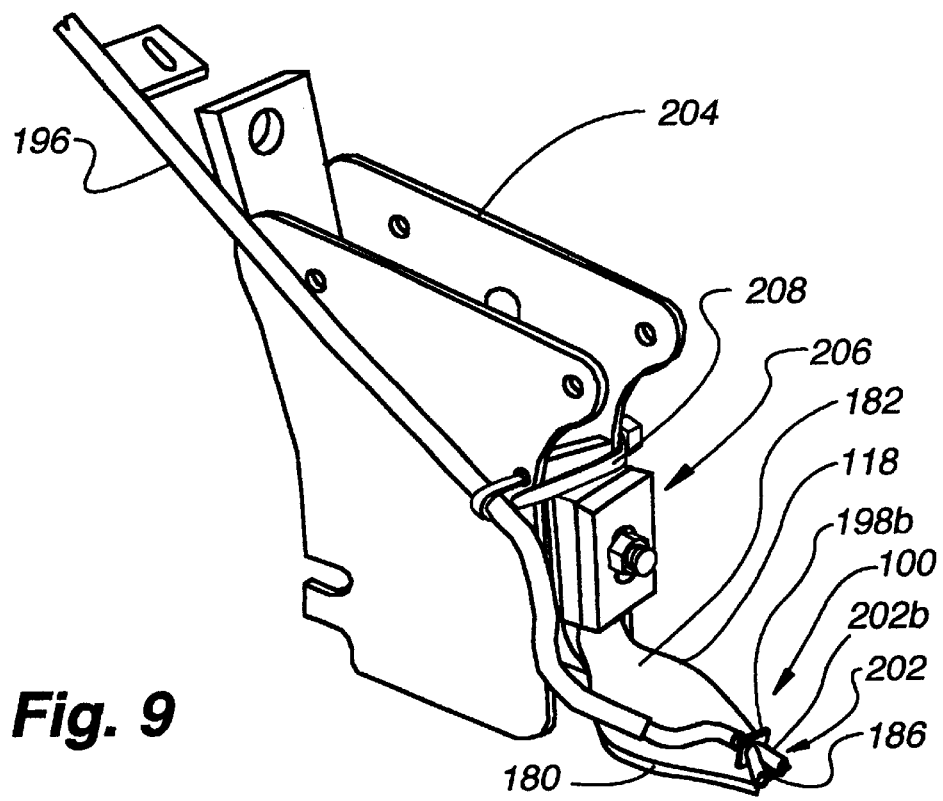
FIG. 9 is a perspective view of a Case/IH model planter with one embodiment of the liquid distribution apparatus.

As seen in FIGS. 3–8, the extension 118 is preferably mounted on the rearwardly facing surface 146 of the seed tube 128 near its depending lower end 154. Alternatively, or as seen in FIGS. 9 and 10, the extension 118 may be mounted on other row unit structures such as a seed boot or shoe. The extension 118 facilitates the proper placement of seeds 112 in the bottom portion 120 of the furrow 110 thereby significantly reducing the problems associated with improper seed placement as discussed above. The extension 118 extends downwardly and rearwardly from the seed tube 128 into the furrow 110, minimizing contact with the side walls 122. Preferably, the extension 118 terminates at a position just above the vertex 120 of the furrow.

With the extension 118 mounted on the depending lower end 154 of the seed tube 128, as the seeds 112 exit the opening 156 of the seed tube 128 and bounce from the seed tube, the seeds 112 contact the extension 118 and deflect back into the furrow 110. If the seeds 112 bounce more than once within the furrow 110, they will again contact the extension 118 further along its length and will again be deflected back into the furrow 110. As the seeds 112 come to rest in the bottom portion 120 of the furrow 110, the trailing end 186 of the extension 118 passes over the seeds 112 without contacting the seeds 112. The extension effectively funnels the seeds to the bottom of the furrow. In the preferred embodiment when attached with the seed tube, the width of the extension decreases rearwardly along its length so that the width of the extension closely matches the width of the furrow as the extension extends rearwardly and downwardly into the furrow, thereby reducing the number of seeds that can bounce between the sidewall of the furrow and the extension In mounting the extension 118 to the seed tube 128, as best seen in FIGS. 4, 5, 7 and 8, the top segment 166 of the extension 98 is releasably attached to the seed tube 128. More particularly, in one embodiment of the extension, the protrusions 162 on the seed insert tube 128 are positioned within the apertures 168 formed in an attachment 170 having outwardly facing sidewalls defining a sawtooth pattern 172 complimentary to a sawtooth configuration 174 defined by an elongated slot 176 in the extension 118. The complimentary sawtooth configurations 172 and 174 provide an adjustment mechanism to place the extension at the appropriate depth into the furrow 110. The engagement of the protrusions 162 in the mounting apertures 168 properly position the extension 118 on the seed tube 128, and acts to inhibit any longitudinal or transverse movement of the extension 118 with respect to the seed tube 128. Two releasable fasteners 178, such as plastic tie straps, are positioned around the extension 118 and the seed tube 128, and are releasably fastened thereto to hold the extension 118 securely in position on the seed tube 128. The extension can also be fastened to the seed tube or planter in any known manner.

Figure 5:
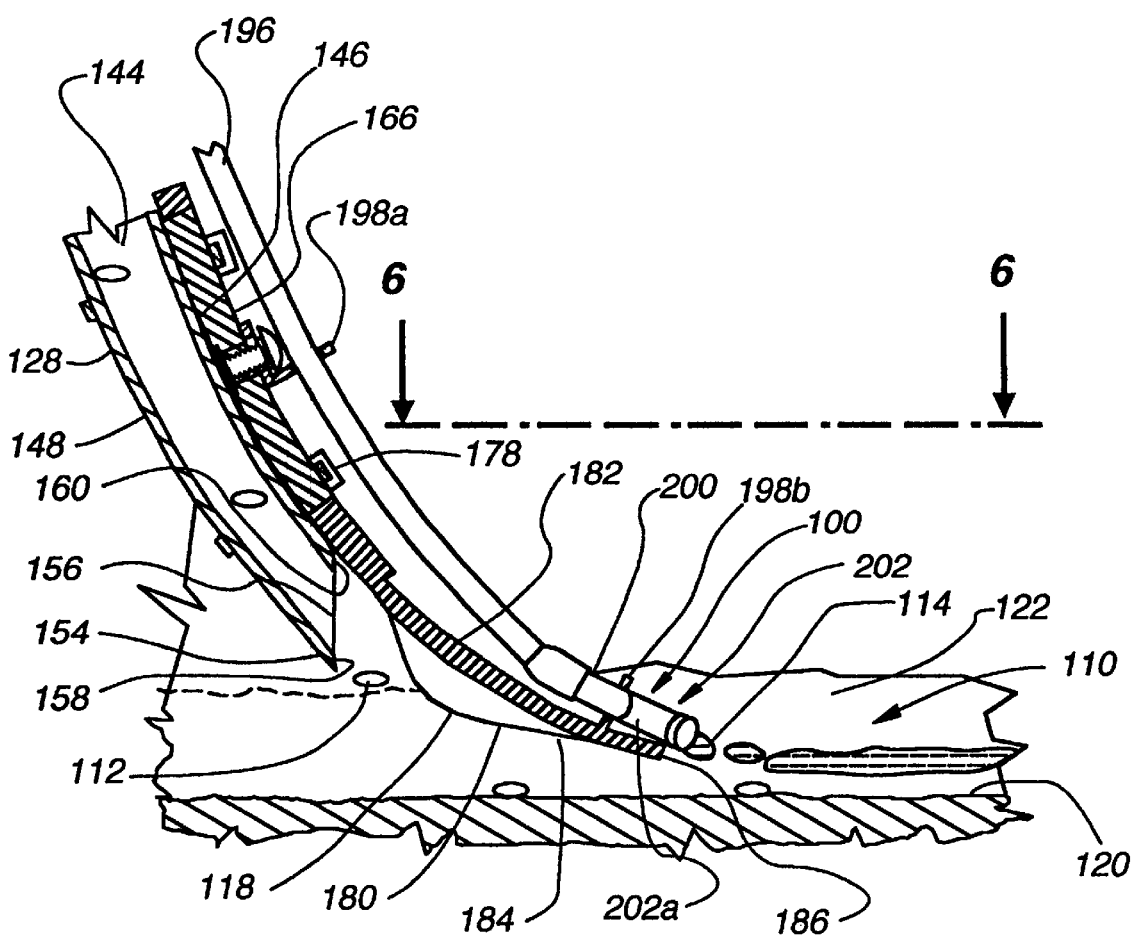
FIG. 5 is a section taken along line 5—5 of FIG. 4, and illustrates the liquid distribution apparatus dispersing liquid unto the sidewalls of a seed furrow.
Figure 6:
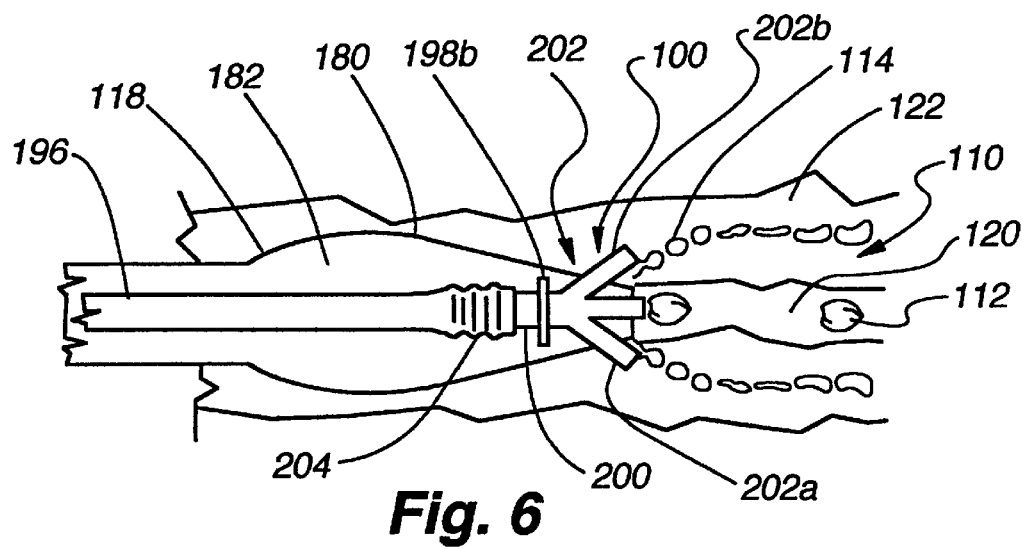
FIG. 6 is a top view of one embodiment of the liquid distribution apparatus of the present invention.
Figure 7:
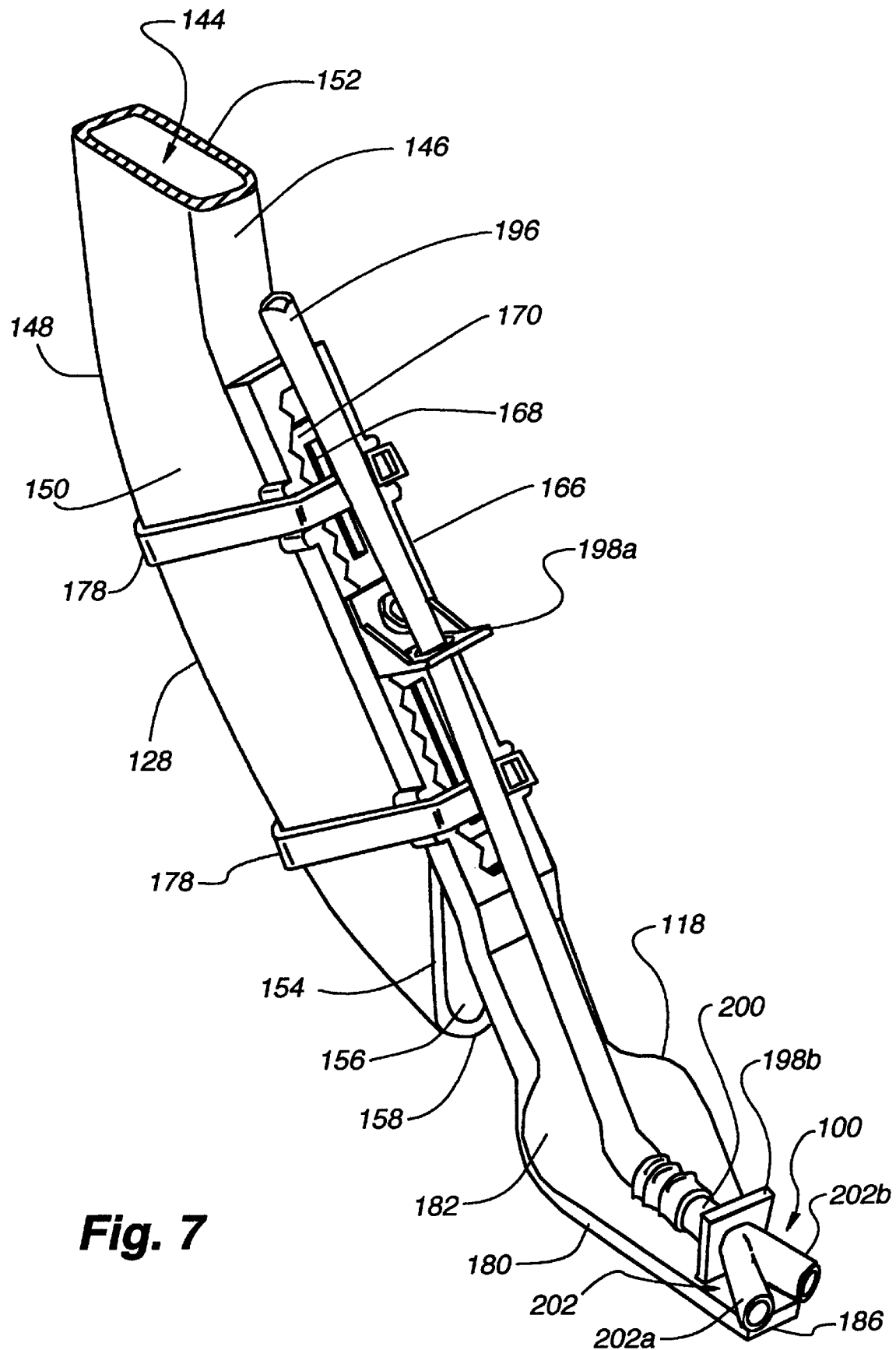
FIG. 7 is a perspective view of a seed tube, one embodiment of an extension for reducing seed bounce, and a liquid supply hose, with one embodiment of the liquid distribution apparatus of the present invention connected to the liquid supply hose and fixed to the extension.

In one embodiment, the bottom segment 180 of the extension 118 defines an upwardly convex top surface 182 and a downwardly concave lower surface 184. The downwardly concave lower surface 184 acts to deflect the bouncing seeds 112 toward the center 120 of the furrow 110. The seeds 112 are thus directed toward and land in the bottom portion 120 of the furrow 110. This helps place the seeds 112 in the optimal position within the furrow 110, and helps reduce the number of seeds which come to rest on the side walls 122 or outside of the furrow 110. In short, the downwardly concave lower surface 184 of the bottom segment 180 of the extension 118 focuses the deflection of the seeds 112 toward the bottom portion 120 of the furrow 110, as shown in FIGS. 4–6.

The transverse dimension of the lower surface 184 of the bottom segment 180 of the extension 118 preferably becomes substantially planar adjacent to the trailing end 186 because the transverse dimension of the extension 118 is substantially reduced, and a downwardly facing concave surface has less of an effect on the deflection of the seeds given the proximity of the trailing end 186 to the bottom portion 120 of the furrow 110. Also, very few seeds continue to bounce at that location on the extension.

The extension 118 is flexible along its entire length so that in the event the trailing end 186 of the extension comes into contact with the soil, the trailing end of the extension will easily bend upwardly to minimize any damage to a seed 112 that may be contacted. Furthermore, while the extension 118 is designed to not contact the sidewalls 122 of the furrow 120 during use, some incidental contact may occur. Any incidental contact with furrow may have the affect of covering the seeds 112 in the bottom portion 120 of the furrow 110 with a thin layer of soil. This helps to protect the seeds from any incidental contact with the liquid 114 that may occur. The extension can also have any number of shapes and cross-sections, and can contact the furrow bottom or sidewalls.

Including liquids 114 such as liquid fertilizer, liquid starter, liquid insecticides, liquid inoculants, and water in the furrow 110 along with the seeds 112 at the time of planting advantageously affects the growth of the plants and the ultimate yield of the crop as discussed above. The provision of some types of liquid 114 directly into the furrow 110, however, can actually negatively affect plant growth and the ultimate crop yield if liquid 114 is distributed directly unto the seeds 112. Accordingly, one embodiment of the liquid distribution apparatus 100 of the present invention directs liquid 114 unto the sidewalls 120 of the furrow, above the seeds 112, thus providing liquid 114 directly into the furrow 120 along with the seeds 112 without drenching the seeds 112 in the liquid 114. Although the liquid distribution apparatus 100 of the present invention is shown in the FIG. s in conjunction with one embodiment of the extension 118, a Schaffert Manufacturing Co., Inc., Rebounder™, the liquid distribution apparatus may also be used in the absence of the extension 118. In the absence of the extension 118, however, a larger proportion of seeds 112 may become deposited on the furrow sidewalls 122 and hence come in direct contact with the distributed liquid 114 from the present invention. The majority of seeds 112, however, will still be deposited in or near the bottom portion 120 of the furrow 110, therefore the present invention is advantageous to plant growth and crop yield even in the absence of the extension 118. The present invention may also be used in conjunction with other available seed placement attachments such as a Keeton Seed Firmer™.

Liquid 114 is supplied to the liquid distribution apparatus 100 of the present invention from the liquid container 106. The liquid container includes a pump 188 in fluid connection with the contents of the liquid container 106 for supplying liquid under pressure. As shown in FIG. 1, a main hose 190 connects to the pump 188 to the liquid distribution tube 192 at the upper rear of the planter 102. The liquid distribution tube 192 on the planter 102 traverses the width of the planter 102 across the planter row units 108. Adjacent each row unit 108, the liquid distribution tube 192 has an outlet 194 that is fluidly coupled to a liquid supply hose 196. Each row unit 108 has the liquid supply hose 196 for distributing liquid to the furrow 110 associated with each row unit 108.

The liquid supply hose 196 extends generally downwardly from the distribution tube 192 to the seed tube 128 and is attached to the extension 118. The extension 118 attached to the seed tube 128 preferably includes at least two eyelets 198a and 198b along its length. The first eyelet 198a is located along the top segment 166 of the extension 118. The liquid supply hose 196 extends through the first eyelet 198a and is thereby held in place along the center of the extension 118. Preferably, the first eyelet 198a fits loosely around the hose 196 so that as the extension lexes the hose may move freely with the eyelet 198a, which helps to prevent the hose 196 from disconnecting the hose 196 from the liquid distribution apparatus. A second eyelet 198b is located along the top of the extension 118 adjacent the bottom segment 180 of the extension 118 that extends into the furrow 110. Preferably, the second eyelet 198b grips the supply hose 196 firmly to help prevent the hose 196 from disconnecting from the liquid distribution apparatus 100. An additional third eyelet 198c may be included along the length of the extension between the first eyelet 198a and the second eyelet 198b. The third eyelet 198c helps to hold the hose 196 secure so that residue flowing over the top of the extension does not disconnect the hose 196 from the liquid distribution apparatus.

The liquid distribution apparatus 100 is preferably attached to the bottom segment 180 of the extension 118 adjacent the furrow 110. The liquid distribution apparatus 100 is preferably secured to the extension 118 with the second eyelet 198b and is in fluid connection with the liquid supply hose 196. In the two-eyelet embodiment of the liquid distribution apparatus 100, shown in FIGS. 4, 5, 7 and 8, the liquid distribution apparatus 100 generally defines a Y-shaped tubular structure having a supply tube 200 in fluid connection with the liquid distribution hose 196 and two distribution tubes 202a and 202b in fluid connection with the supply tube 200, the distribution tubes distributing liquid 114 on the sidewalls 122 of the furrow 110 generally above the two vertexes of the furrow.

Generally speaking, the liquid distribution apparatus 100 includes a supply channel 200 and a distribution channel 202 having at least two outlets 202a and 202b. However, it is to be understood that the distribution channel 202 may comprise any structure that distributes liquid unto one or both sidewalls 122 of the furrow 110. The supply channel 200, as shown in FIGS. 4–10, comprises a tubular structure or hose that is in fluid connection with the liquid supply hose 196 at its rear end. Preferably, the inlet portion of the supply channel 200 includes a barbed or ribbed portion 204 to engage the liquid supply hose 196. The outlet portion of the supply channel 200 is in fluid connection with the distribution channel 202.

The distribution channel 202 as shown in the embodiment of the liquid distribution apparatus show in FIGS. 4–10, includes two outlets 202a, 202b, angularly oriented with respect to the supply channel 200, that distribute liquid along one or both sidewalls 122 of the furrow 120. The outlets 202a, 202b, in this embodiment, comprise tubular structures or hoses. The front portion of the distribution channel 202 is attached to the center of the extension 118 by the second eyelet 198b. The liquid distribution apparatus 100 may be held in place in the second eyelet 198b by an adhesive or a tie strap. Accordingly, the outlets 202a, 202b, are oriented along the bottom segment 180 of the extension with the first outlet 202a extending outwardly to one side of the extension 118 and the second outlet 202b extending outwardly to the opposite side of the extension 118. As shown in the Figures, the outlets 202a, 202b, along with the supply tube 200 form a generally Y-shaped structure.

As shown in FIGS. 5 and 6, when liquid 114 flows from the outlets 202a, 202b, the liquid 114 is preferably distributed above the bottom portion 120 of the furrow 110 along the sidewalls 122 of the furrow. By distributing the liquid 114 along the sidewalls 122 of the furrow 110, the seeds 112 are not drenched in the liquid 114 because most of the seeds 112 are deflected by the extension 118 to the bottom portion 120 of the furrow 110 below where the liquid is distributed.

As shown in FIGS. 4–10, the liquid distribution apparatus 100 is attached along the bottom segment 180 of the extension 118 bye the second eyelet 198b. The liquid supply hose 196, that is attached to the extension 118 at the first eyelet 198a, is in fluid connection with the liquid distribution apparatus 100 adjacent the second eyelet 198b. As mentioned above, the use of the extension 118 is considered preferable, but is not necessary to the proper functioning of the liquid distribution apparatus 100. For example, the liquid distribution apparatus 100 can be attached along the center top portion of the seed tube 128 directly above the opening 156 where the seeds 112 exit the seed tube 128. Attached to the seed tube 128, the outlets 202a, 202b, will extend outwardly and to either side of the seed tube 128 thereby depositing liquid 114 along the sidewalls 122 of the furrow 110.

Generally, the liquid distribution apparatus 100 may be attached to any part of the planter row unit 108. Preferably, the liquid distribution apparatus 100 (when not attached to the extension 118) is attached at a location between the double disk opener 134 and the furrow closer wheel 138 centered along the vertex 120 of the furrow so as to orient the outlets 202a, 202b above the sidewalls 122 of the seed furrow 110 before the furrow 110 is closed.

The embodiments of the liquid distribution apparatus 100 are shown and described as being attached to the bottom segment 180 of the extension 118. The various embodiments of the liquid distribution apparatus may, however, be attached anywhere along the extension so long as, in the case of the two-outlet embodiment, the outlets 202a, 202b are oriented so as to distribute liquid 114 along the sidewalls 122 of the furrow. The location of the liquid distribution apparatus 100 on the extension as shown in the FIG. s is considered preferable.

Additionally, while the various embodiments of the liquid distribution apparatus are shown as a separate structure attached to the extension 118, they may, however, be integrated into the extension 118. To integrate the liquid distribution apparatus 100 into the extension the supply channel 200 and distribution channel 202 can be molded directly into the extension in a single plastic injection mold. In the integrated liquid distribution apparatus, the supply channel 200 is in fluid connection with the liquid supply hose 196 and a plurality of outlets from the distribution channel 202 are oriented so as to distribute liquid into the furrow 110.

FIGS. 9 and 10 show the two outlet embodiment of the liquid distribution apparatus 100 of the present invention connected to an extension that is attached to a Case/IH style planter having a seed boot 204 positioned between the disks (not shown). The extension 118 is attached directly to the seed boot 204. A brace plate 206 may be necessary to properly attach the extension 118 to the seed boot 204. The seed tube 128 (not shown) typically extends through the seed boot.

The liquid supply hose 196 is connected to the outside of the seed boot 204 using a tie strap 208. The lower end of the liquid supply hose 196 is in fluid connection with the liquid distribution apparatus 100 connected to the extension 118. Accordingly, the outlets 202a and 202b of the two outlet embodiment of the liquid distribution apparatus 100 distribute liquid 114 unto the sidewalls 122 of the furrow 110.

Figure 11:
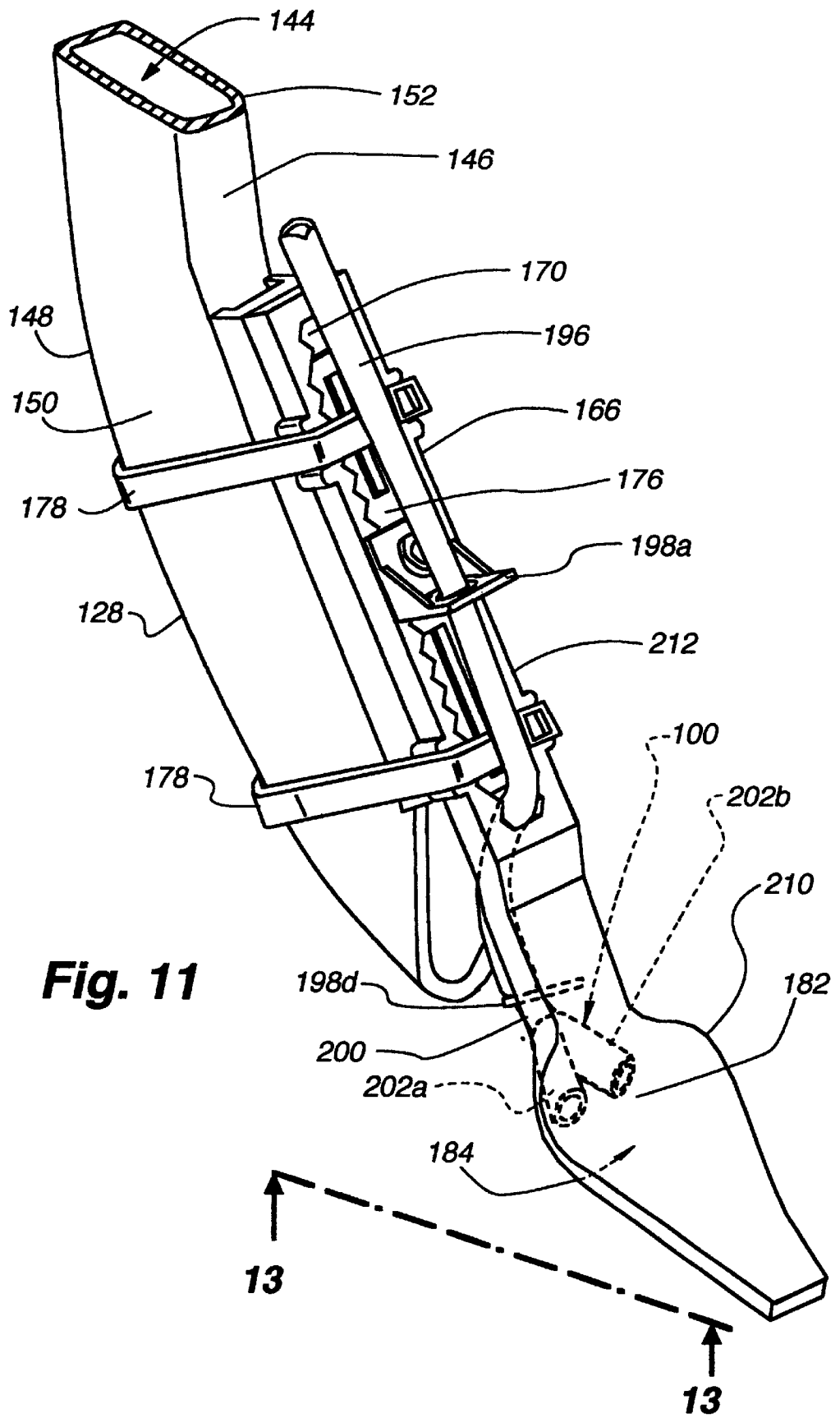
FIG. 11 is a perspective view of a seed tube, an embodiment of an extension for reducing seed bounce, a liquid supply hose, and an embodiment of the liquid distribution apparatus wherein the liquid distribution apparatus is connected with the underside of the extension for reducing seed bounce.

In an alternative embodiment illustrated in FIG. 11, the liquid distribution apparatus 100 is connected to an extension 210 adjacent the downwardly concave lower surface 184 of the extension 210. Preferably, in this embodiment the outlets 202a, 202b of the liquid distribution apparatus 100 are located between the underside 184 of the extension 210 and the seed chute 128. The liquid supply hose 196 extends generally downwardly from the distribution tube 192 to the seed tube 128, and extends through a first eyelet 198a which projects upwardly from the extension 210. Rearwardly of the eyelet 198a, the liquid supply hose 196 extends from the top surface 212 of the extension 210 through the elongated slot 176 to the underside 214 of the extension 210, where it is fluidly connected with the supply channel 200 of the apparatus 100. The extension 210 preferably includes an eyelet 198d projecting downwardly, and generally transversely, from the extension 210. The eyelet 198d couples the apparatus 100 to the extension 210, and properly orients the outlets 202a, 202b of the apparatus 100 to distribute liquid on the sidewalls 122 of furrow 110. The liquid distribution apparatus 100 extends through the eyelet 198d, and is fluidly connected with the liquid supply hose 196 adjacent thereto. In the case of the distribution apparatus 100 having three outlets, the center outlet is oriented to distribute liquid in the vertex 120 of the furrow 110.

Figure 12:
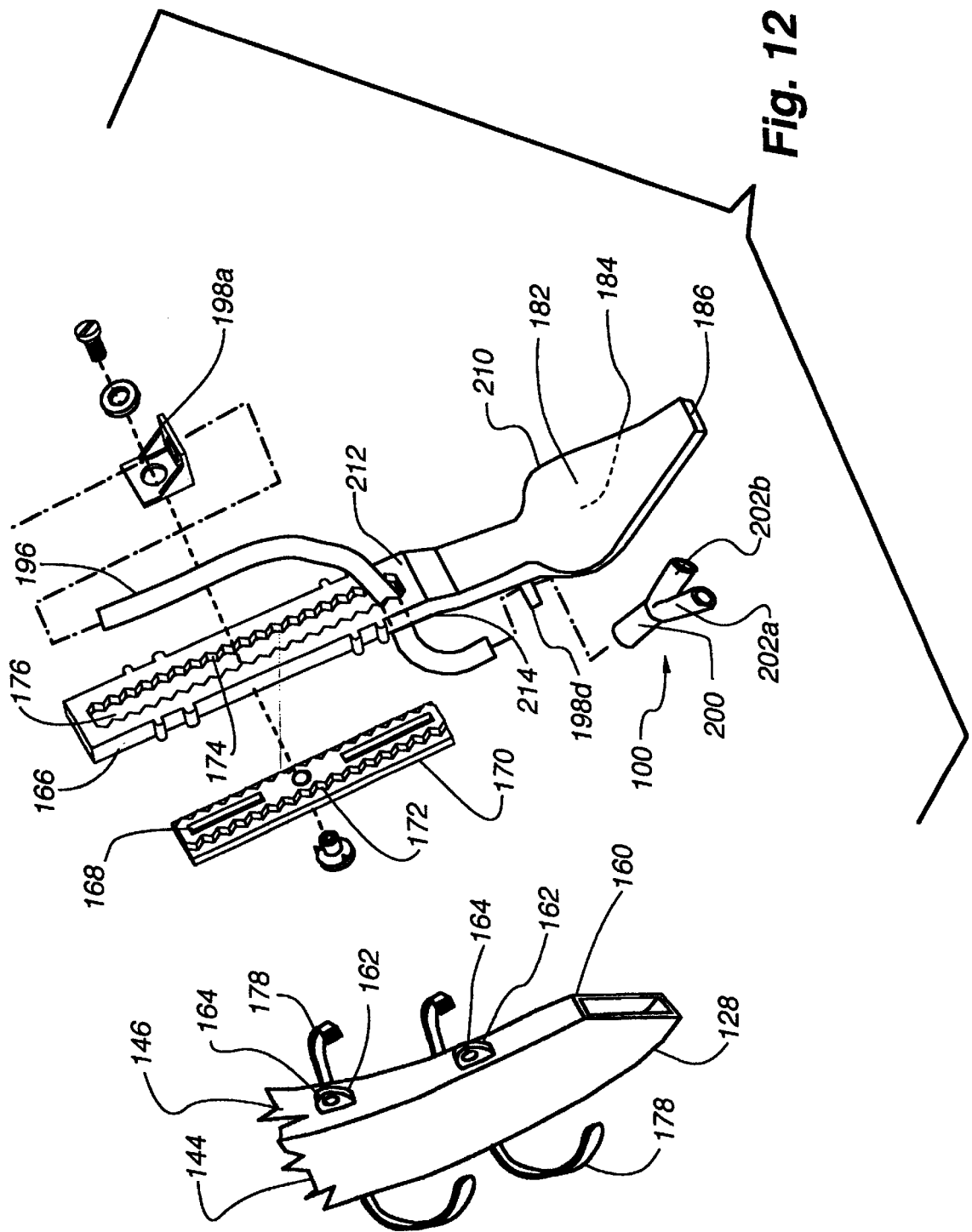
FIG. 12 is an exploded view of the seed tube, the embodiment of the extension for reducing seed bounce, the liquid supply hose, and the embodiment of the liquid distribution apparatus as shown in FIG. 11.

FIG. 12 is an exploded view showing the top section 166 of the extension 210 connected with the seed tube 128. This connection is shown and described in detail above with respect to FIG. 8, the only difference in FIG. 12 is the presence of an alternative embodiment of the extension 210 which has an eyelet 198d extending downwardly, and generally transversely, from extension 210. This eyelet 198d properly orients the outlets 202a, 202b of the liquid distribution apparatus 200 below the extension 210.

Figure 13:
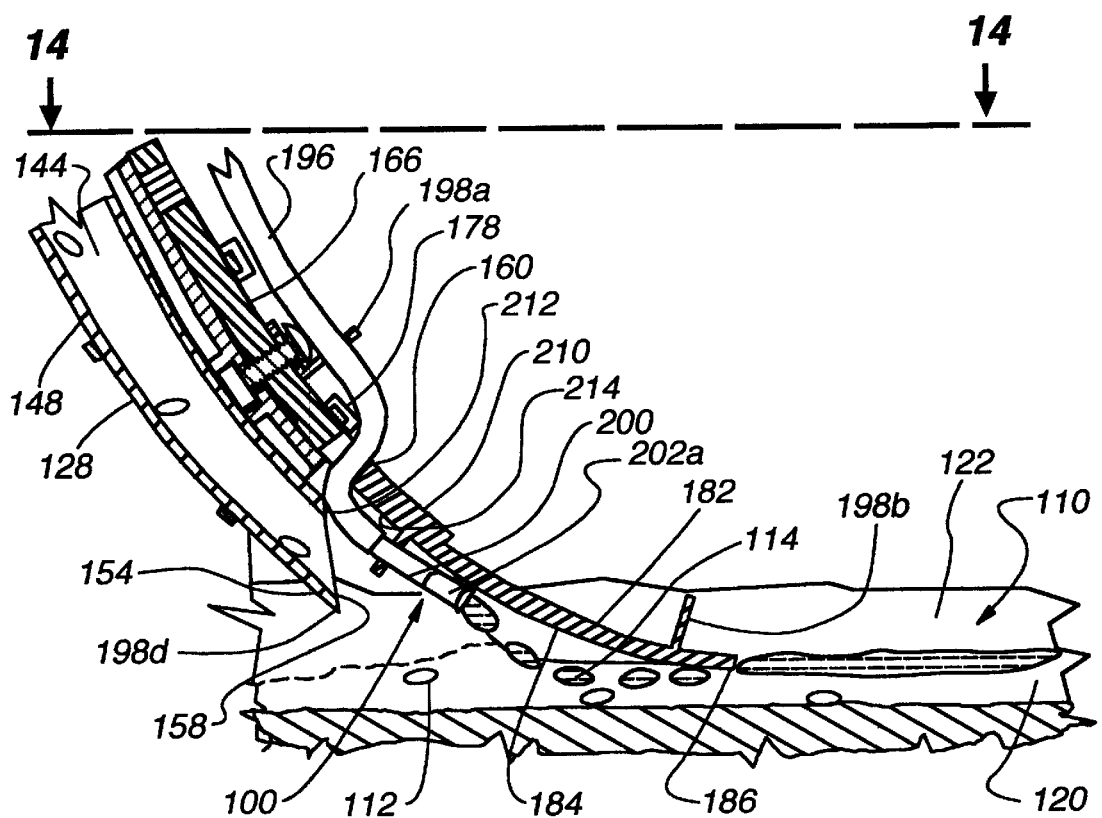
FIG. 13 is a section taken along line 13—13 of FIG. 11.
Figure 14:
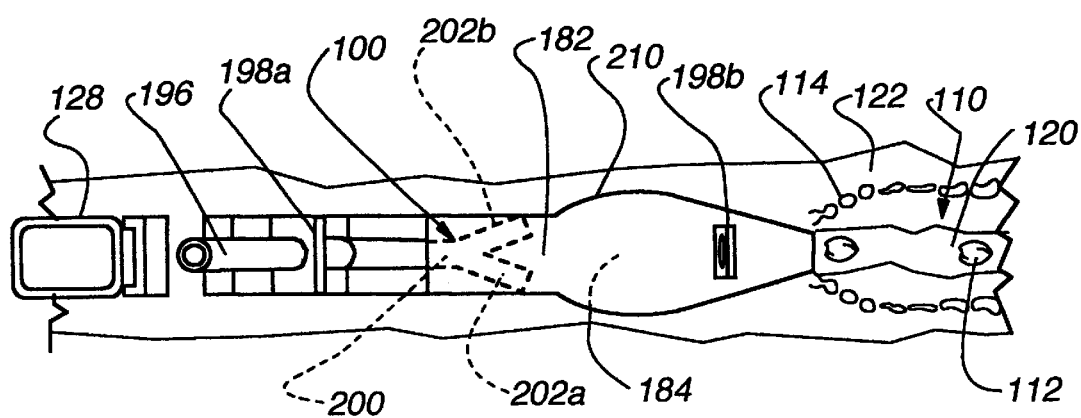
FIG. 14 is a section taken along line 14—14 of FIG. 13.
Figure 15:
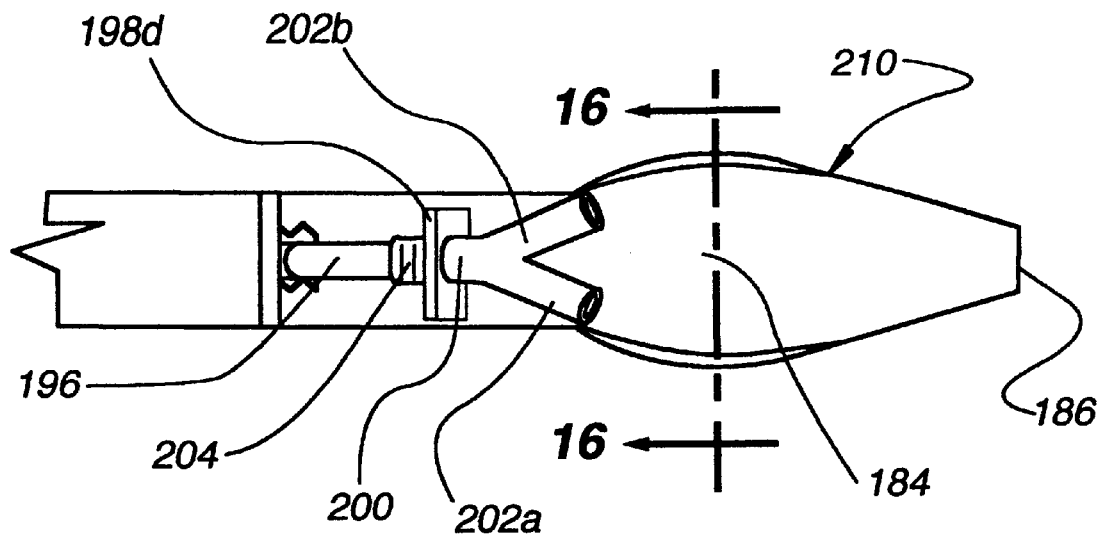
FIG. 15 is a bottom view of the embodiment of an extension for reducing seed bounce, and the embodiment of the liquid distribution apparatus wherein the liquid distribution apparatus is connected with the underside of the extension.
Figure 16:
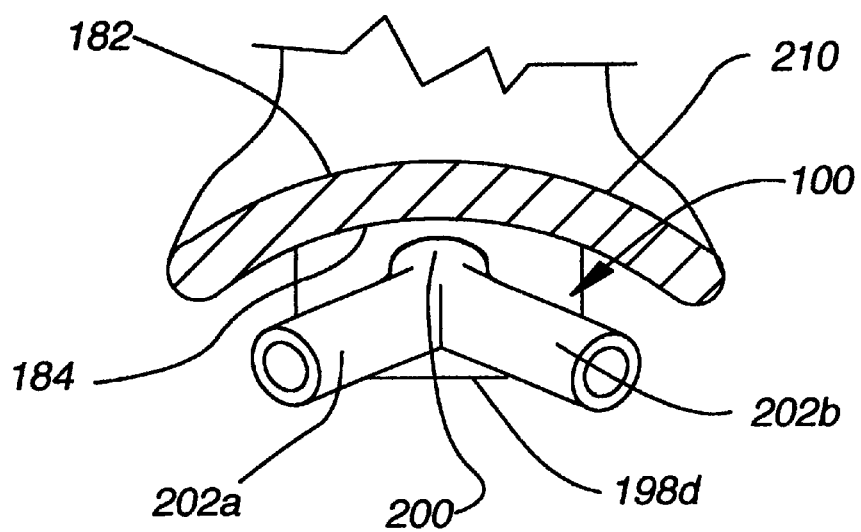
FIG. 16 is a section taken along line 16—16 of FIG. 15.

FIG. 13 is a section taken along 13–13 of FIG. 11. This view shows the orientation of the distribution apparatus 100 extending through the eyelet 198d for distribution of liquid beneath the extension 210 on the sidewalls 122 of the furrow 110. FIG. 13 also shows the liquid supply hose 196 passing through the elongated slot 176 from the top surface 212 of the extension 210 to the underside surface 214. FIGS. 14–16 are views which show the alternative embodiment of the extension 210 and the orientation of the liquid supply tube and the liquid distribution apparatus 100 coupled therewith.

This alternative embodiment provides for the additional advantage of preventing the outlets 202a, 202b of the liquid distribution apparatus 100 from becoming clogged with soil during use. The location of the liquid distribution apparatus 100 underneath the extension 210 shields the outlets 202a, 202b from any soil that may inadvertently fall on the extension from the filling of the furrow 110 by the furrow closer wheels (not shown) occurring behind the extension 210 after depositing the seeds and the liquid into the furrow 110.

Figure 17:
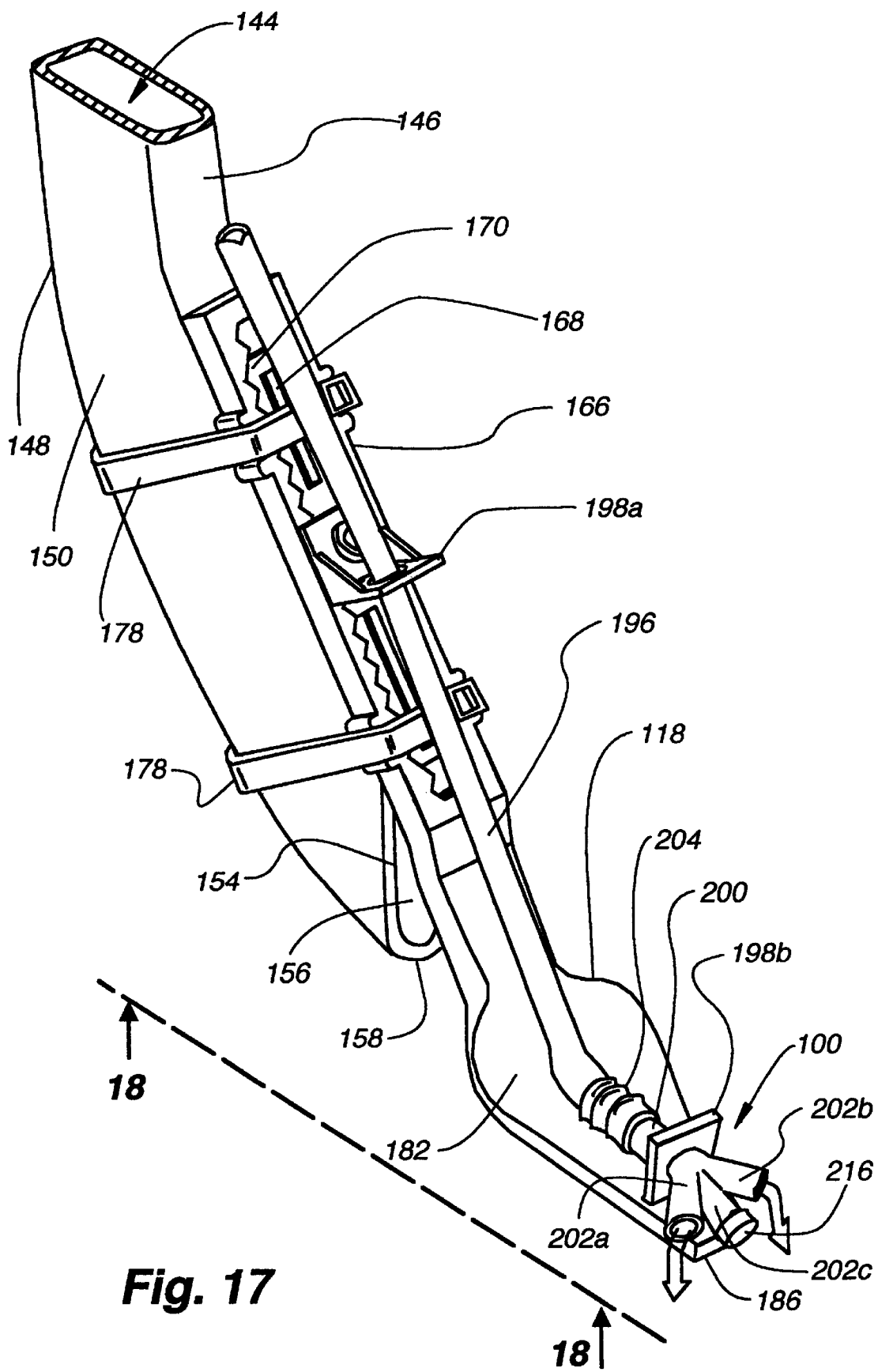
FIG. 17 is a perspective view of a seed tube, one embodiment of an extension for reducing seed bounce, and a liquid supply hose, with one embodiment of the liquid distribution apparatus having three outlets connected to the liquid supply hose and fixed to the extension.
Figure 18:
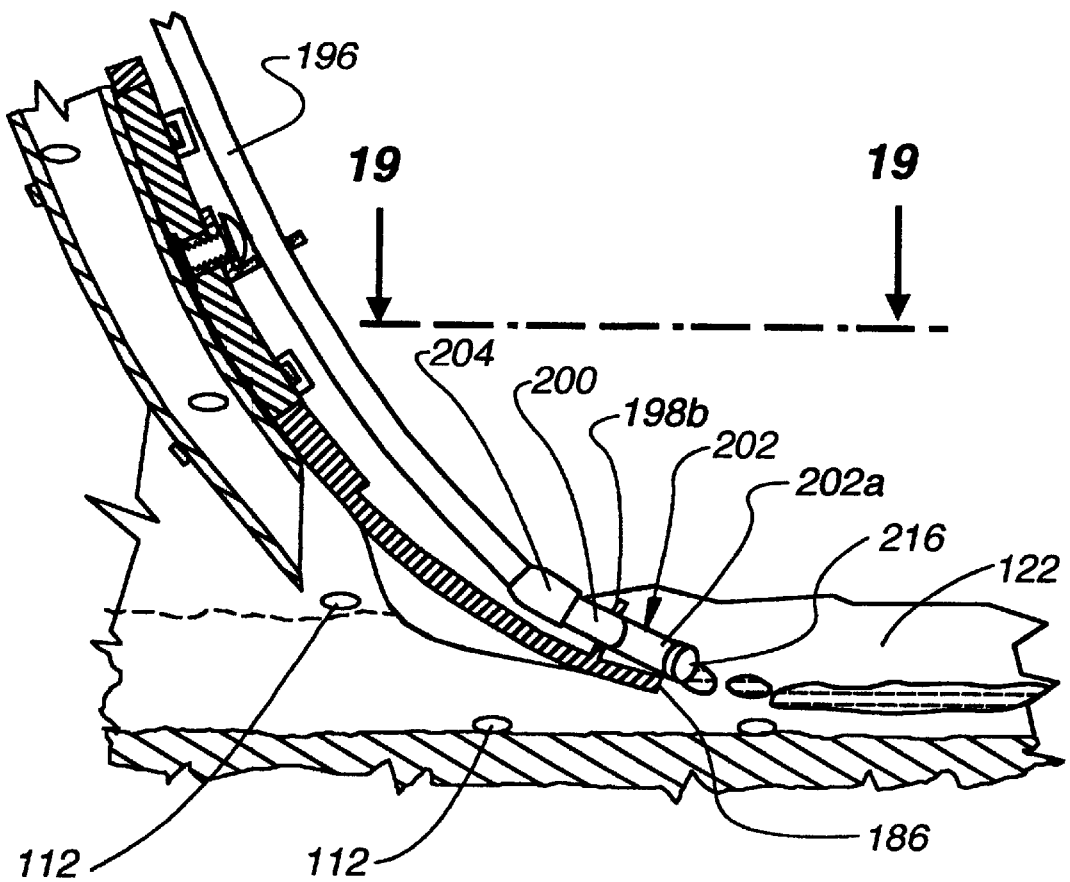
FIG. 18 is a section view taken along line 18—18 of FIG. 17.
Figure 19:
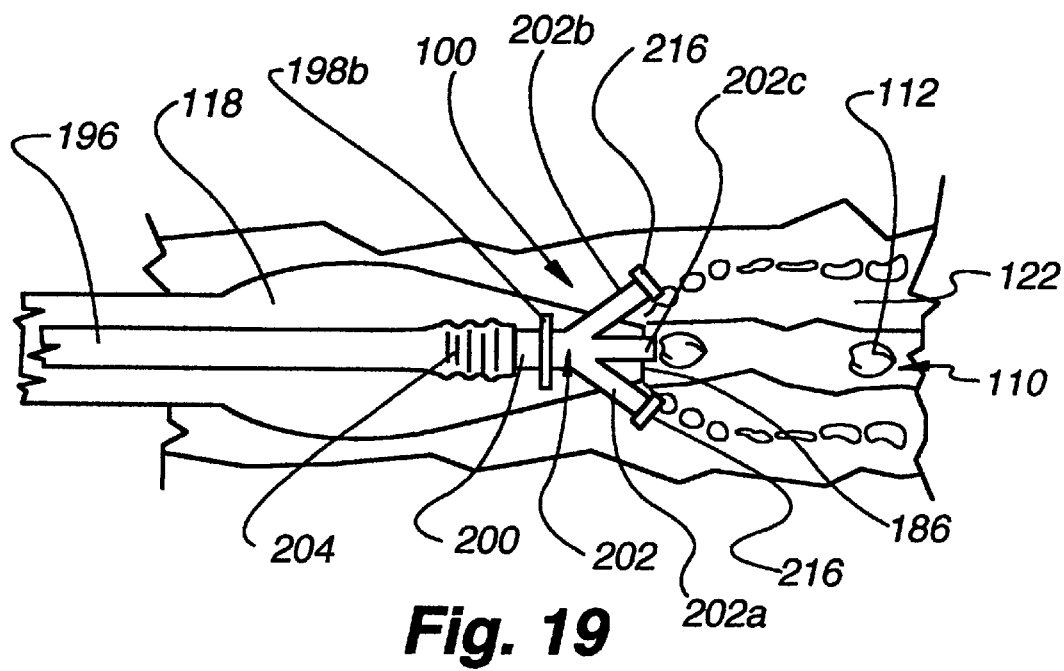
FIG. 19 is a section view taken along line 19—19 of FIG. 18.

Referring to FIGS. 17–19, an alternative embodiment of the liquid distribution apparatus 100 includes three outlets 202a, 202b, 202c in a preferably fork shaped configuration (ψ) with respect to the supply channel 200, wherein one of the outlets 202c is oriented to distribute liquid 114 in the centrally located bottom portion 120 of the furrow, and the other two outlets 202a, 202b are oriented to distribute liquid 114 on opposing sidewalls 122 of the furrow 110. Generally, this embodiment provides a farmer or other user with a convertible liquid distribution apparatus 100 that may distribute liquid on the sidewalls 122 of the furrow 110, in the vertex 120 of the furrow 110, or in any combination thereof. This allows the farmer to rapidly convert the liquid distribution portion of the planter for planting seeds that benefit from liquid distributed on the furrow sidewalls to planting seeds that benefit from liquid distribution directly on the seeds.

Preferably, the liquid distribution apparatus 100 includes a supply channel 200 similar to other embodiments described herein and a distribution channel 202. The distribution channel 202 preferably having three outlets 202a, 202b, 202c, wherein a first 202a and a second side outlet 202b are preferably angularly oriented with respect to the supply channel 200, which may distribute liquid along one or both sidewalls 122 of the furrow 110, and a third or center outlet 202c that is preferably co-linear with the supply channel 200, which may distribute liquid 114 centrally located in the bottom or vertex 120 of the furrow 112. This embodiment is described as preferably having three outlets; it is envisioned, however, that this embodiment could include more than three outlets.

As with preceding exemplary embodiments of the liquid distribution apparatus 100, the inlet portion of the supply channel includes a barbed or ribbed portion 204 at its rear end to engage the liquid supply hose 196. The outlet portion of the supply channel 200 is in fluid connection with the distribution channel 202. Accordingly, fluid flows from the first hose 196 into the supply channel 200 and then out to the outlet(s) 202a, 202b, 202c of the distribution channel 202.

This alternative convertible embodiment preferably also includes at least one stopper or plug 216 adapted to stop or reduce the flow of liquid 114 from any of the outlets 202a, 202b, 202c, thereby allowing the device to be converted to different liquid distribution patterns. In one embodiment, the stopper or plug 216 may be connected with the liquid distribution apparatus 100, with the extension 118 or 210 for reducing seed bounce, or with whatever device the apparatus 100 is connected with, for example a drill, by way of a cable or other such connection device so that when not in use the plug 216 stays connected with the liquid distribution apparatus 100. Preferably, the plug 216 is held to the apparatus by way of some retentive means such as a snap, clamp, or the like (not shown). Alternatively, the plug 216 may be supplied in a kit along with the liquid distribution apparatus 100.

The plug 216 is adapted to be inserted into the outlets 202a, 202b, 202c thereby prohibiting the flow of liquid 114 from the plugged outlet. This allows the apparatus 100 to be converted to any liquid distribution configuration the farmer desires. For example, for certain applications, such as placing liquid fertilizers in the furrow 110, it is desirable to distribute liquid 114 on the sidewalls 122 of the furrow 110 and not directly on the seeds 112; accordingly, the farmer will insert a plug 216 into the center outlet 202c. In another example, if the farmer is distributing liquid inoculant in the furrow 110 along with the seeds 112, it is desirable to place the inoculant directly on the seed 112; accordingly, the farmer will insert a plug 216 in the first 202a and second 202b side outlets.

In an alternative embodiment, the plug 216 is preferably permanently coupled within the distribution end 202 of the outlet. In this embodiment, liquid flow may be adjusted by pulling the plug 216 outward to allow full flow, or pressing the plug inwardly to decrease the flow. Fully depressed, the plug 216 prohibits liquid flow from the outlet(s) 202a, 202b, 202c altogether.

One advantage of this convertible embodiment is the ease by which a farmer may change from an in-furrow on-seed liquid distribution set-up (where the first 202a and second 202b outlets are plugged) to an in-furrow side wall distribution set-up (where the center outlet 202c is plugged) or vice versa. For example, a farmer may desire to plant corn seeds and distribute inoculants (which facilitate rapid germination and growth) directly on the seeds 112 in one portion of the farm, and then change seed types to soy beans and distribute fertilizer on the sidewalls 122 of the furrow 110 above the soy bean seeds for planting in a different portion of the farm. Changing from the on-seed liquid distribution for the corn seeds to the furrow side wall distribution for the soy beans simply requires that the farmer prohibit the liquid flow from the center outlet 202c, and allow the liquid flow from the side outlets 202a, 202b. In one embodiment, the farmer will remove the side plugs, and insert a center plug; or, in are alternative embodiment, the farmer will depress the center plug, and pull-out the side plugs.

Figure 22:
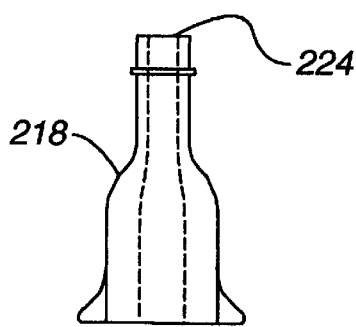
FIG. 22 is top view of the diverter illustrated in FIG. 20.
Figure 23:
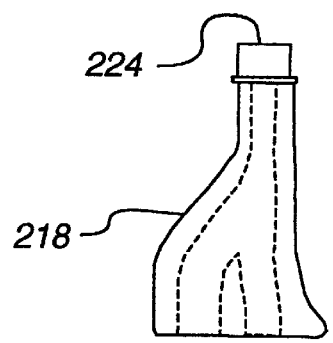
FIG. 23 is a side view of the diverter illustrated in FIG. 20.
Figure 21:
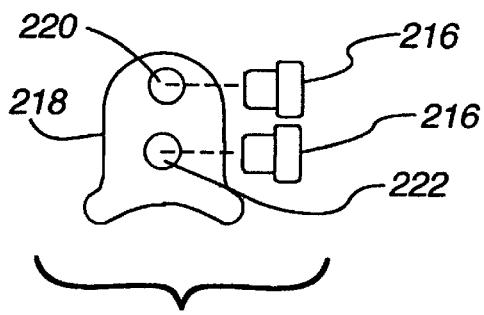
FIG. 21 is a front view of the diverter illustrated in FIG. 20.
Figure 20:
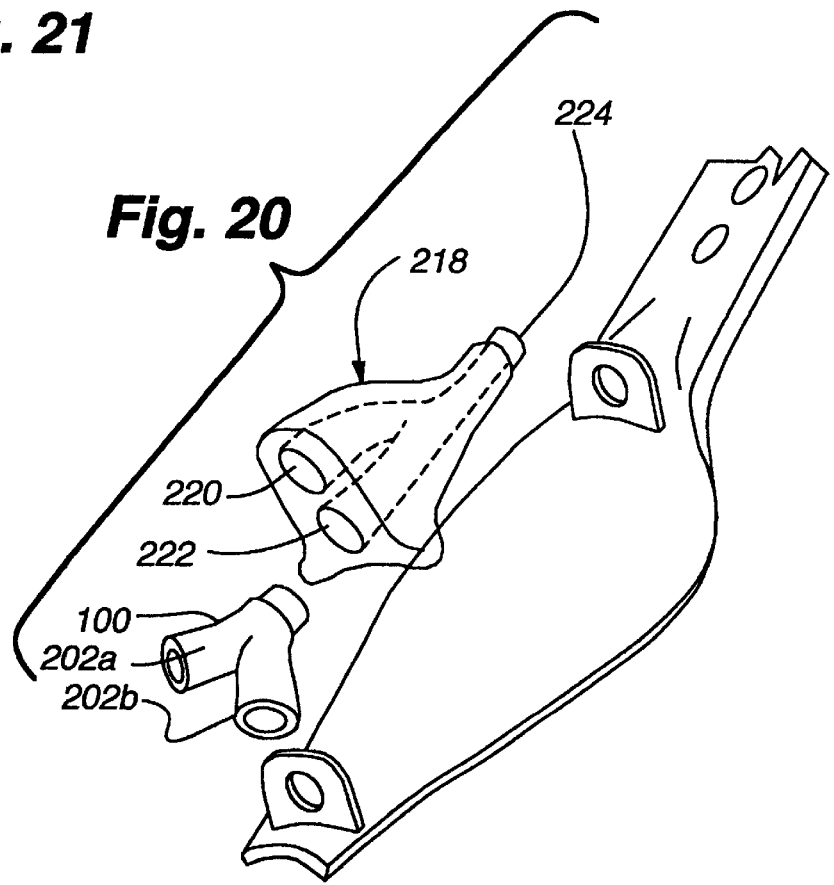
FIG. 20 is a perspective view of one embodiment of a diverter for use, in one example, in conjunction with the two outlet embodiment of the liquid distribution apparatus.

Referring to FIG. 20, a perspective view of one embodiment of a diverter 218 is shown for use, in one example, in conjunction with the two outlet 202a, 202b embodiment of the liquid distribution apparatus 100. FIG. 21 is a front view of the diverter 218 illustrated in FIG. 20; FIG. 22 is top view of the diverter 218 illustrated in FIG. 20; and FIG. 23 is a side view of the diverter 218 illustrated in FIG. 20. The diverter may be used to configure the two-outlet 202a, 202b embodiment of the liquid distribution apparatus 100 for either on-seed liquid distribution, or liquid distribution on the sidewalls 122 of the furrow 110 above the seeds 112. The diverter 218 includes an integrated upper outlet 220 and an integrated lower outlet 222 in fluid connection with an integrated supply channel 224 which is adapted to be fluidly coupled with the liquid supply hose (not shown). The rearward portion of the diverter is insertable into the eyelet 198c and thereby is connected with the extension 118. As shown and described above, the liquid distribution apparatus 100 extends through the rearward most eyelet 198b of the extension. Rather than connecting directly with the liquid supply hose as shown above, the liquid distribution apparatus 200 plugs into one of the two outlets 220, 222 of the diverter which supplies liquid to the liquid distribution apparatus 100.

The farmer may then through the use of plugs 216 configure the device 218 for distribution of liquid directly into the furrow 110 (by plugging the outlets of the liquid distribution apparatus 100, and leaving the outlet not occupied by the liquid distribution apparatus unplugged) or configure the device for distribution of liquid on the sidewalls 122 of the furrow 110 (by plugging the outlet not occupied by the liquid distribution apparatus, and leaving the outlets 202a, 202b of the liquid distribution apparatus unplugged).

Referring to FIG. 24 an alternative embodiment of a diverter 218 for use, in one example, in conjunction with the two outlet embodiment of the liquid distribution apparatus 100. FIG. 25 is a front view of the diverter 218 illustrated in FIG. 24; and FIG. 26 is a side view of the diverter 218 illustrated in FIG. 24. The diverter 218 may be used to configure the two outlet embodiment of the liquid distribution apparatus 100 for either on-seed liquid distribution, or liquid distribution on the sidewalls 122 of the furrow 110 above the seeds 112. The diverter 218 includes an upper distribution tube 220 and a lower distribution tube 222 in fluid connection with a supply tube 224 which is adapted to be fluidly coupled with the liquid supply hose (not shown). The rearward portion of the diverter is insertable into the eyelet 198c and thereby is connected with the extension 118. As shown and described above, the liquid distribution apparatus 100 extends through the rearward most eyelet 198b of the extension 118. Rather than connecting directly with the liquid supply hose as shown above, the liquid distribution apparatus plugs into one of the two liquid distribution tubes 220, 222 of the diverter 218 which supplies liquid 114 to the liquid distribution apparatus 100.

The farmer may then, through the use of plugs 216, configure the device for distribution of liquid directly into the furrow 110 (by plugging the outlets of the liquid distribution apparatus, and leaving the liquid distribution tube not occupied by the liquid distribution apparatus unplugged) or configure the device for distribution of liquid on the sidewalls 122 of the furrow 110 (by plugging the liquid distribution tube not occupied by the liquid distribution apparatus, and leaving the outlets 202a, 202b of the liquid distribution apparatus unplugged).

Figure 27:
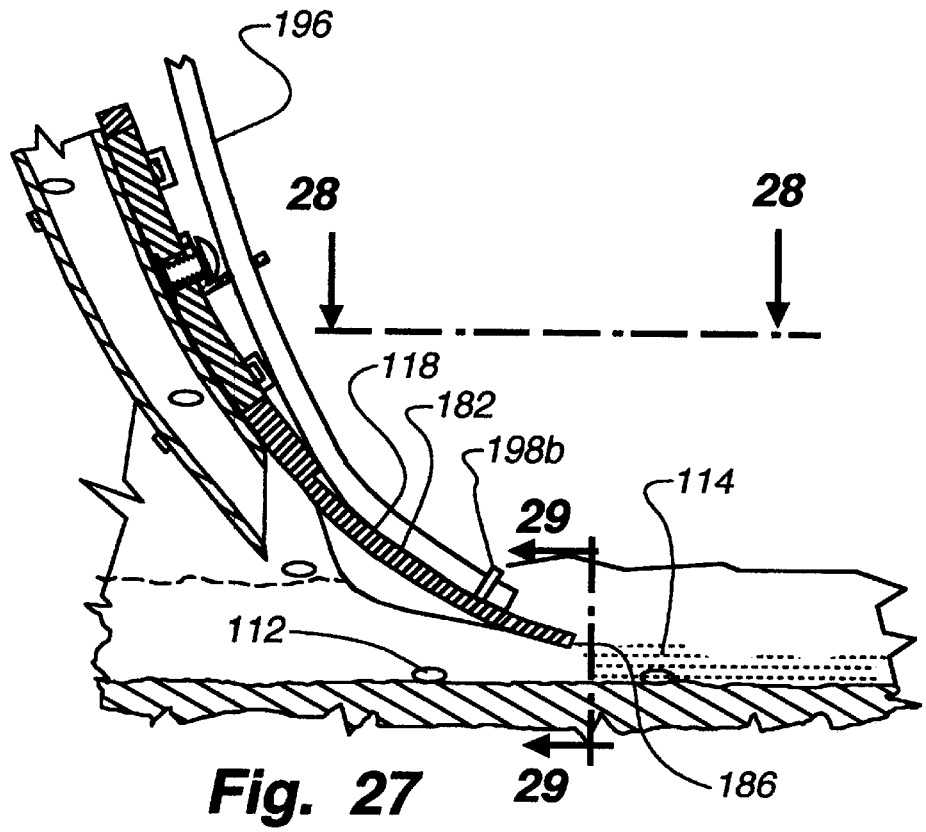
FIG. 27 is a side view of a seed tube, one embodiment of an extension for reducing seed bounce, and a liquid supply hose, with a single outlet liquid distribution apparatus connected to the liquid supply hose and fixed to the extension, the outlet being forward of the trailing end of the extension so that the liquid disperses over the top of the extension and into the furrow.
Figure 28:
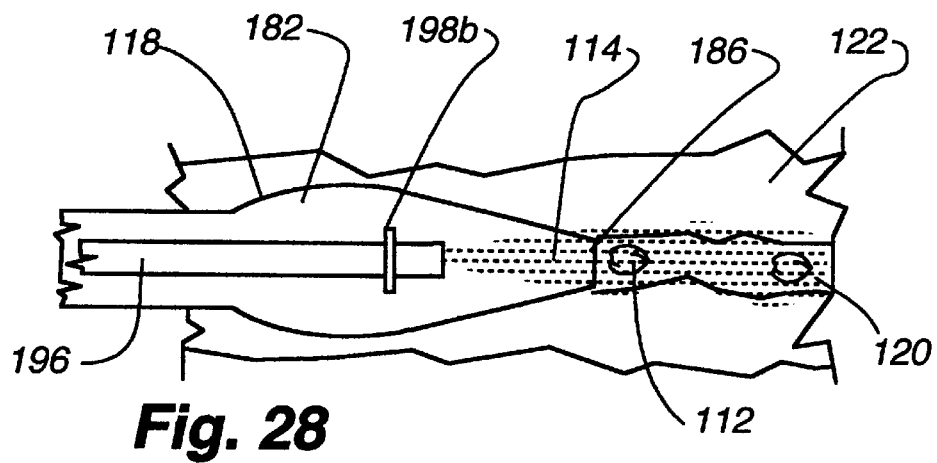
FIG. 28 is a section view taken along line 28—28 of FIG. 27, illustrating the dispersion of the liquid across the vertex of the furrow and extending partially up the sidewalls of the furrow.
Figure 29:
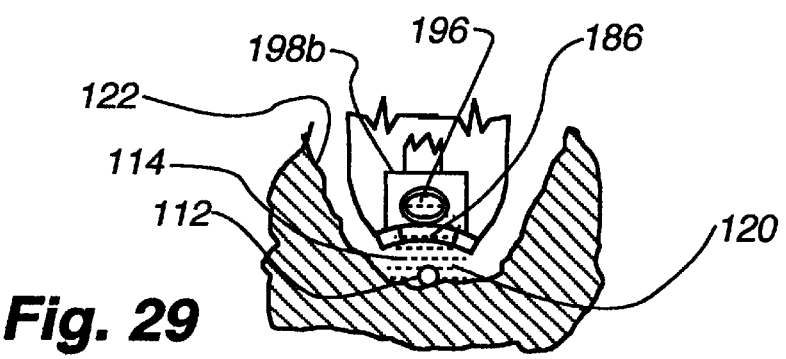
FIG. 29 is a section view taken along line 29—29 of FIG. 27, illustrating the dispersion of liquid across the vertex of the furrow and extending partially up the sidewall of the furrow.

FIGS. 27–29 illustrate an alternative embodiment of the present invention wherein the liquid tube 196 extends along the length of the extension 118, nearly to the trailing end 186 of the extension, but not past the end of the extension 118. Preferably, the end of the tube is placed on the longitudinal centerline of the extension 118. In this embodiment, the liquid 114 flowing from the tube 196 spreads out over the surface 182 of the extension 118 and flows into the furrow 110. The upwardly convex shape of the upper surface 182 of the extension 118 causes the liquid flowing from the tube 196 to spread out fairly evenly in about a 180-degree radius from the end of the tube 196, depending on the pressure that the fluid is flowing out of the tube. Under fairly low-pressure conditions, if the tube is placed very near the trailing end 186 of the extension 118, then fluid will flow unto both sidewalls 112 of the furrow 110 and into the vertex 120 of the furrow 110. In contrast, if the end of the tube is placed toward the middle or widest point of the extension 118, then the vast majority of the fluid 114 flowing from the tube is deposited on the sidewalls 122 of the furrow 110.

The width of the extension 118 narrows along its length from about its midpoint to the trailing end 186. Accordingly, at the widest point of the extension the fluid is distributed well above the vertex 120 of the furrow 110. Whereas, at the trailing end 186 of the extension 118 the fluid 114 is deposited primarily in the vertex 120 of the furrow 118. The amount of fluid deposited on the sidewalls 122, as compared to the amount deposited in the vertex 120 of the furrow 110, will change depending on the location of the end of the tube 196a long the length of the extension 118 and the pressure at which the fluid 114 is flowing out of the tube 196.

Figure 30:
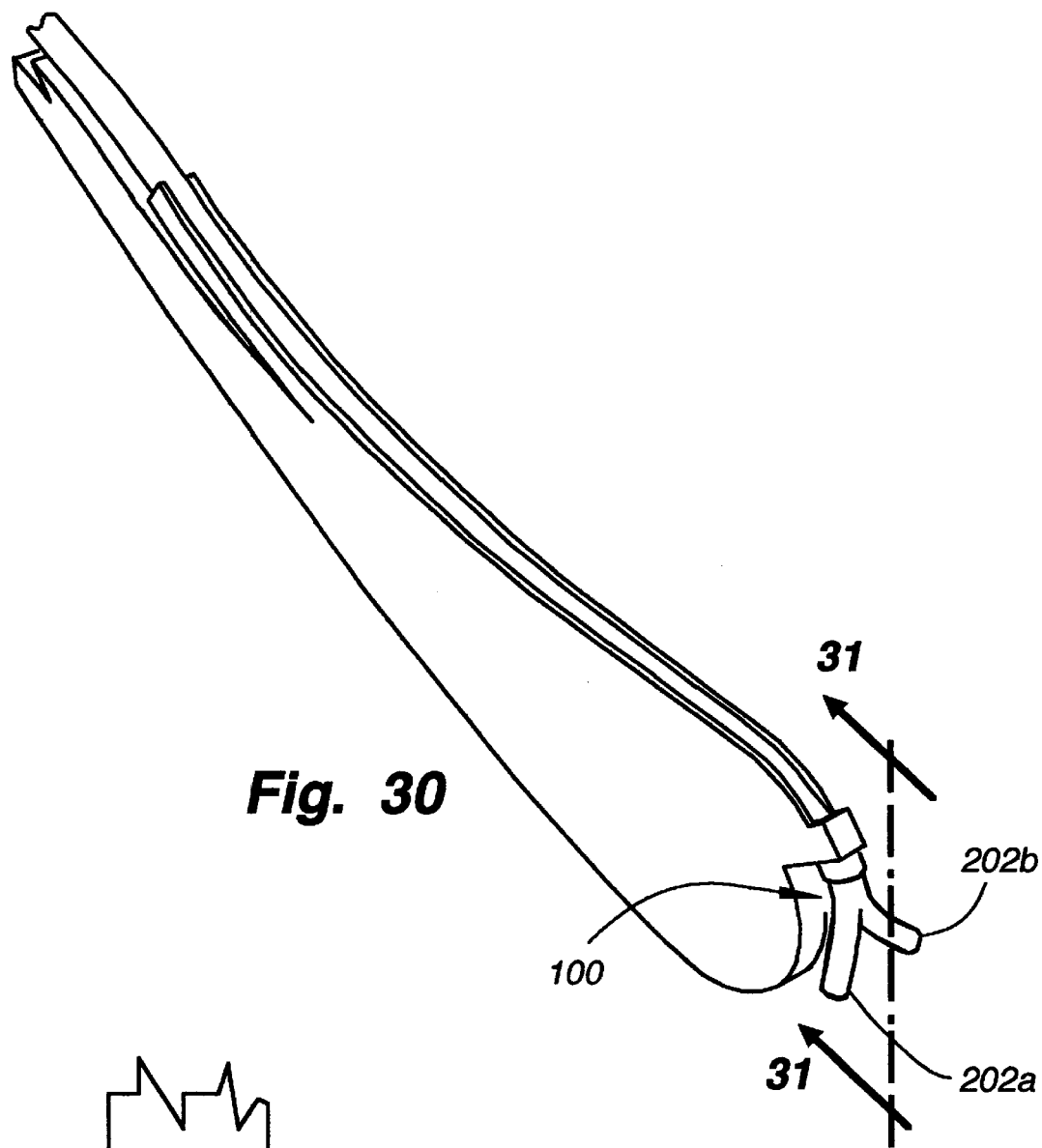
FIG. 30 is a perspective view of a seed firmer having a two outlet embodiment of the present invention connected therewith.
Figure 31:
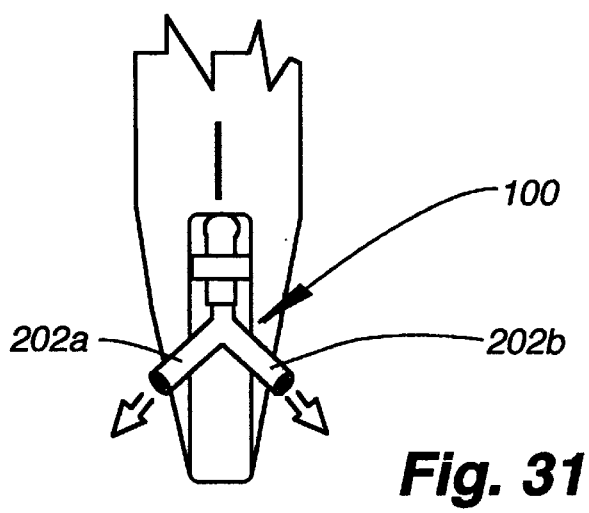
FIG. 31 is a section view taken along line 31—31 of FIG. 30.

FIGS. 30–31 illustrate a seed firming device such as the Keeton Seed Firmer™ with the two outlet embodiment of the liquid distribution apparatus 100 connected therewith. FIGS. 32–33c illustrate the seed firming device with the three outlet embodiment of the liquid distribution apparatus 100 connected therewith. During planting, the seed firmer generally drags behind the planter, drill or other implement in the furrow 110 contacting the bottom portion 120 of the furrow 110. In contacting the bottom portion of the furrow, the seed firmer contacts the seeds 112 that are in the bottom of the portion of the furrow and embeds the seeds in the dirt. The firmer includes an arm adapted to contact the seeds in the furrow during planting which is attached to the planter. The arm is adapted to contact the seeds in the furrow. It is envisioned that the various embodiments of the liquid distribution apparatus may be used with the seed firmer to distribute liquid in the furrow while the seed firmer is embedding the seeds in the furrow.

FIG. 34 illustrates is a perspective view of one embodiment of a plug used in connection with any of the above-described embodiments of a liquid distribution apparatus to reduce or eliminate the flow of liquid therefrom.

Figure 35A:
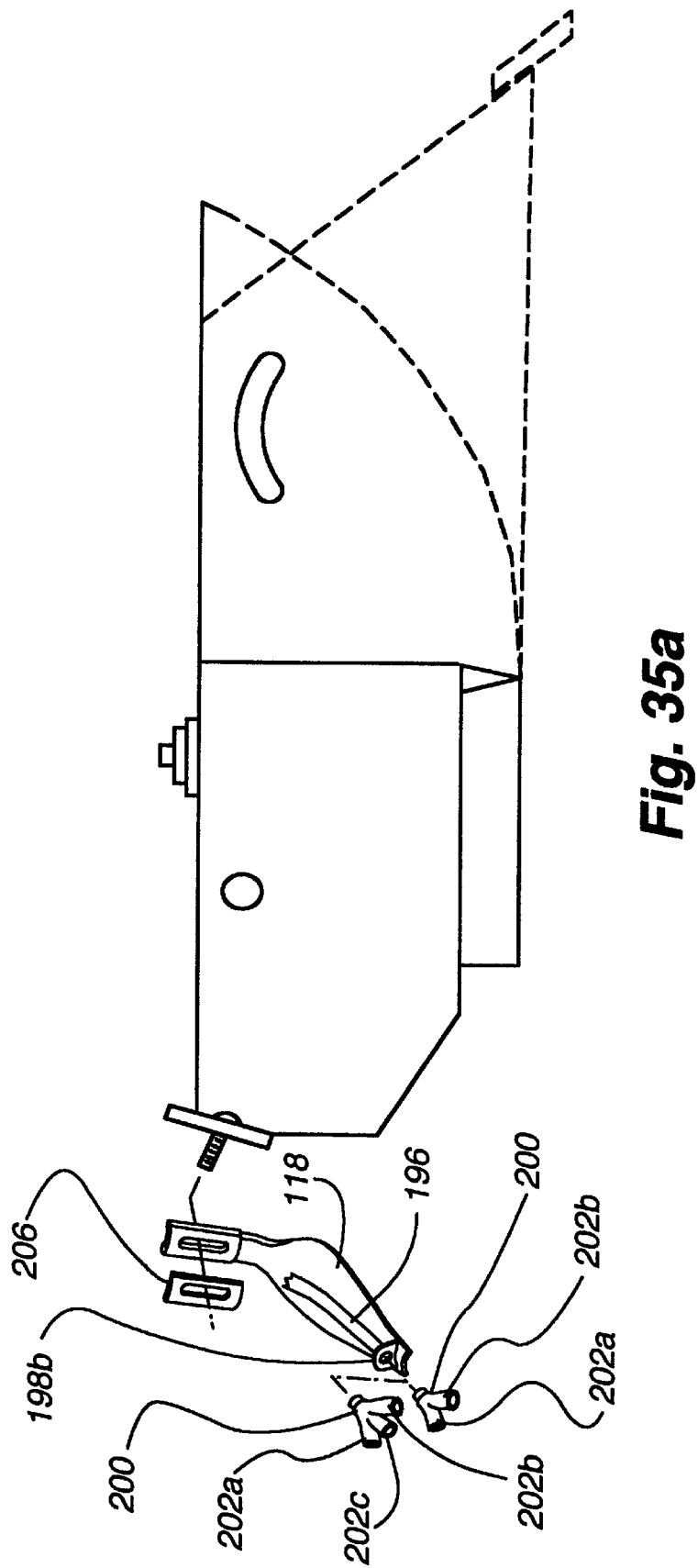
FIG. 35a illustrates an exploded perspective view of a Buffalo™ planter with one embodiment of an extension for reducing seed bounce attached thereto, the extension having an embodiment of the liquid distribution apparatus coupled therewith.
Figure 35B:
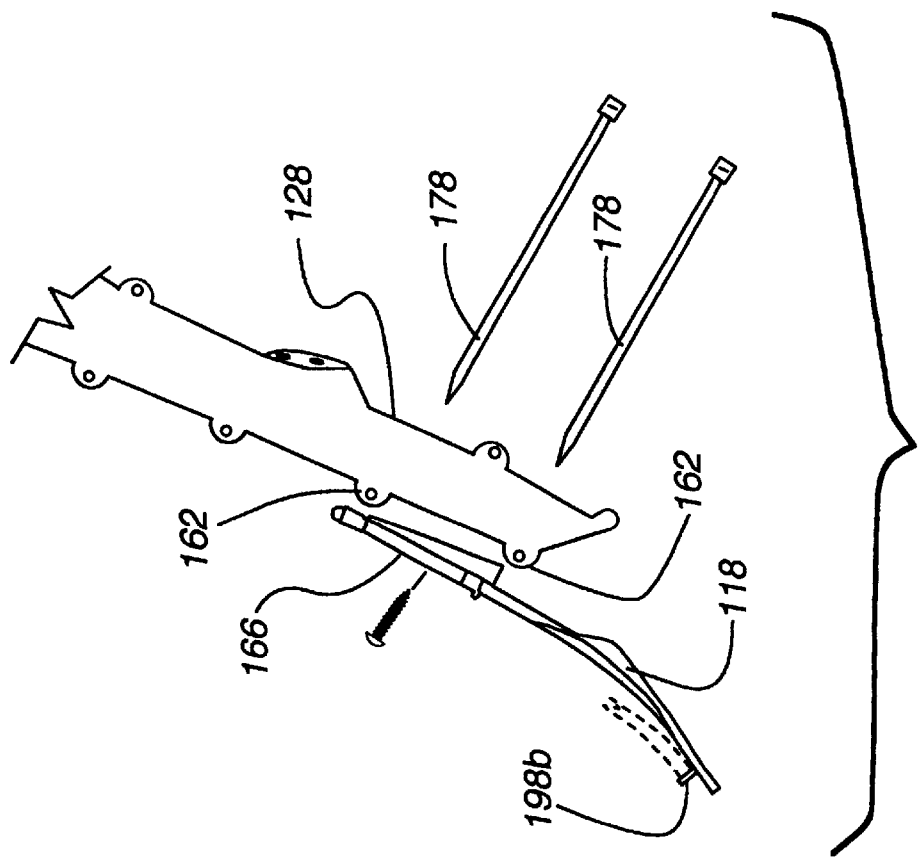
FIGS. 35b & 35b' illustrates an exploded perspective view of a Landoll Quadra™ planter with one embodiment of an extension for reducing seed bounce attached thereto, the extension having an embodiment of the liquid distribution apparatus of the present invention coupled therewith.
Figure 35B:
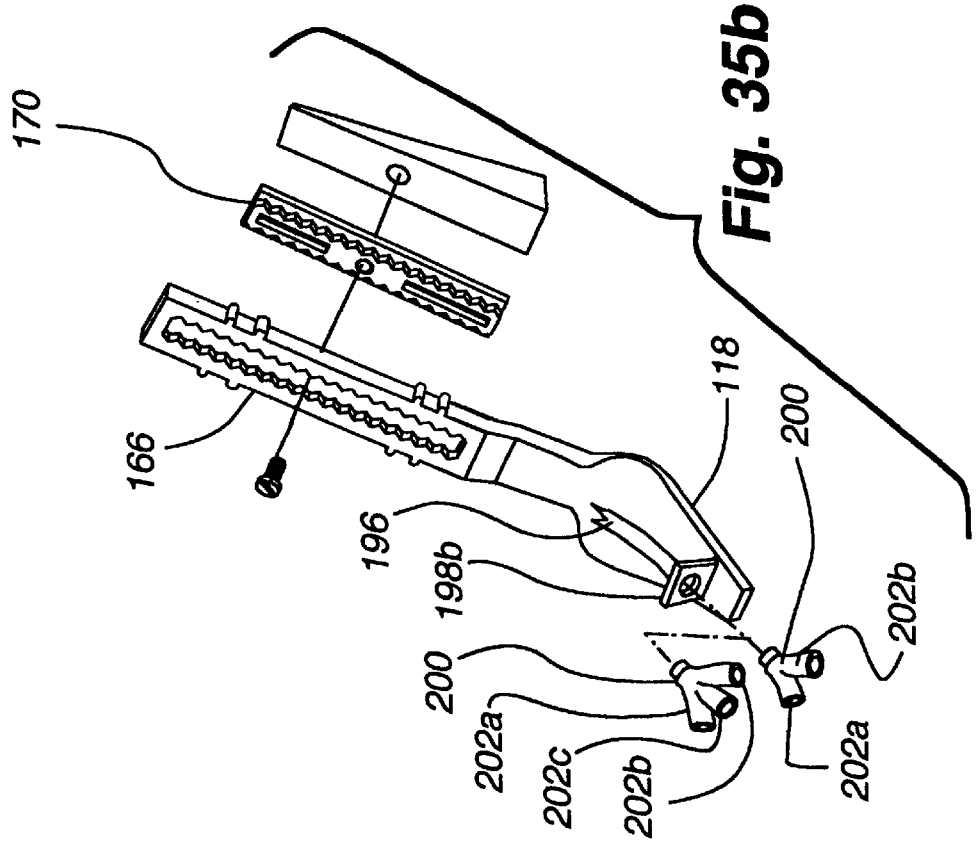
Figure 35C:
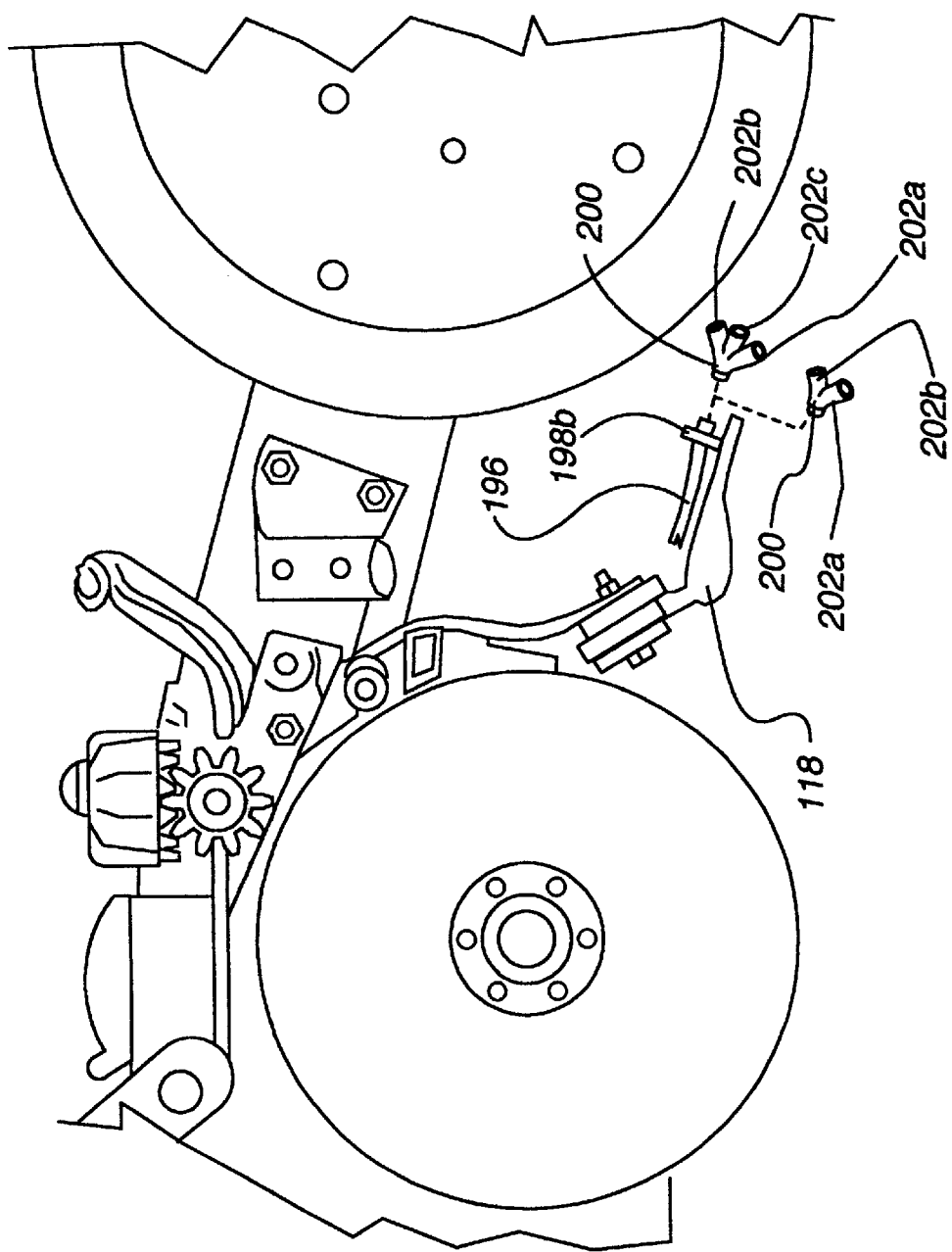
FIG. 35c illustrates a side view of a John Deere 71 Flex™ planter with one embodiment of an extension for reducing seed bounce attached thereto, the extension having an embodiment of the liquid distribution apparatus of the present invention coupled therewith.
Figure 35D:
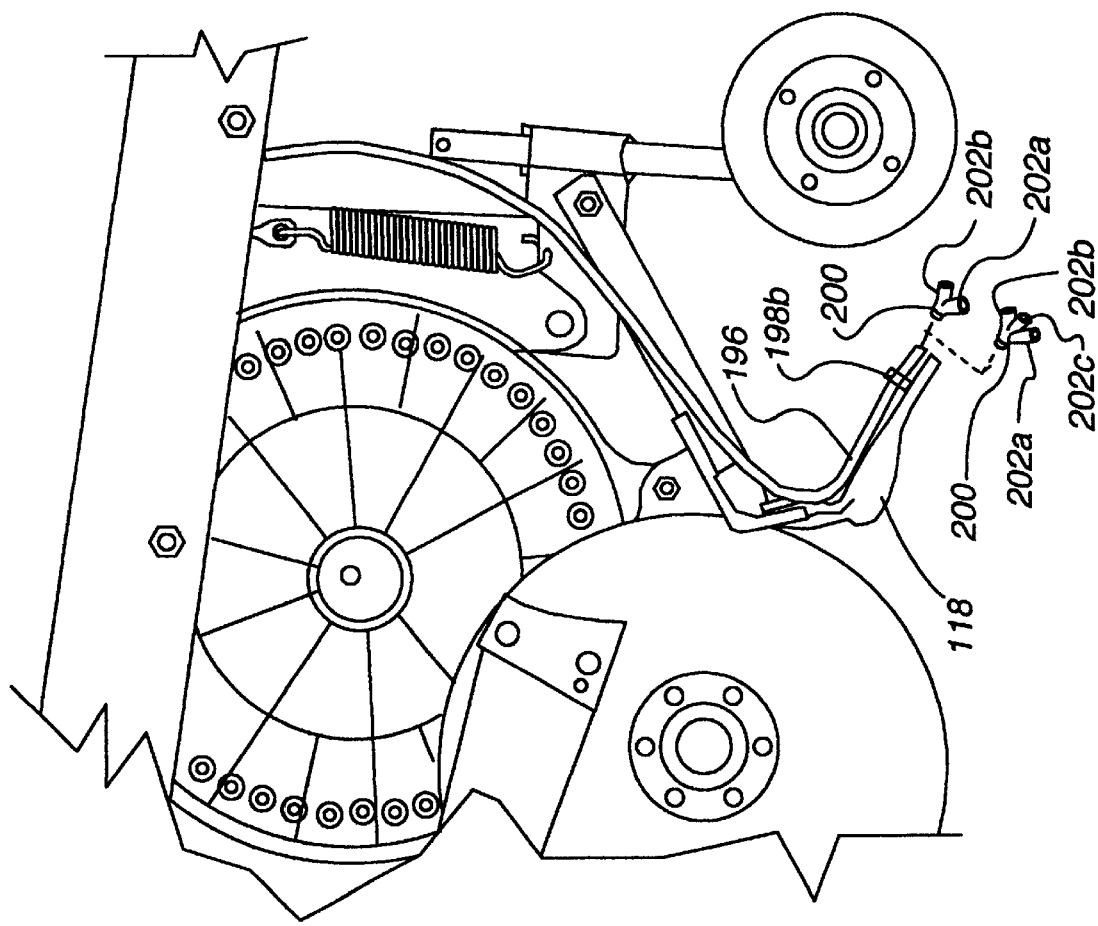
FIG. 35d illustrates a side view of an Allis Chalmers™ model 78 or 79 planter with one embodiment of an extension for reducing seed bounce attached thereto, the extension having an embodiment of the liquid distribution apparatus of the present invention coupled therewith.
Figure 35E:
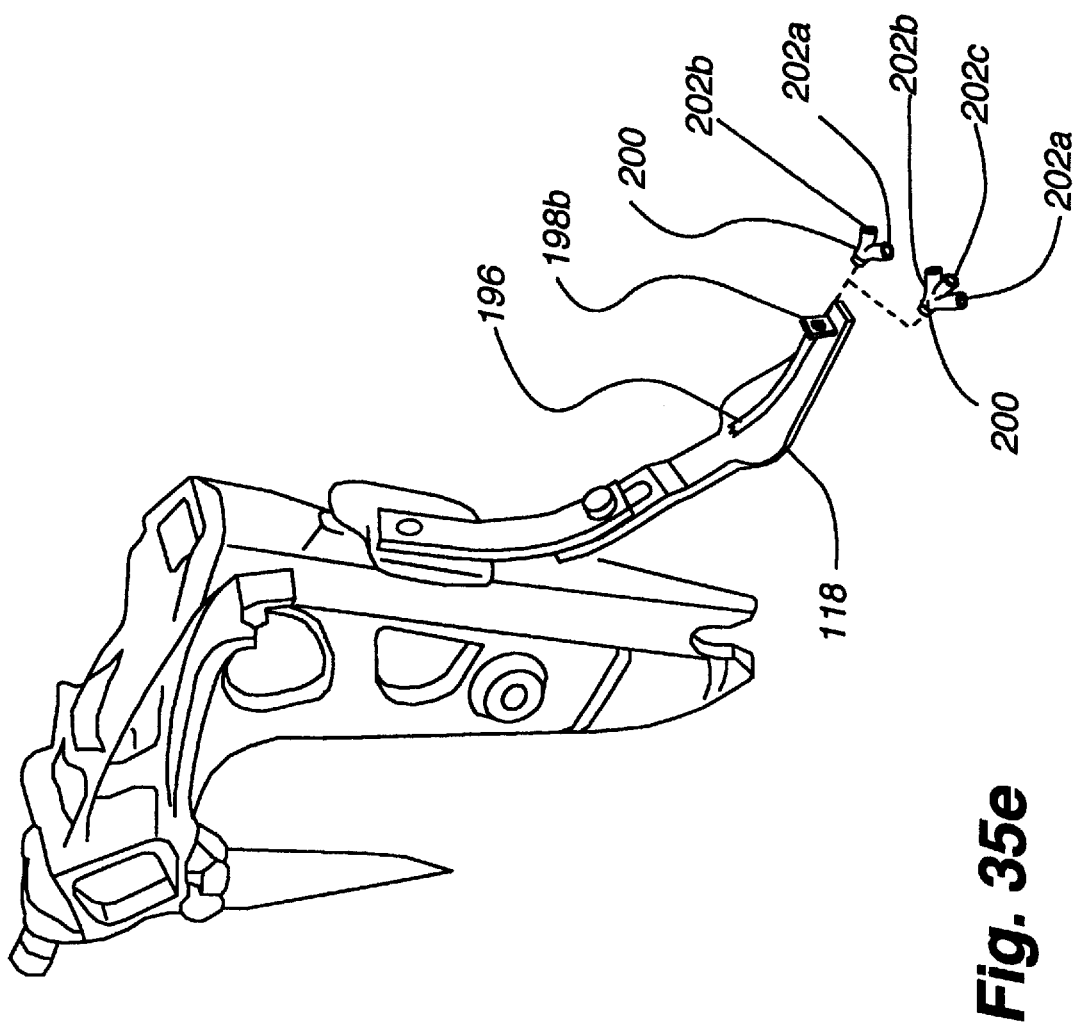
FIG. 35e illustrates a perspective view of Allis Chambers™ model 500 or 600 planter with one embodiment of an extension for reducing seed bounce attached thereto, the extension having an embodiment of the liquid distribution apparatus of the present invention coupled therewith.
Figure 35F:
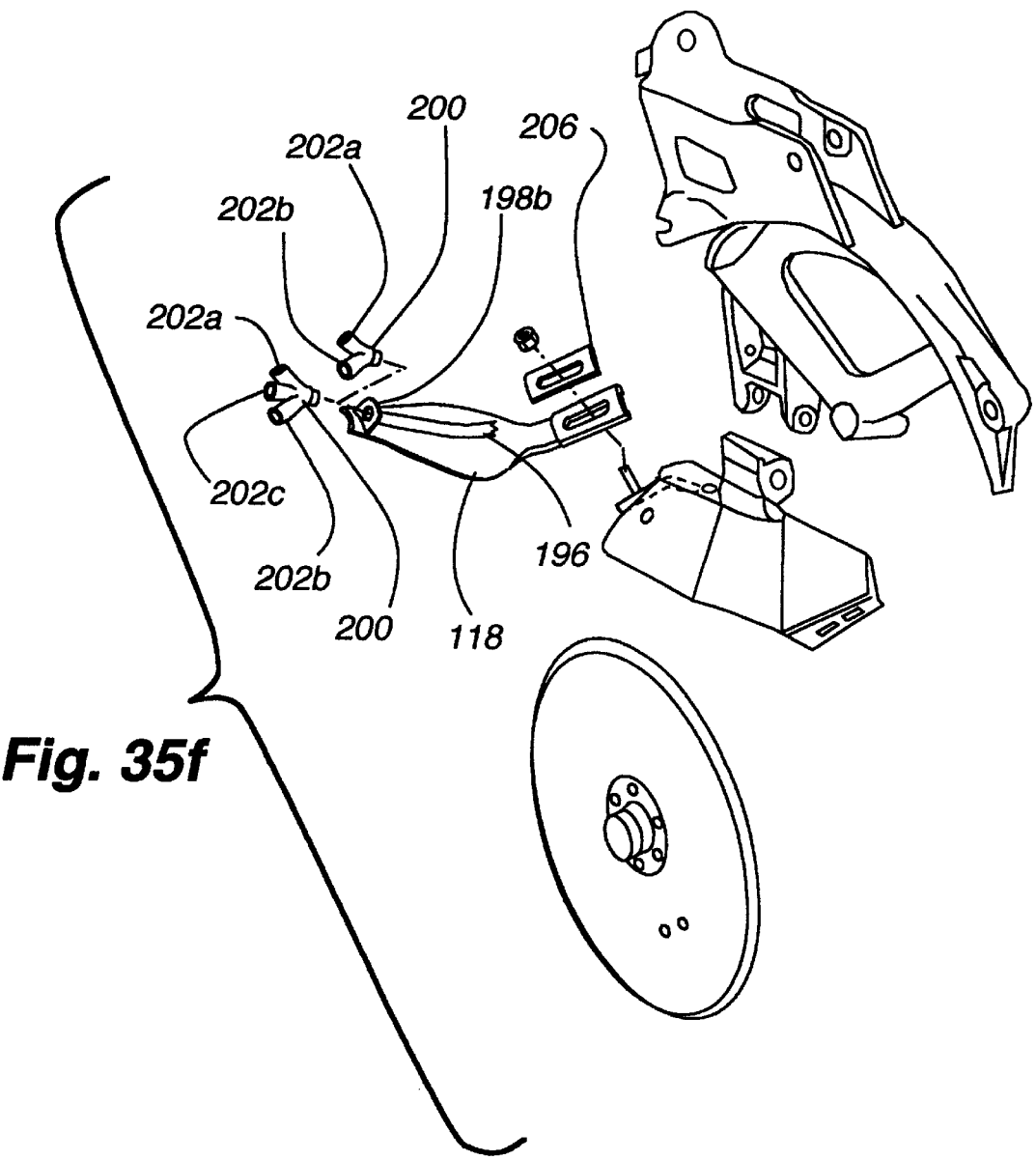
FIG. 35f illustrates an exploded perspective view of a Case IH™ model 400 or 500 planter having a boot with one embodiment of an extension for reducing seed bounce attached thereto, the extension having an embodiment of the liquid distribution apparatus of the present invention coupled therewith.
Figure 35G:
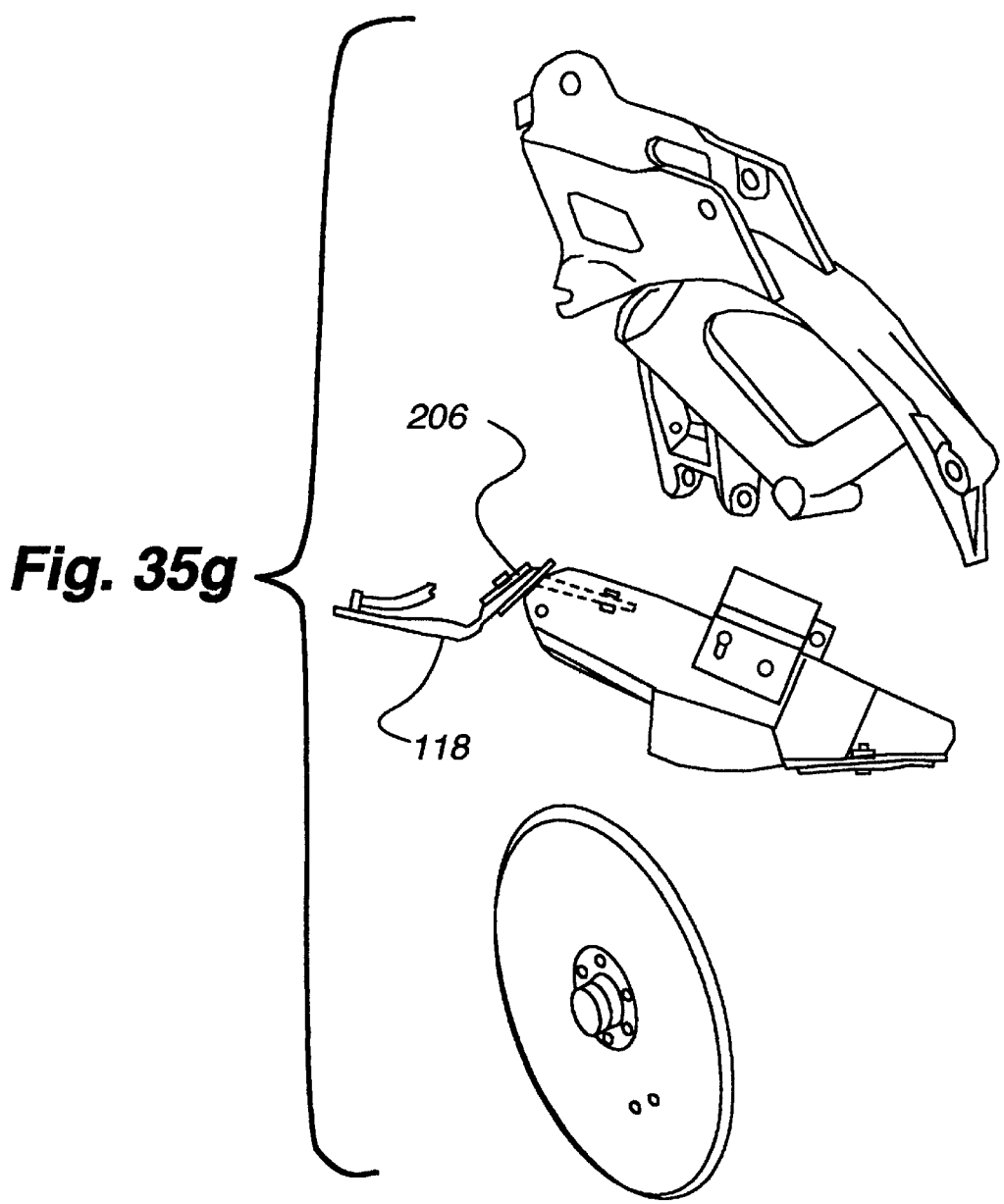
FIGS. 35g & 35g' illustrates an exploded view of a Case IH™ model 400 or 500 planter having an Acra-Plant boot with one embodiment of an extension for reducing seed bounce attached thereto, the extension having an embodiment of the liquid distribution apparatus of the present invention coupled therewith.
Figure 35G:
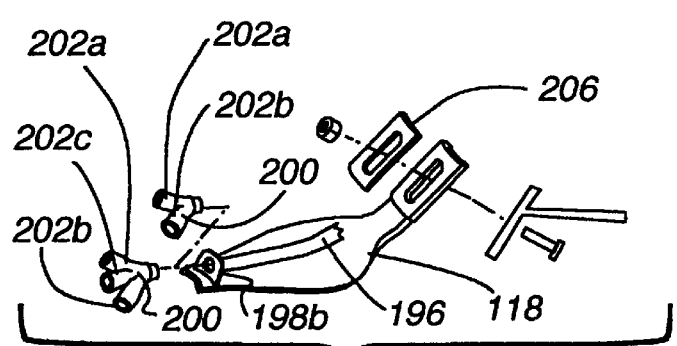
Figure 35I:
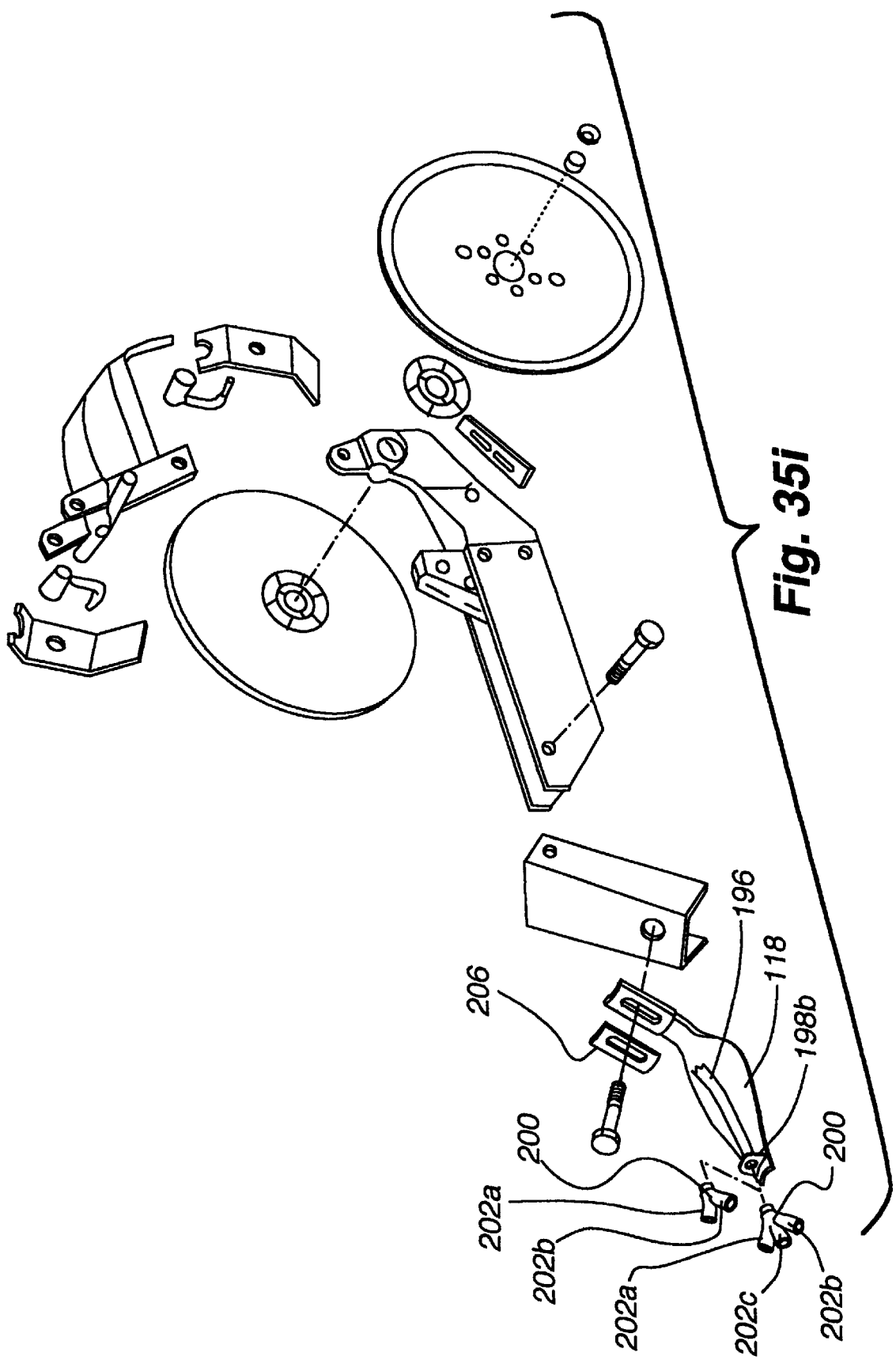
FIG. 35i illustrates and exploded view of a Case IH™ model 56 planter with one embodiment of an extension for reducing seed bounce attached thereto, the extension having an embodiment of the liquid distribution apparatus of the present invention coupled therewith.
Figure 35J:
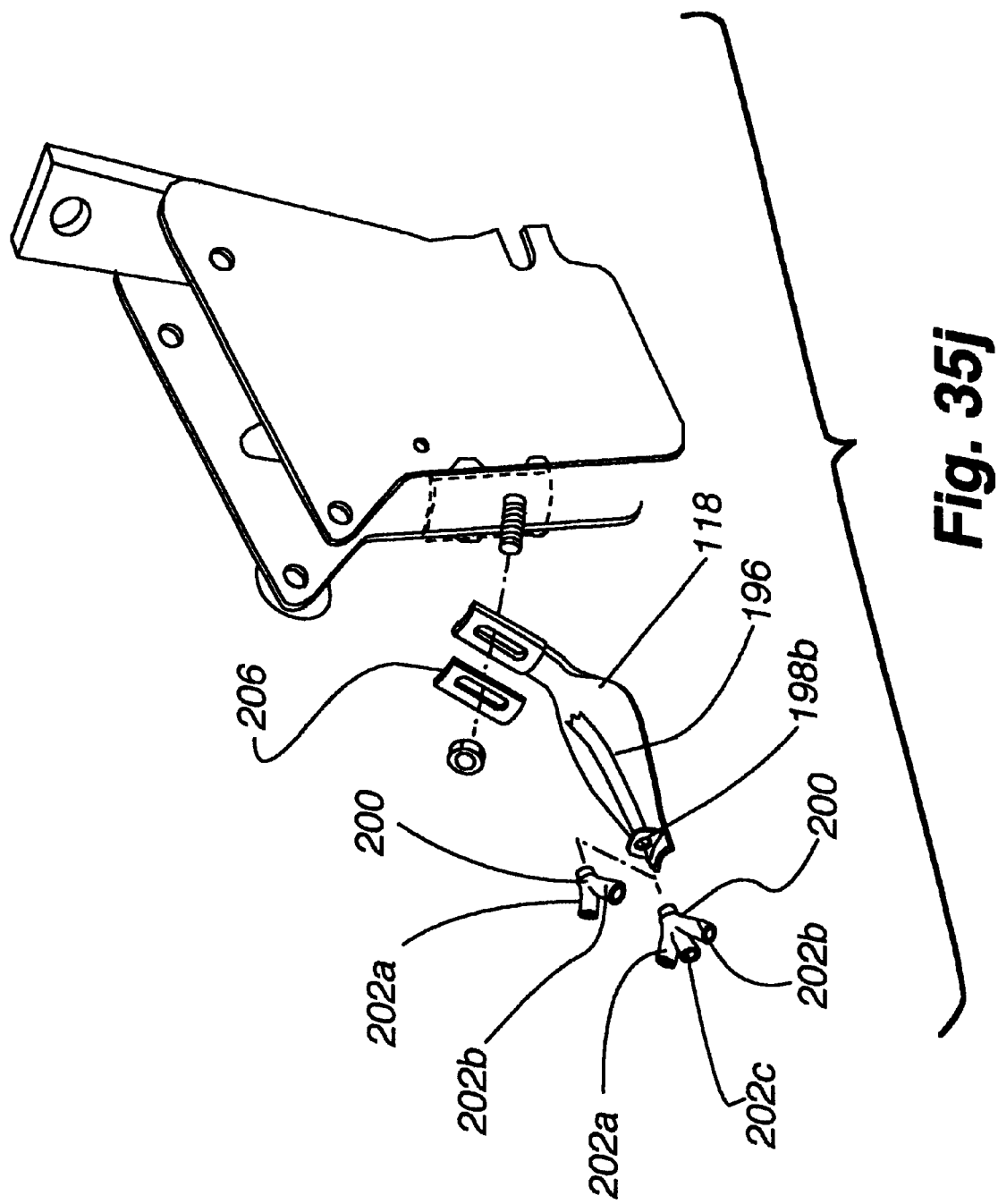
FIG. 35j illustrates an exploded view of a Case IH™ 1200 ASM planter with an embodiment of the liquid distribution apparatus of the present invention attached thereto.

Referring now to FIGS. 35a–35j various embodiment of the present invention are illustrated. FIG. 35a illustrates an exploded perspective view of a Buffalo™ planter with one embodiment of an extension for reducing seed bounce attached thereto. The extension, as shown, may have the two outlet or three outlet embodiment of the liquid distribution apparatus connected therewith. The liquid distribution apparatus being in fluid connection with the liquid supply hose. FIG. 35b illustrates an exploded perspective view of a Landoll Quadra™ planter with one embodiment of an extension for reducing seed bounce attached thereto. The extension, as shown, may have the two outlet or three outlet embodiment of the liquid distribution apparatus connected therewith. The liquid distribution apparatus being in fluid connection with the liquid supply hose. FIG. 35c illustrates a side view of a John Deere 71 Flex™ planter with one embodiment of an extension for reducing seed bounce attached thereto. The extension, as shown in FIG. 35c, may have the two outlet or three outlet embodiment of the liquid distribution apparatus connected therewith. The liquid distribution apparatus being in fluid connection with the liquid supply hose. FIG. 35d illustrates a side view of an Allis Chalmers™ model 78 or 79 planter with one embodiment of an extension for reducing seed bounce attached thereto. The extension, as shown in FIG. 35d, may have the two outlet or three outlet embodiment of the liquid distribution apparatus connected therewith. The liquid distribution apparatus being in fluid connection with the liquid supply hose. FIG. 35e illustrates a perspective view of Allis Chambers™ model 500 or 600 planter with one embodiment of an extension for reducing seed bounce attached thereto. The extension, as shown in FIG. 35e, may have the two outlet or three outlet embodiment of the liquid distribution apparatus connected therewith. The liquid distribution apparatus being in fluid connection with the liquid supply hose. FIG. 35f illustrates an exploded perspective view of a Case IH™ model 400 or 500 planter having a boot with one embodiment of an extension for reducing seed bounce attached thereto. The extension, as shown in FIG. 35f, may have the two outlet or three outlet embodiment of the liquid distribution apparatus connected therewith. The liquid distribution apparatus being in fluid connection with the liquid supply hose. FIG. 35g illustrates an exploded view of a Case IH™ model 400 or 500 planter having an Acra-Plant boot with one embodiment of an extension for reducing seed bounce attached thereto. The extension, as shown in FIG. 35f, may have the two outlet or three outlet embodiment of the liquid distribution apparatus connected therewith. The liquid distribution apparatus being in fluid connection with the liquid supply hose. FIG. 35h illustrates an exploded view of a Case IH™ 400 or 500 planter having an Acra-Plant runner with one embodiment of an extension for reducing seed bounce attached thereto. The extension, as shown in FIG. 35h, may have the two outlet or three outlet embodiment of the liquid distribution apparatus connected therewith. The liquid distribution apparatus being in fluid connection with the liquid supply hose. FIG. 35i illustrates and exploded view of a Case IH™ model 56 planter with one embodiment of an extension for reducing seed bounce attached thereto. The extension, as shown in FIG. 35i, may have the two outlet or three outlet embodiment of the liquid distribution apparatus connected therewith. The liquid distribution apparatus being in fluid connection with the liquid supply hose. FIG. 35j illustrates an exploded view of a Case IH™ 1200 ASM planter with an embodiment of the liquid distribution apparatus of the present invention attached thereto. The extension, as shown in FIG. 35j, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 35a–35j.

Figure 36A:
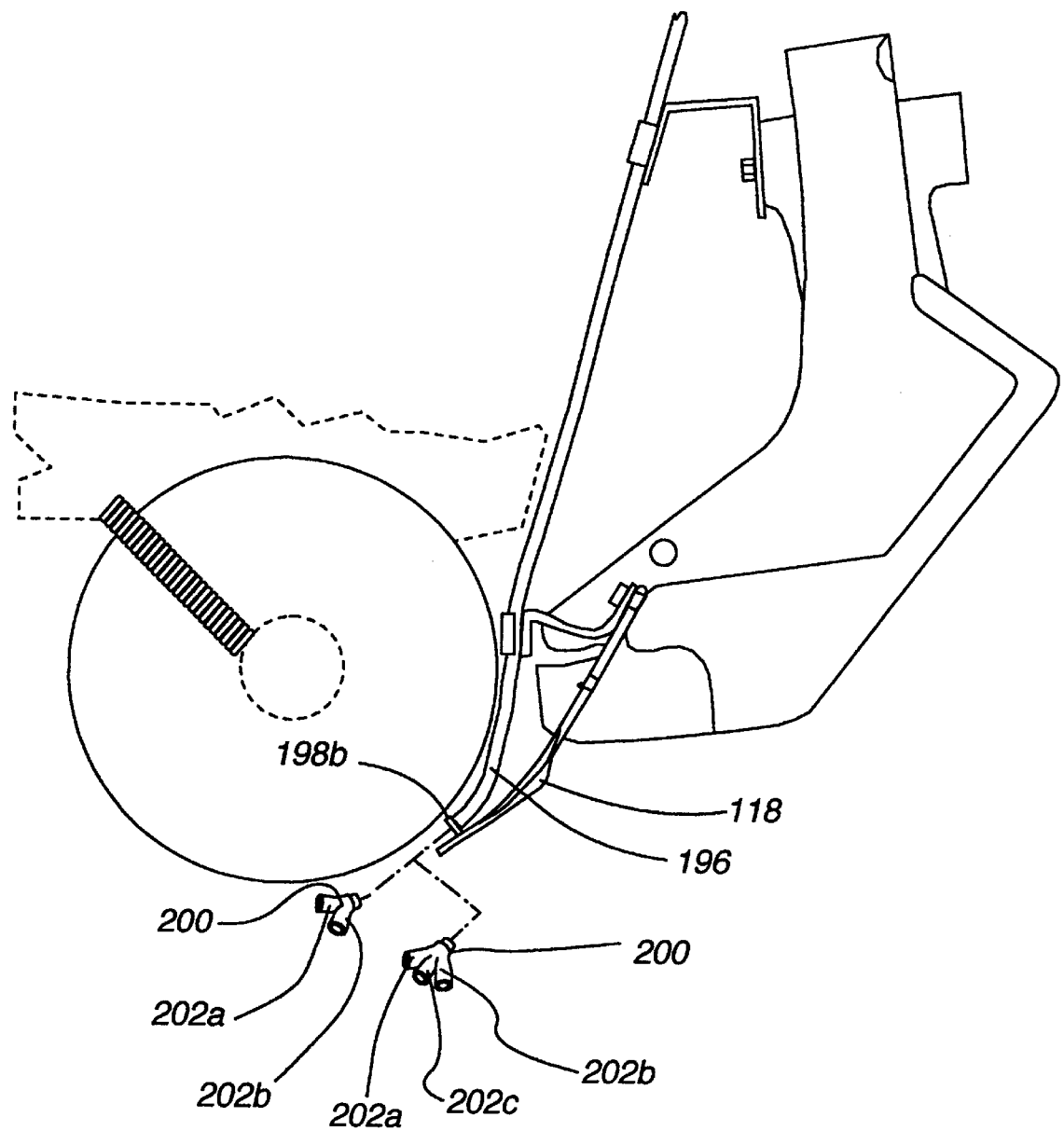
FIG. 36a illustrates a side view of a John Deere™ model 750 single disc drill with one embodiment of an extension for reducing seed bounce attached thereto, the extension having an embodiment of the liquid distribution apparatus of the present invention coupled therewith.
Figure 36B:
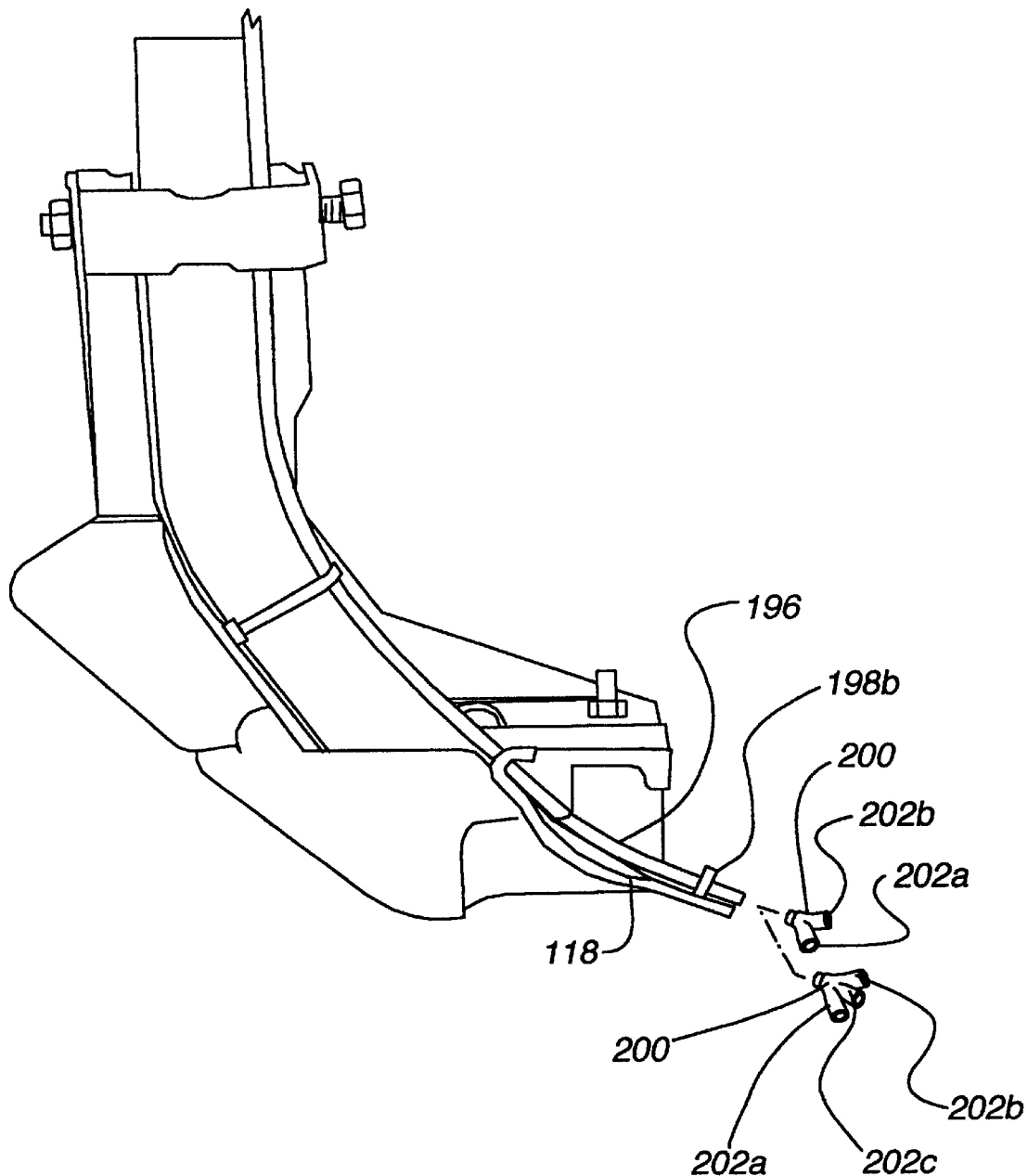
FIG. 36b illustrates a side view of a John Deere™ model 1560 or 1860 single disc drill with one embodiment of an extension for reducing seed bounce attached thereto, the extension having an embodiment of the liquid distribution apparatus of the present invention coupled therewith.
Figure 36C:
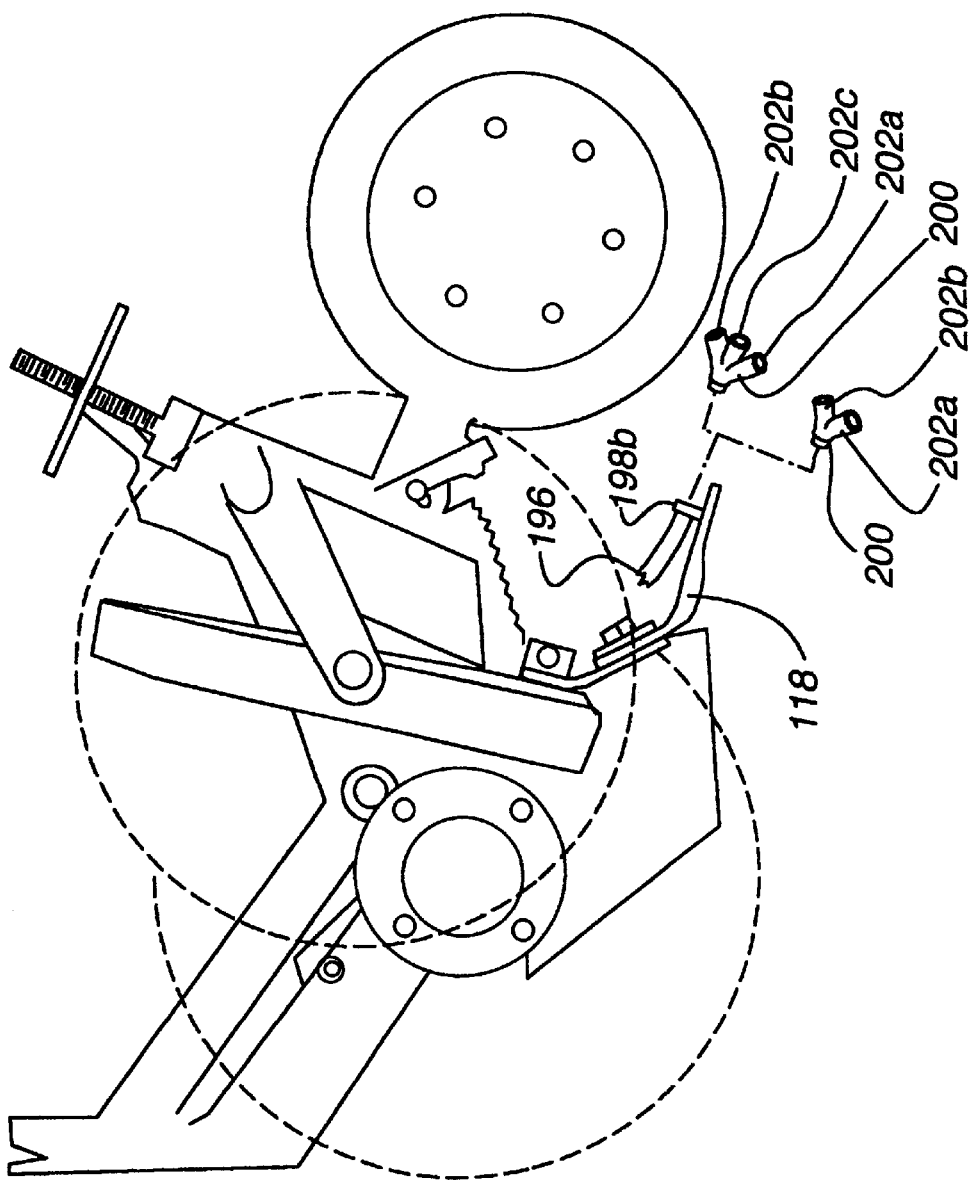
FIG. 36c illustrates a side view of a Flexi-Coil FSI™ single disc drill with one embodiment of an extension for reducing seed bounce attached thereto, the extension having an embodiment of the liquid distribution apparatus of the present invention coupled therewith.

Referring now to FIGS. 36a–36c various embodiments of the present invention are illustrated with single disc drills. FIG. 36a illustrates a side view of a John Deere™ model 750 single disc drill with one embodiment of an extension for reducing seed bounce attached thereto. The extension, as shown in FIG. 36a, may have the two outlet or three outlet embodiment of the liquid distribution apparatus connected therewith. The liquid distribution apparatus being in fluid connection with the liquid supply hose. FIG. 36b illustrates a side view of a John Deere™ model 1560 or 1860 single disc drill with one embodiment of an extension for reducing seed bounce attached thereto. The extension, as shown in FIG. 36b, may have the two outlet or three outlet embodiment of the liquid distribution apparatus connected therewith. The liquid distribution apparatus being in fluid connection with the liquid supply hose. FIG. 36c illustrates a side view of a Flexi-Coil FSI™ single disc drill with one embodiment of an extension for reducing seed bounce attached thereto. The extension, as shown in FIG. 36c, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 36a–36c.

Figure 37A:
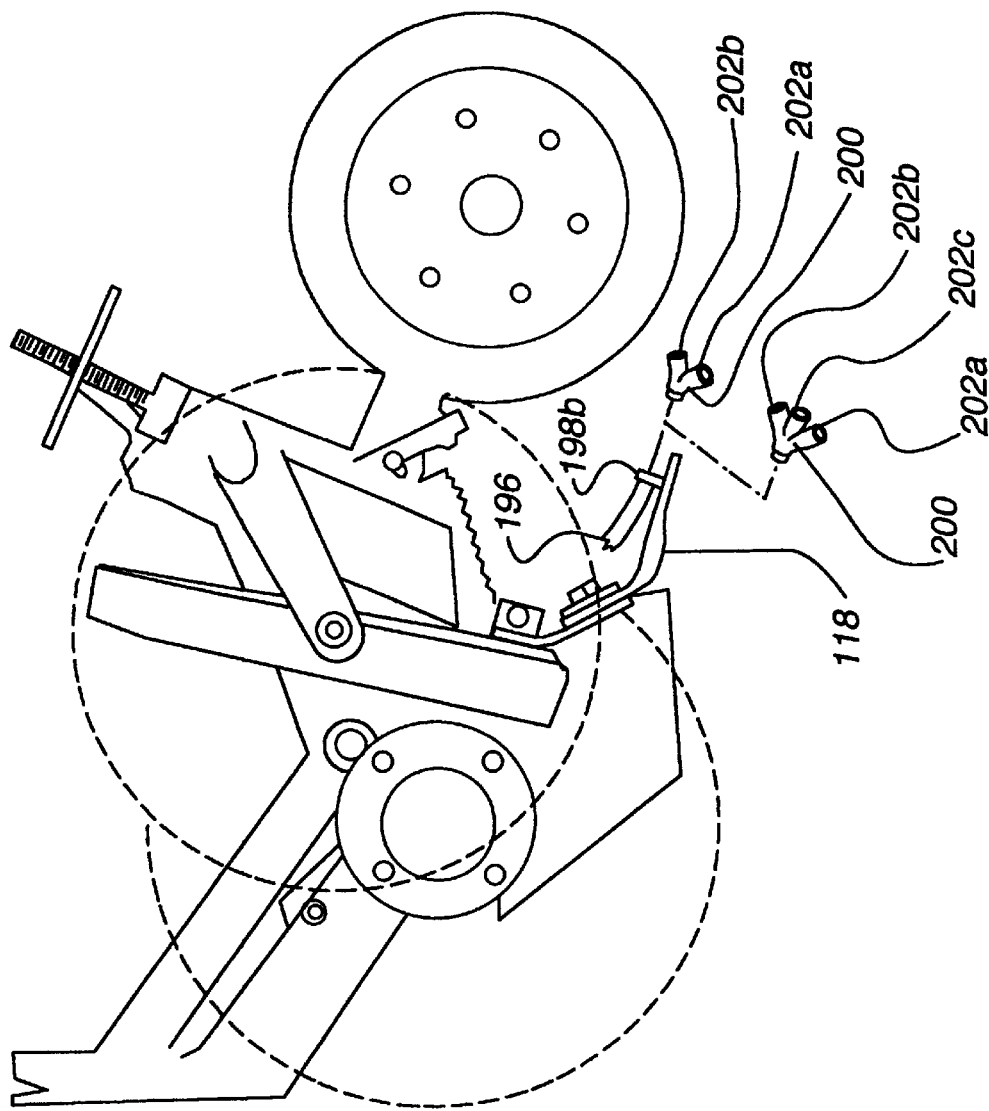
FIG. 37a illustrates a side view of a FSO™ single disc opener with one embodiment of an extension for reducing seed bounce attached thereto, the extension having an embodiment of the liquid distribution apparatus of the present invention coupled therewith.
Figure 37B:
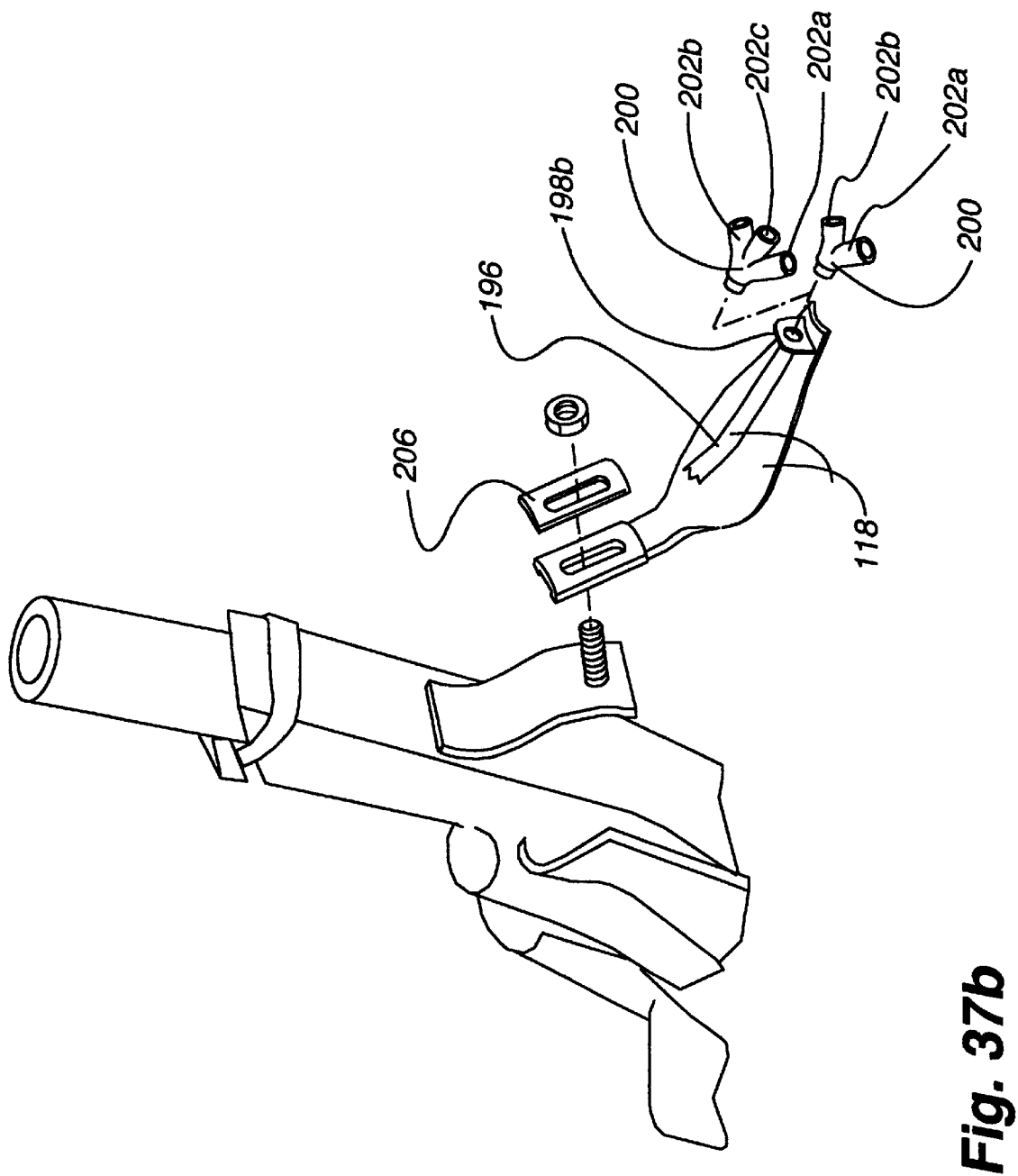
FIG. 37b illustrates a side view of a banding and spreading boot with an embodiment of the liquid distribution apparatus of the present invention attached theretwith.
Figure 37C:
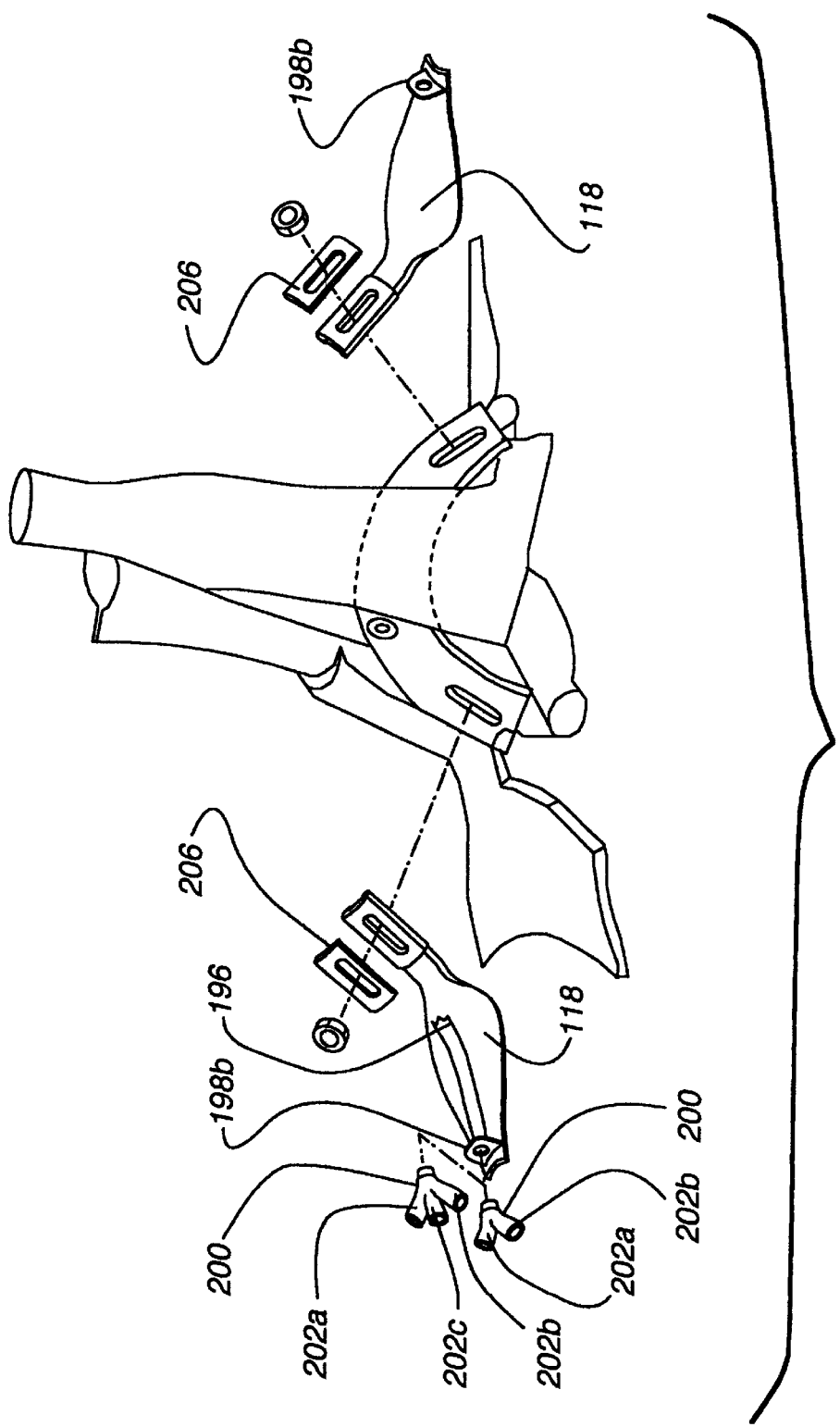
FIG. 37c illustrates a side view of a paired row boot having a shoe with one embodiment of an extension for reducing seed bounce attached thereto, the extension having an embodiment of the liquid distribution apparatus of the present invention coupled therewith.
Figure 37D:
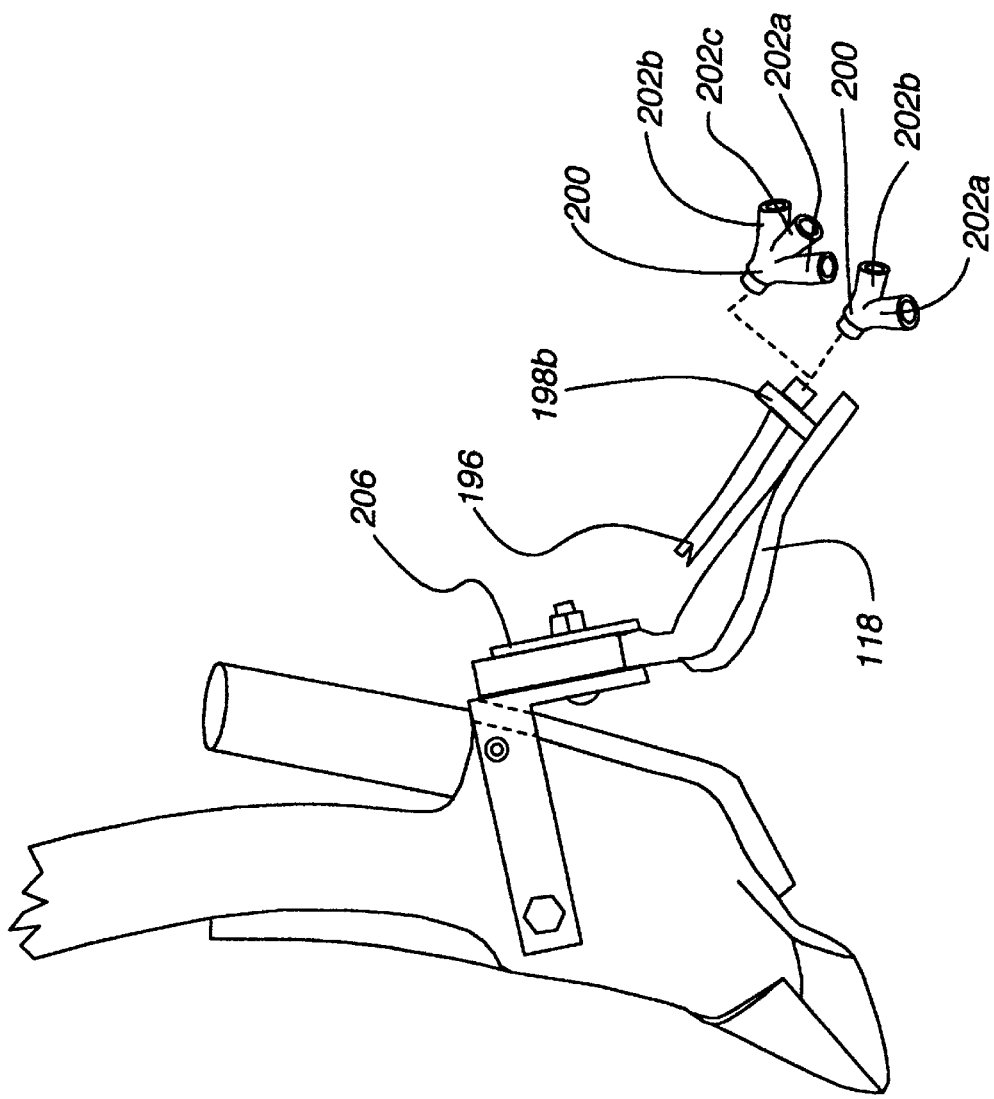
FIG. 37d illustrates a side view of an eagle beak having a boot with one embodiment of an extension for reducing seed bounce attached thereto, the extension having an embodiment of the liquid distribution apparatus of the present invention coupled therewith.

Referring now to FIGS. 37a–37d various embodiment of the present invention are illustrated with various single disc openers. FIG. 37a illustrates a side view of a FSO™ single disc opener with one embodiment of an extension for reducing seed bounce attached thereto. The extension, as shown in FIG. 37a, may have the two outlet or three outlet embodiment of the liquid distribution apparatus connected therewith. The liquid distribution apparatus being in fluid connection with the liquid supply hose. FIG. 37b illustrates a side view of a banding and spreading boot with an embodiment of the liquid distribution apparatus of the present invention attached theretwith. The extension, as shown in FIG. 37b, may have the two outlet or three outlet embodiment of the liquid distribution apparatus connected therewith. The liquid distribution apparatus being in fluid connection with the liquid supply hose. FIG. 37c illustrates a side view of a paired row boot having a shoe with one embodiment of an extension for reducing seed bounce attached thereto. The extension, as shown in FIG. 37c, may have the two outlet or three outlet embodiment of the liquid distribution apparatus connected therewith. The liquid distribution apparatus being in fluid connection with the liquid supply hose. FIG. 37d illustrates a side view of an eagle beak having a boot with one embodiment of an extension for reducing seed bounce attached thereto. The extension, as shown in FIG. 37d, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 37a–37d.

Figure 38A:
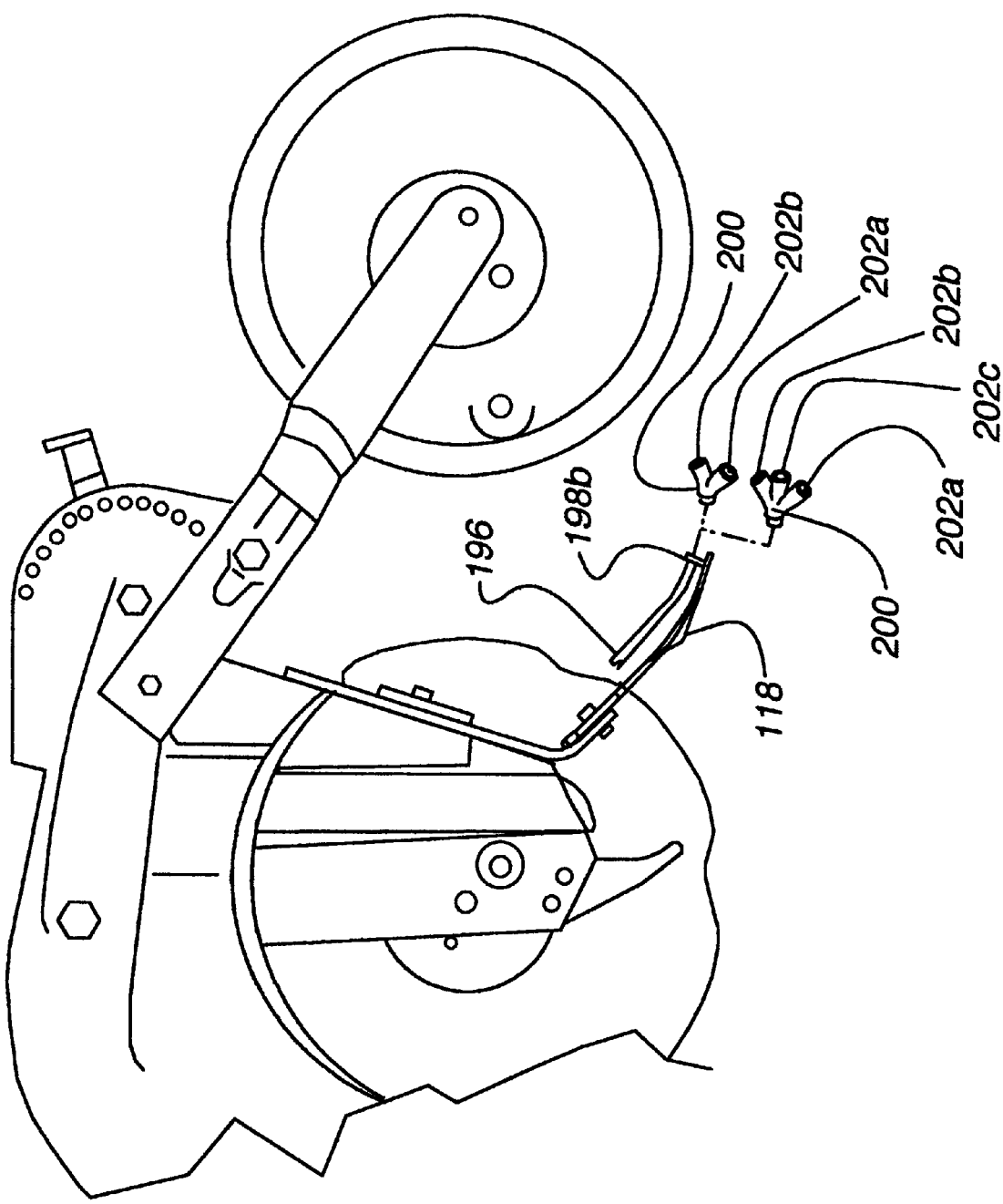
FIG. 38a illustrates a side view of a Krause™ model 5400 double disc drill with one embodiment of an extension for reducing seed bounce attached thereto, the extension having an embodiment of the liquid distribution apparatus of the present invention coupled therewith.
Figure 38B:
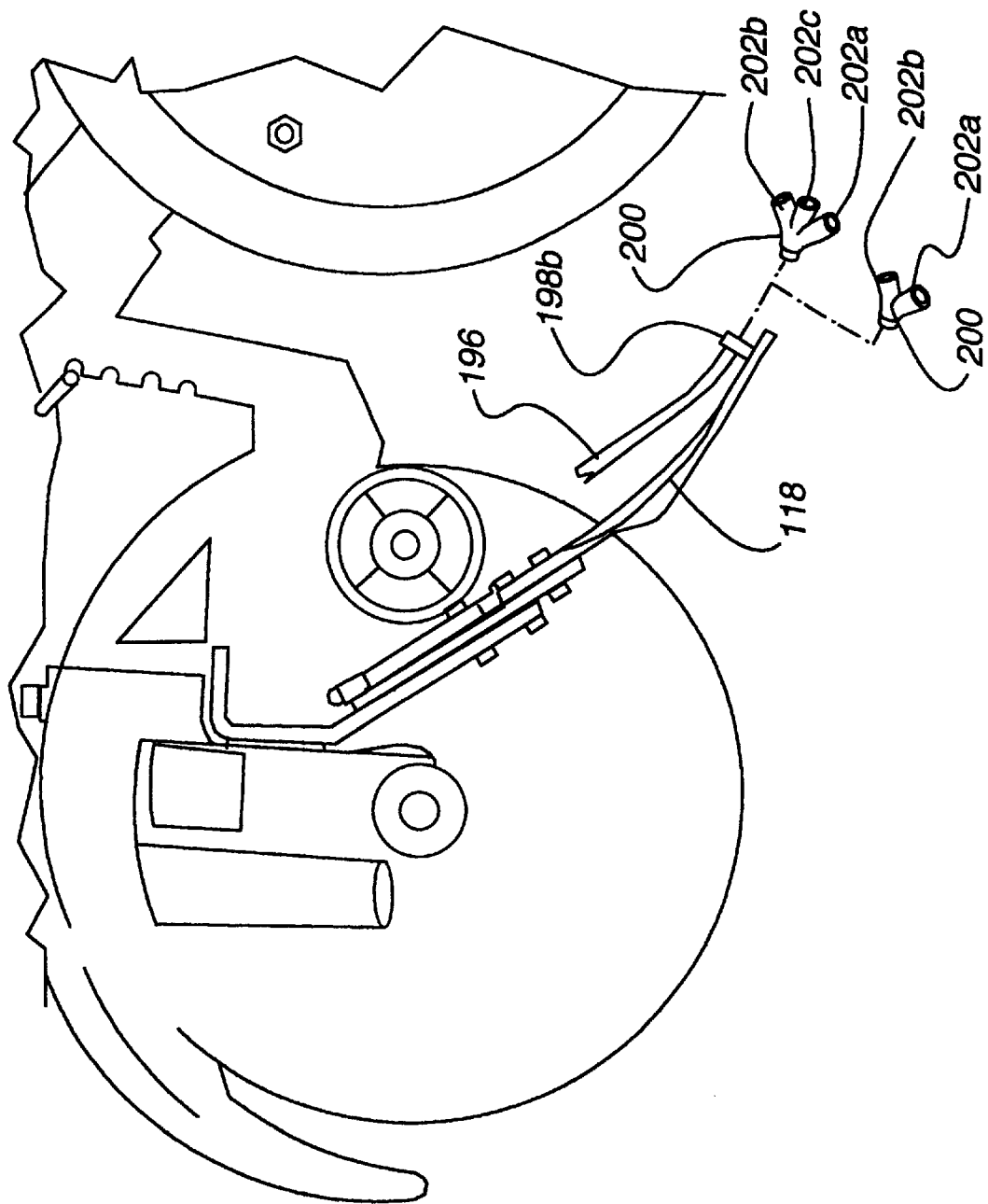
FIG. 38b illustrates a side view of a Krause™ model 5200, 5250 or 5500 double disc drill with one embodiment of an extension for reducing seed bounce attached thereto, the extension having an embodiment of the liquid distribution apparatus of the present invention coupled therewith.
Figure 38C:
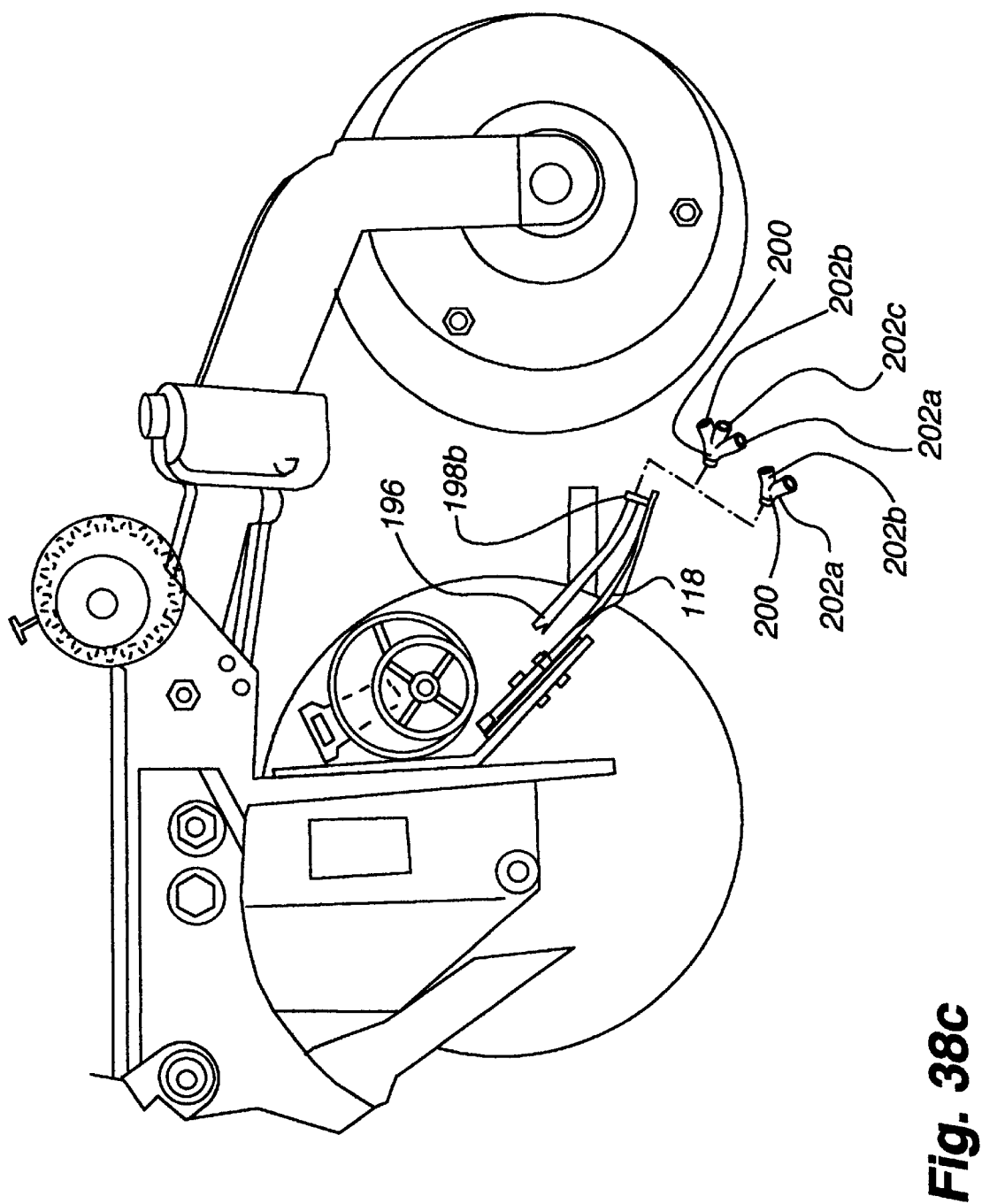
FIG. 38c illustrates a side view of a Sunflower™ double disc drill with one embodiment of an extension for reducing seed bounce attached thereto, the extension having an embodiment of the liquid distribution apparatus of the present invention coupled therewith.
Figure 38D:
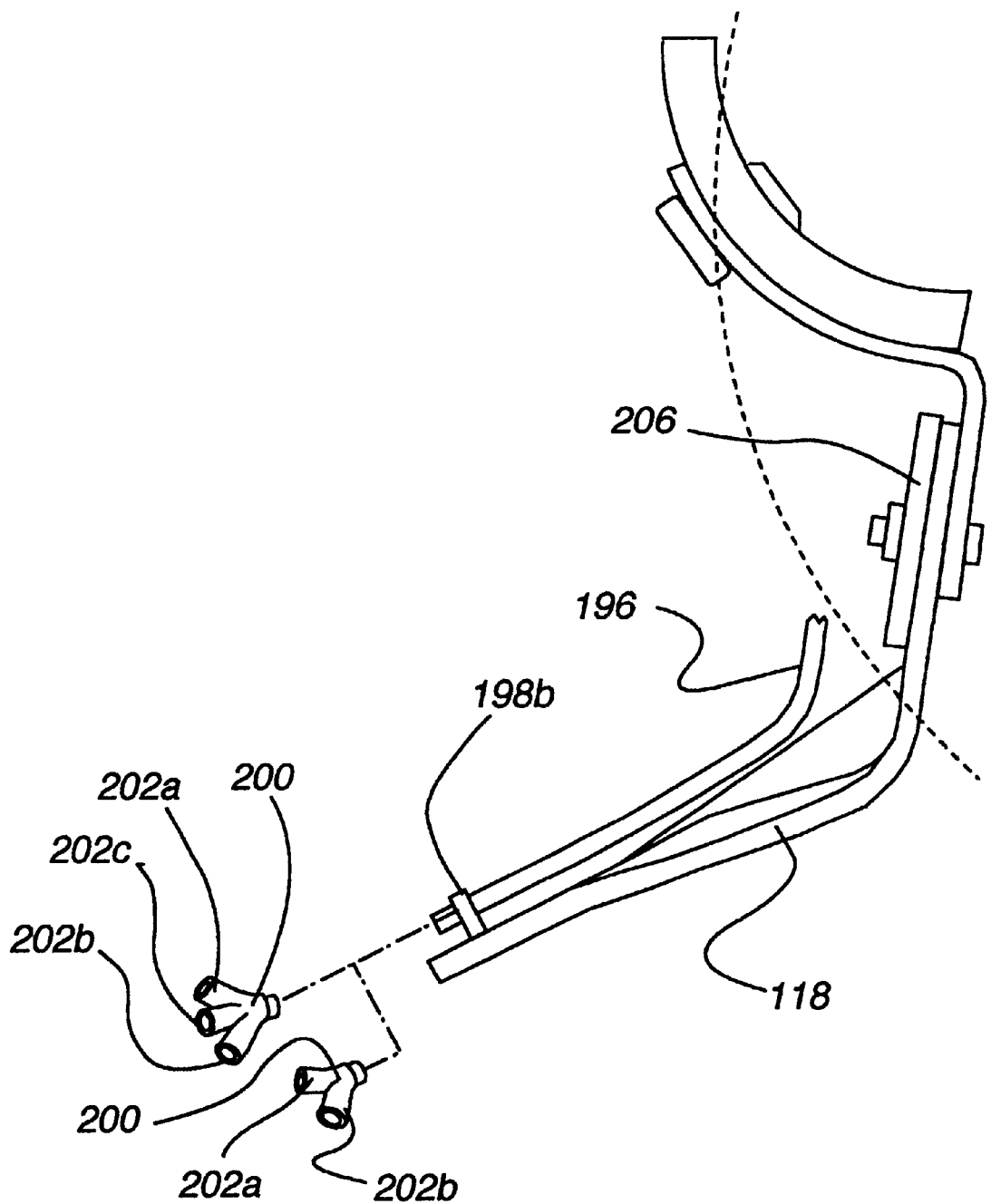
FIG. 38d illustrates a side view of a Tye™ double disc drill with one embodiment of an extension for reducing seed bounce attached therewith, the extension having an embodiment of the liquid distribution apparatus of the present invention coupled therewith.
Figure 38E:
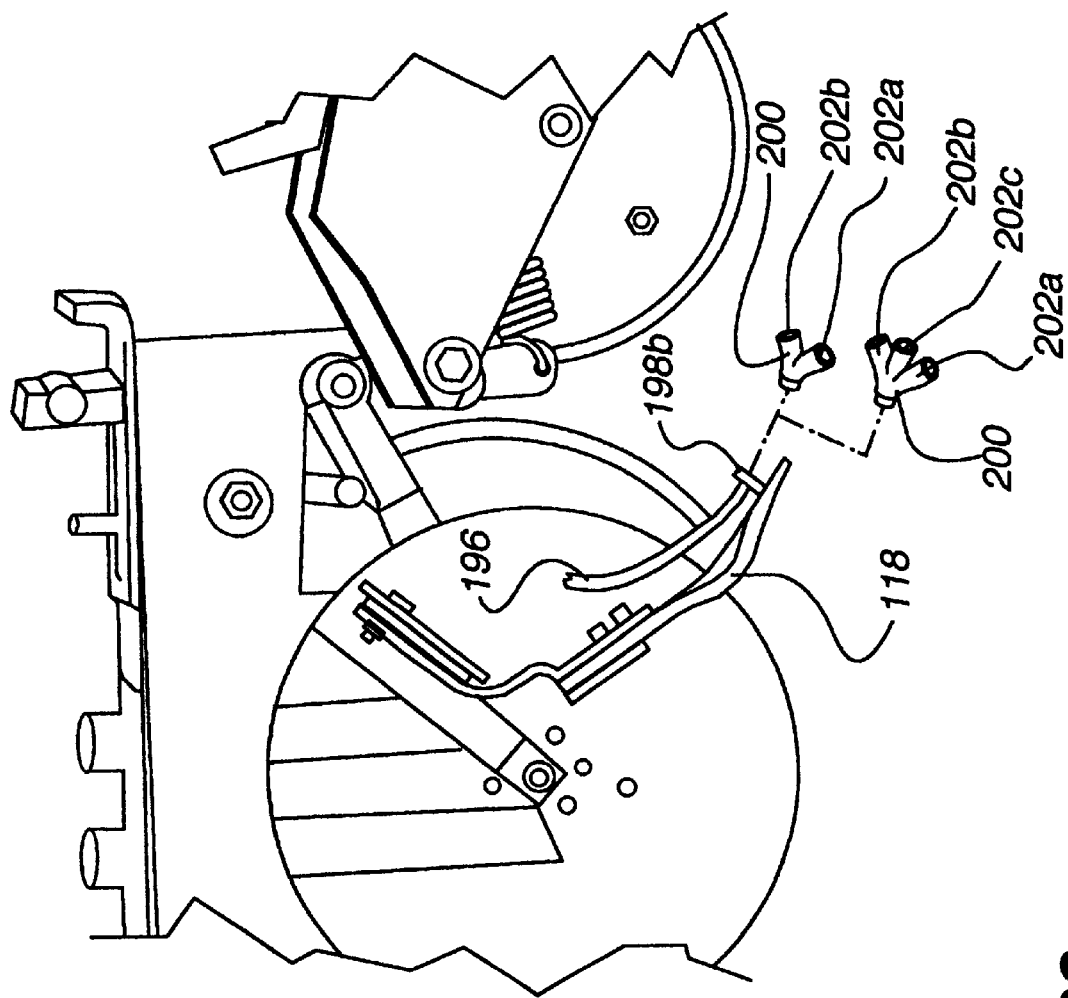
FIG. 38e illustrates a side view of a Tye™ soybean/rice double disc drill with one embodiment of an extension for reducing seed bounce attached therewith, the extension having an embodiment of the liquid distribution apparatus of the present invention coupled therewith.
Figure 38F:
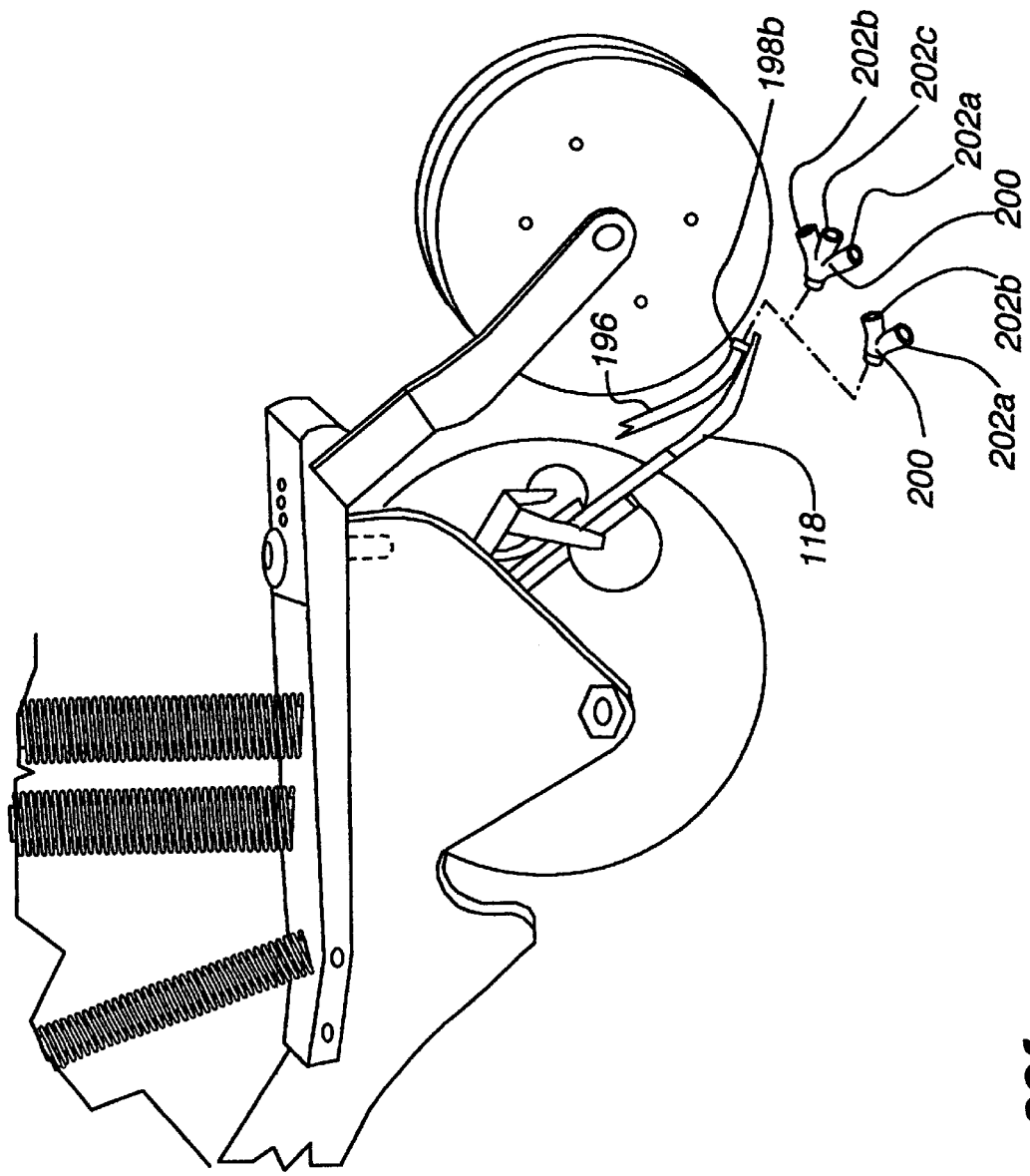
FIG. 38f illustrates a side view of a UFT™ double disc drill with one embodiment of an extension for reducing seed bounce attached therewith, the extension having an embodiment of the liquid distribution apparatus of the present invention coupled therewith.
Figure 38G:
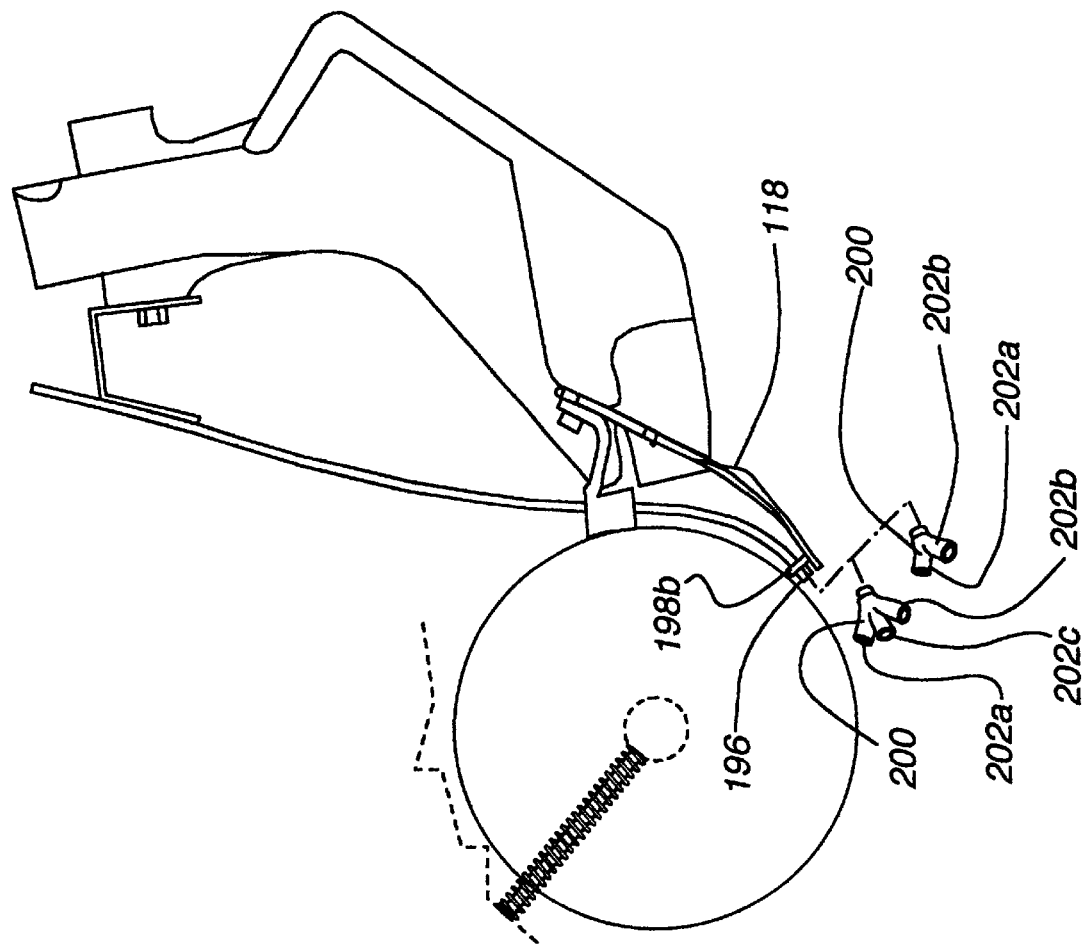
FIG. 38g illustrates a side view of a John Deere™ model 750 double disc drill with one embodiment of an extension for reducing seed bounce attached therewith, the extension having an embodiment of the liquid distribution apparatus of the present invention coupled therewith.
Figure 38H:
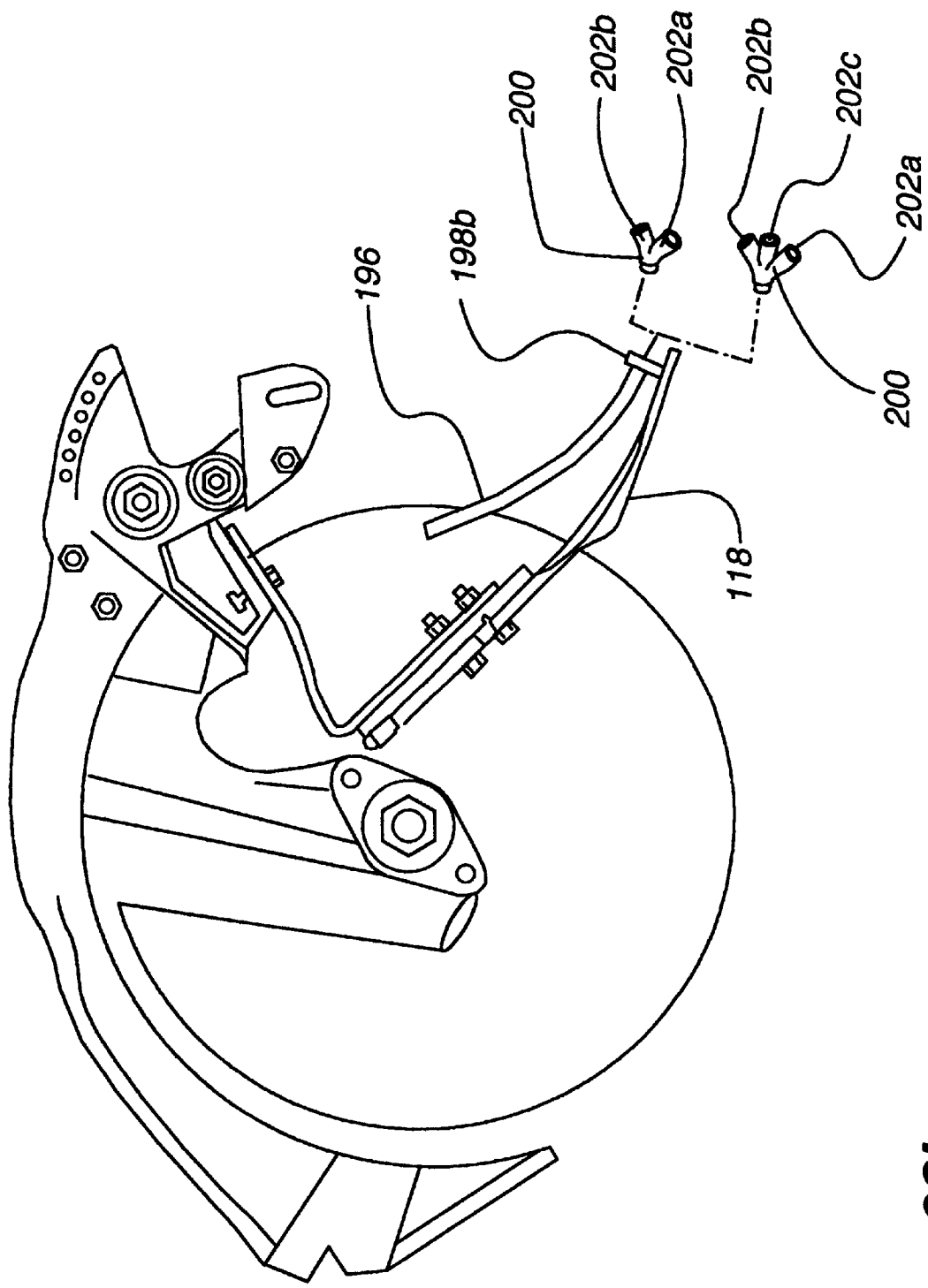
FIG. 38h illustrates a side view of a John Deere™ model 455, 515 or 8300 double disc drill having gauge wheels mounted along side the double disc openers with an embodiment of the liquid distribution apparatus of the present invention attached therewith.
Figure 38J:
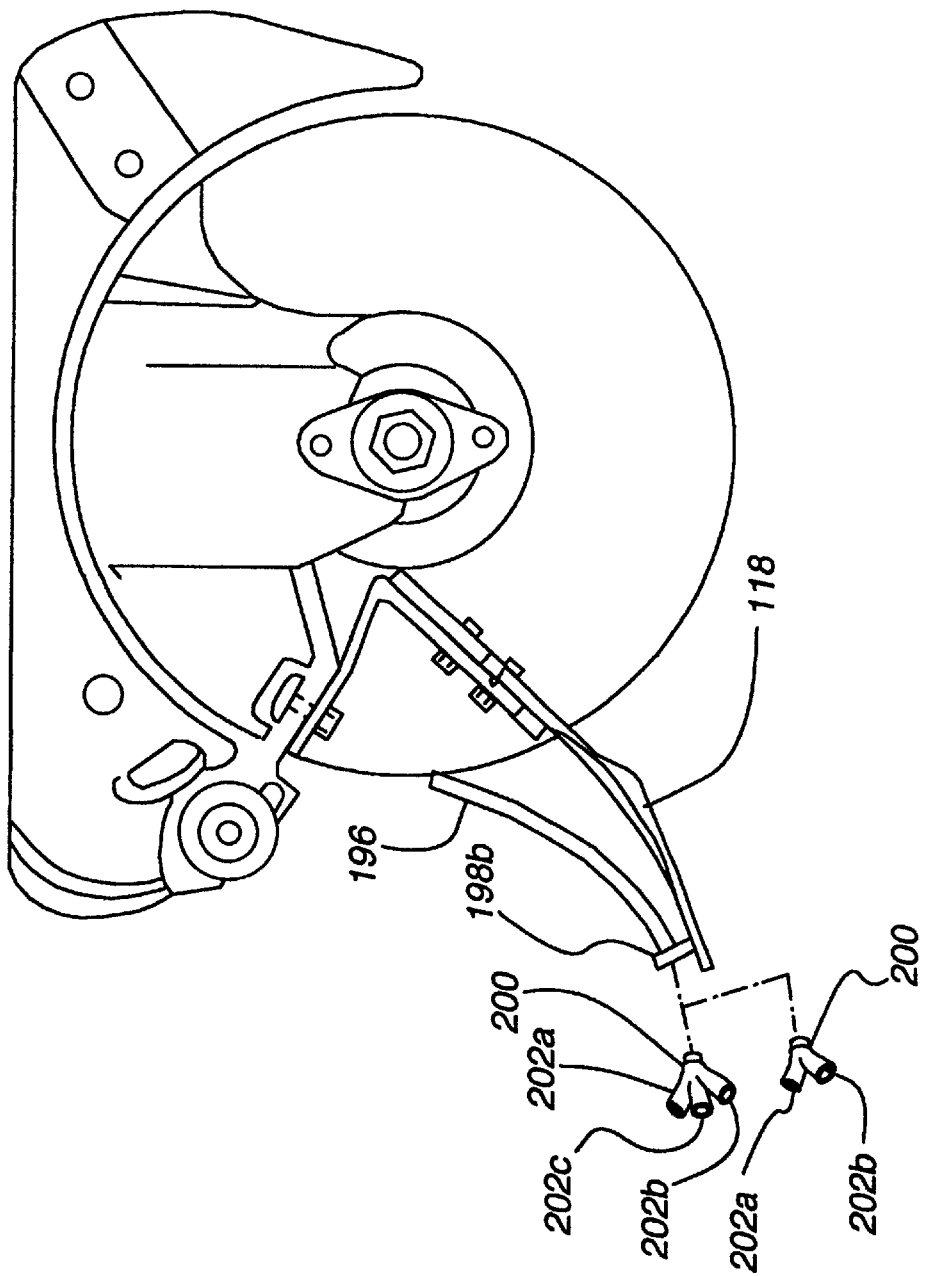
FIG. 38j illustrates a John Deere™ model 8300 double disc drill having a press wheel not attached to the drill, with an embodiment of the liquid distribution apparatus of the present invention attached therewith.
Figure 38K:
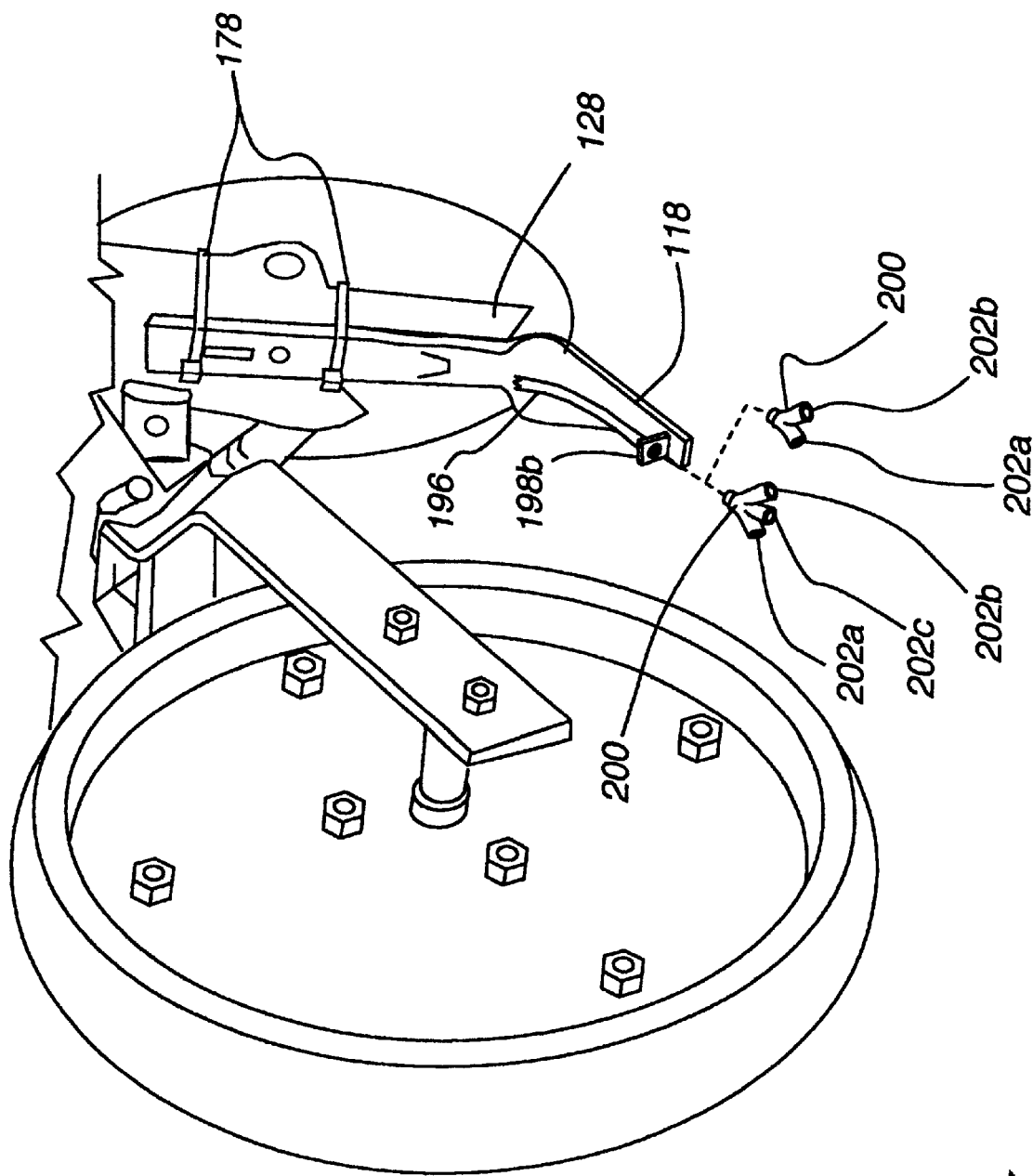
FIG. 38k illustrates a Marliss™ double disc drill with an embodiment of the liquid distribution apparatus of the present invention attached therewith.
Figure 38L:
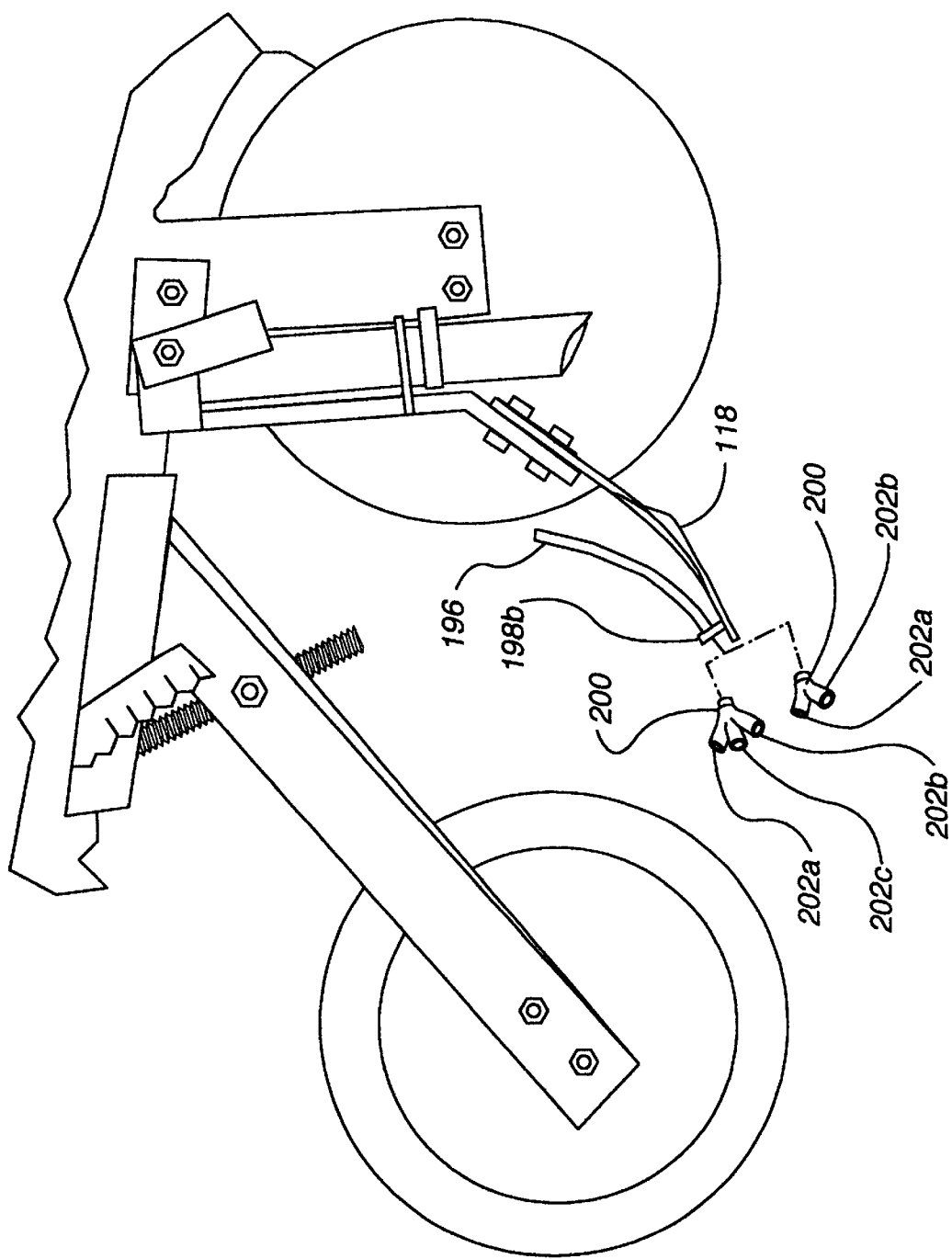
FIG. 38l illustrates a Best™ double disc drill with an embodiment of the liquid distribution apparatus of the present invention attached therewith.
Figure 38M:
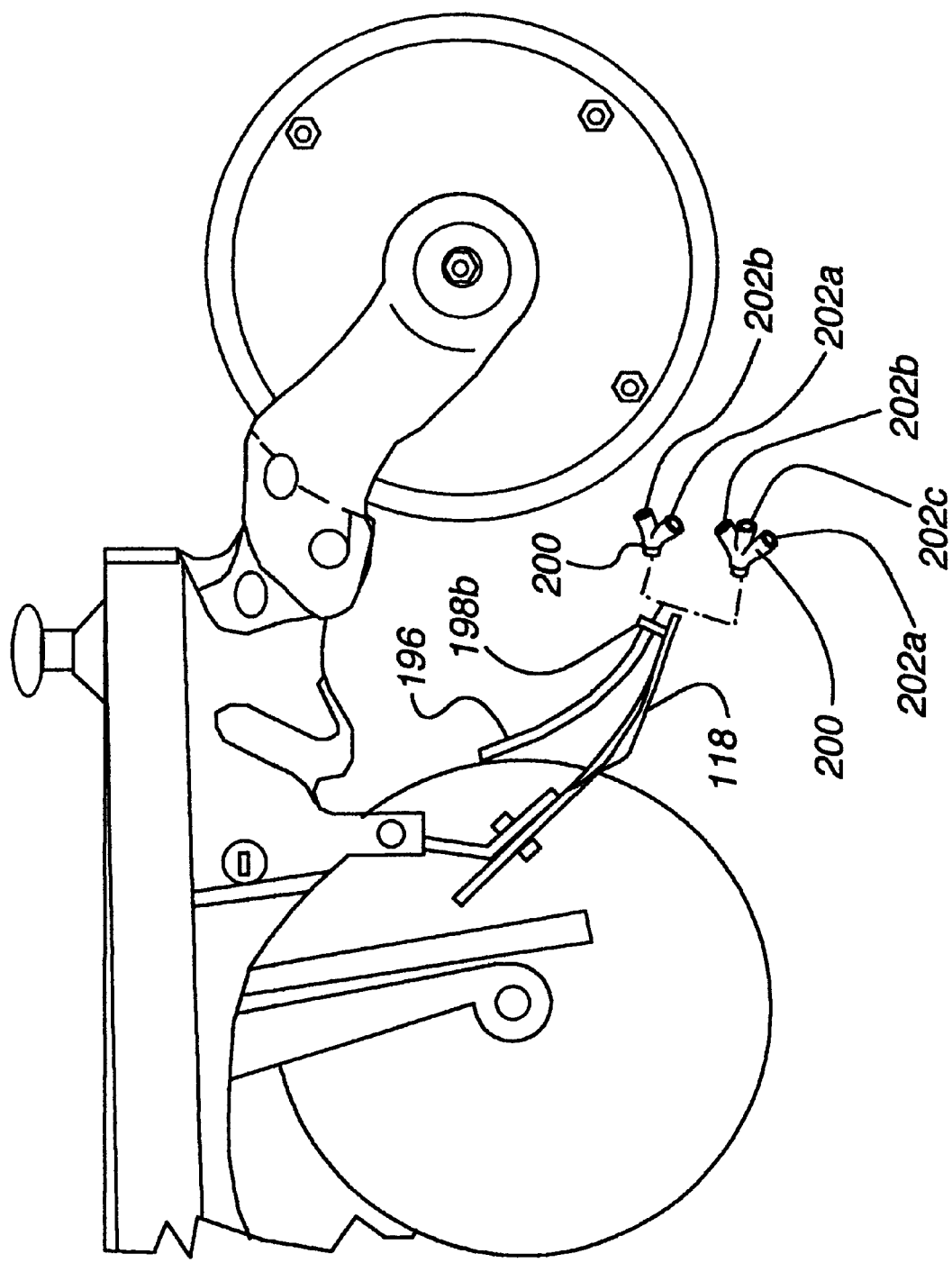
FIG. 38m illustrates a Great Plains™ double disc drill with an embodiment of the liquid distribution apparatus of the present invention attached therewith.
Figure 38N:
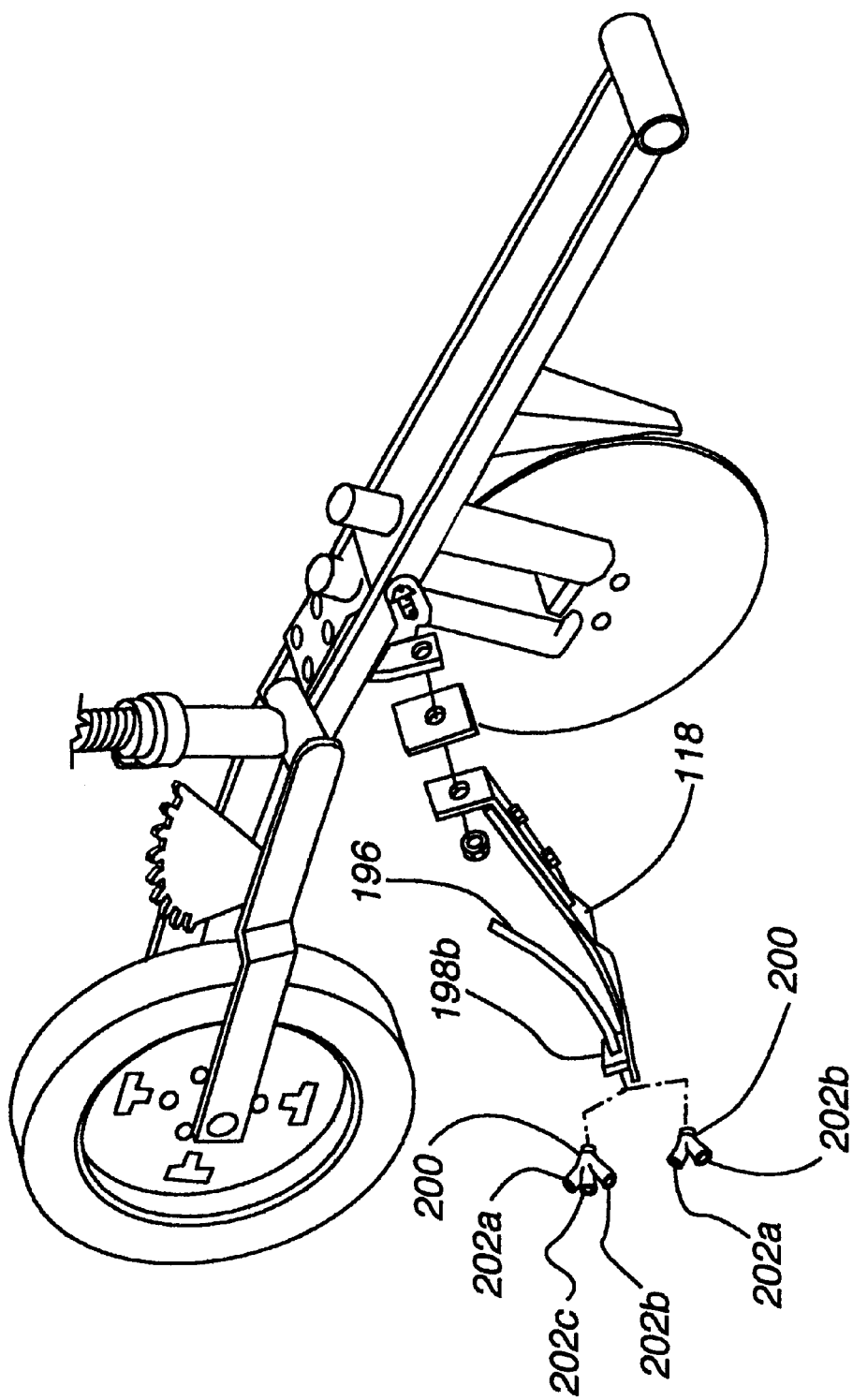
FIG. 38n illustrates a Crustbuster™ model 3400 or 3700 double disc drill with an embodiment of the liquid distribution apparatus of the present invention attached therewith.
Figure 38O:
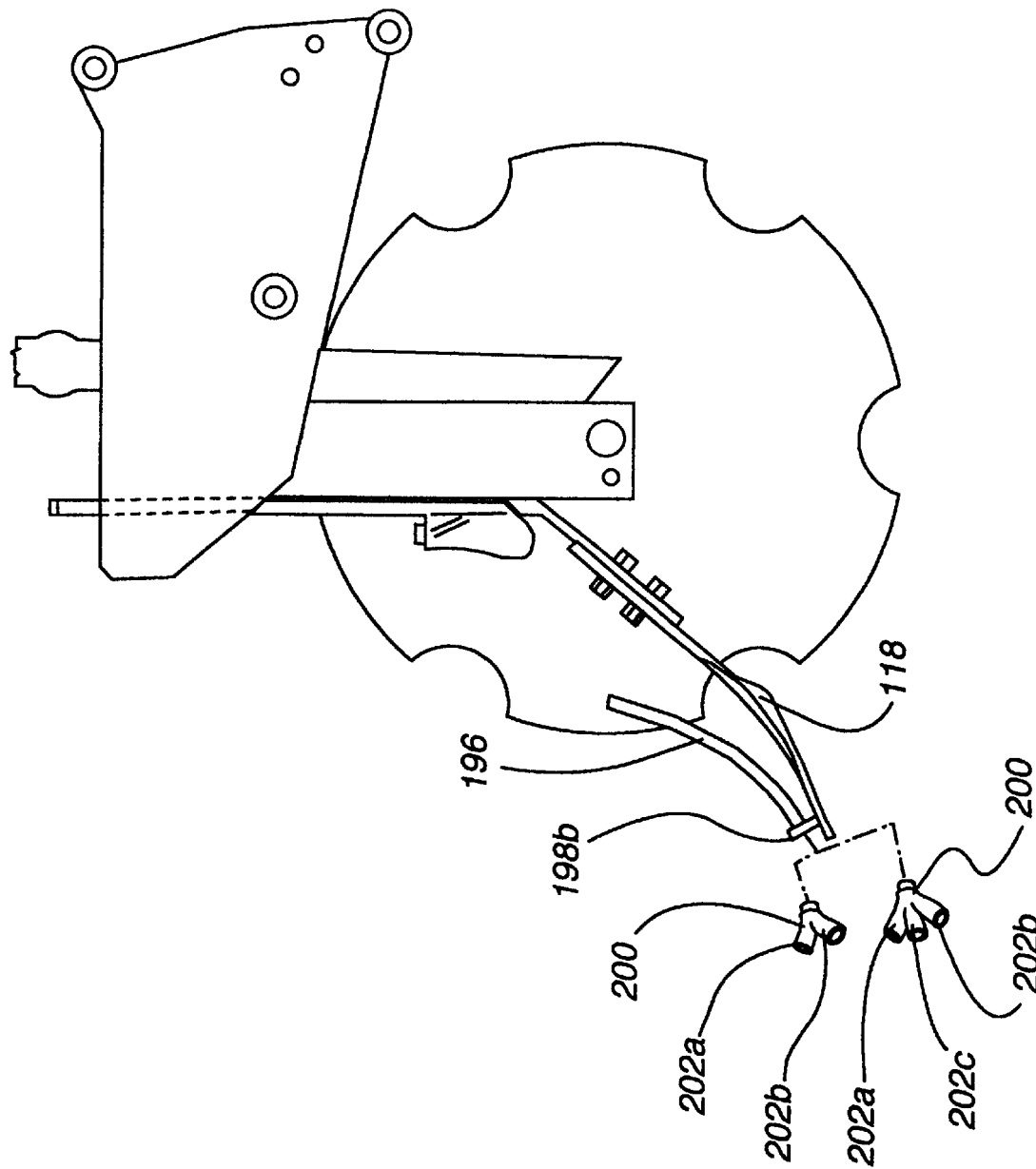
FIG. 38o illustrates a Crustbuster™ model 4000 double disc drill with an embodiment of the liquid distribution apparatus of the present invention attached therewith.
Figure 38P:
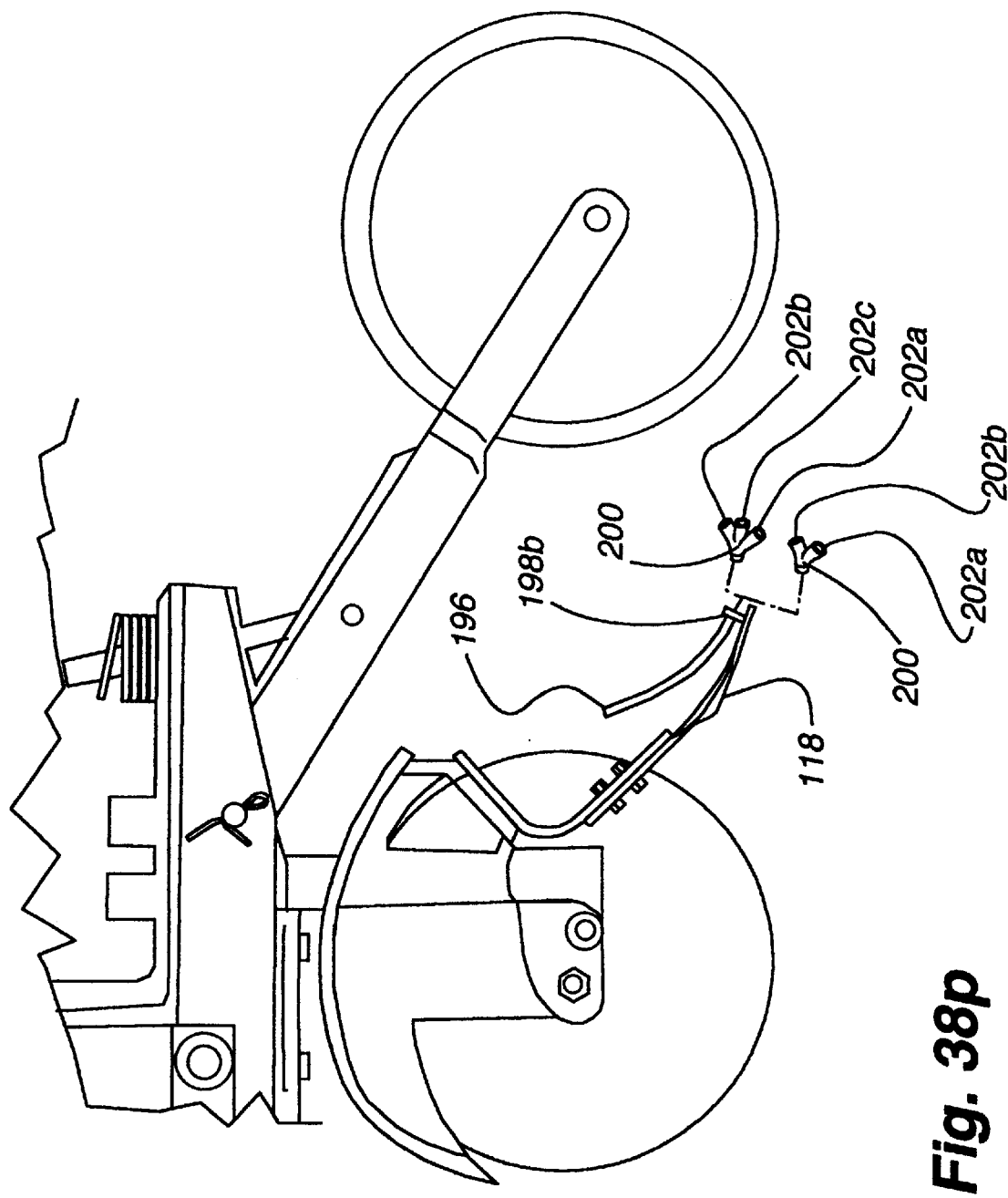
FIG. 38p illustrates a Haybuster™ double disc drill with an embodiment of the liquid distribution apparatus of the present invention attached therewith.
Figure 38Q:
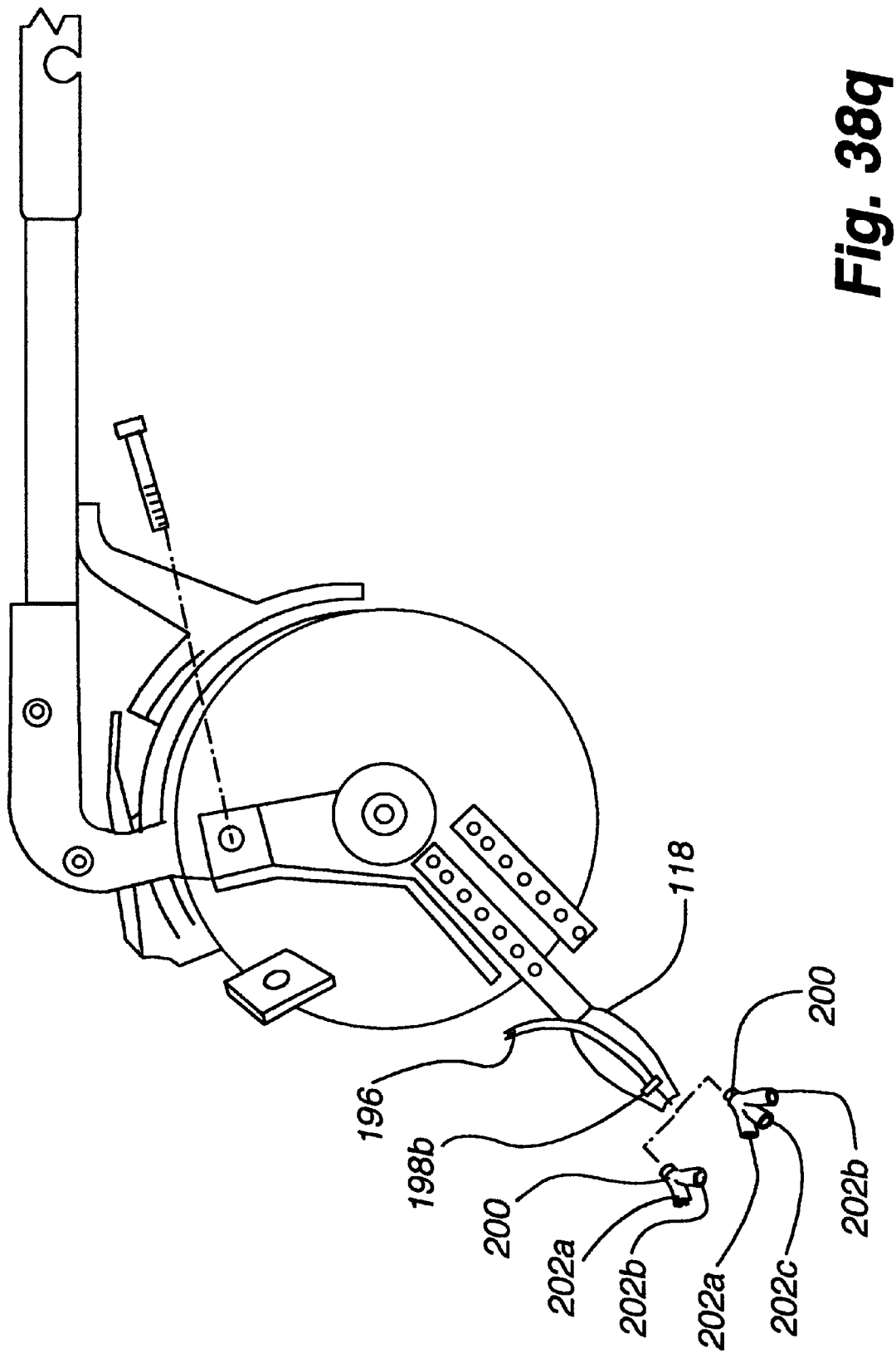
FIG. 38q illustrates a Case IH™ model 5100, 5300 or 5400 double disc drill with an embodiment of the liquid distribution apparatus of the present invention attached therewith.

Referring now to FIGS. 38a–38q various embodiments of the present invention are illustrated with various double disc drills. FIG. 38a illustrates a side view of a Krause™ model 5400 double disc drill with one embodiment of an extension for reducing seed bounce attached thereto. The extension, as shown in FIG. 38a, may have the two outlet or three outlet embodiment of the liquid distribution apparatus connected therewith. The liquid distribution apparatus being in fluid connection with the liquid supply hose. FIG. 38b illustrates a side view of a Krause™ model 5200, 5250 or 5500 double disc drill with one embodiment of an extension for reducing seed bounce attached thereto. The extension, as shown in FIG. 38b, may have the two outlet or three outlet embodiment of the liquid distribution apparatus connected therewith. The liquid distribution apparatus being in fluid connection with the liquid supply hose. FIG. 38c illustrates a side view of a Sunflower™ double disc drill with one embodiment of an extension for reducing seed bounce attached thereto. The extension, as shown in FIG. 38c, may have the two outlet or three outlet embodiment of the liquid distribution apparatus connected therewith. The liquid distribution apparatus being in fluid connection with the liquid supply hose. FIG. 38d illustrates a side view of a Tye™ double disc drill with one embodiment of an extension for reducing seed bounce attached therewith. The extension, as shown in FIG. 38d, may have the two outlet or three outlet embodiment of the liquid distribution apparatus connected therewith. The liquid distribution apparatus being in fluid connection with the liquid supply hose. FIG. 38e illustrates a side view of a Tye™ soybean/rice double disc drill with one embodiment of an extension for reducing seed bounce attached therewith. The extension, as shown in FIG. 38e, may have the two outlet or three outlet embodiment of the liquid distribution apparatus connected therewith. The liquid distribution apparatus being in fluid connection with the liquid supply hose.

FIG. 38f illustrates a side view of a UFT™ double disc drill with one embodiment of an extension for reducing seed bounce attached therewith. The extension, as shown in FIG. 38f, may have the two outlet or three outlet embodiment of the liquid distribution apparatus connected therewith. The liquid distribution apparatus being in fluid connection with the liquid supply hose. FIG. 38g illustrates a side view of a John Deere™ model 750 double disc drill with one embodiment of an extension for reducing seed bounce attached therewith. The extension, as shown in FIG. 38g, may have the two outlet or three outlet embodiment of the liquid distribution apparatus connected therewith. The liquid distribution apparatus being in fluid connection with the liquid supply hose. FIG. 38h illustrates a side view of a John Deere™ model 455, 515 or 8300 double disc drill having gauge wheels mounted along side the double disc openers with an embodiment of the liquid distribution apparatus of the present invention attached therewith. FIG. 38i illustrates a John Deere™ model 455, 515 or 8300 double disc drill having single or double press wheels with a two outlet or three outlet embodiment of the liquid distribution apparatus of the present invention attached therewith. FIG. 38j illustrates a John Deere™ model 8300 double disc drill having a press wheel not attached to the drill, with a two outlet or three outlet embodiment of the liquid distribution apparatus of the present invention attached therewith. FIG. 38k illustrates a Marliss™ double disc drill with a two outlet or three outlet embodiment of the liquid distribution apparatus of the present invention attached therewith. FIG. 38l illustrates a Best™ double disc drill with a two outlet or three outlet embodiment of the liquid distribution apparatus of the present invention attached therewith.

FIG. 38m illustrates a Great Plains™ double disc drill with a two outlet or three outlet embodiment of the liquid distribution apparatus of the present invention attached therewith. FIG. 38n illustrates a Crustbuster™ model 3400 or 3700 double disc drill with a two outlet or three outlet embodiment of the liquid distribution apparatus of the present invention attached therewith. FIG. 38o illustrates a Crustbuster™ model 4000 double disc drill with a two outlet or three outlet embodiment of the liquid distribution apparatus of the present invention attached therewith. FIG. 38p illustrates a Haybuster™ double disc drill with a two outlet or three outlet embodiment of the liquid distribution apparatus of the present invention attached therewith. FIG. 38q illustrates a Case IH™ model 5100, 5300 or 5400 double disc drill with a two outlet or three outlet embodiment of the liquid distribution apparatus of the present invention attached therewith. Additionally, a diverter may be used along with any of the embodiments shown in FIGS. 38a–38q.

I claim:

1. An extension for use with a furrow opener for properly placing seeds in a furrow, the furrow opener including a liquid supply hose for distributing liquid into the seed furrow, the seed furrow having a centrally located bottom portion and a first sidewall and a second sidewall, the sidewalls extending upwardly and outwardly from the centrally located bottom portion of the furrow, said extension comprising:

an elongate flexible body member defining a generally arcuate shape which provides a generally downwardly and rearwardly sweeping orientation, and also defining an upper and lower segment;

the upper segment attachable to the furrow opener;

the lower segment configured to depend downwardly and rearwardly from the furrow opener and extendible into the seed furrow, the lower segment having a lower surface having a downwardly convex shape, and the lower segment having a width dimension decreasing along its length;

the lower segment terminating at a trailing end, the trailing end configured to be spaced above the centrally located bottom portion of the seed furrow; and a liquid distribution apparatus connected with the extension, the liquid distribution apparatus including:

a supply channel adapted to fluidly connect with the liquid supply hose;

a distribution channel in fluid connection with the supply channel, the distribution channel including at least one outlet angularly oriented with respect to the supply channel; and whereby when the supply channel is fluidly connected with the liquid supply hose, the at least one outlet is oriented to distribute liquid on at least one of the sidewalls of the furrow.

2. The liquid distribution apparatus of claim 1, wherein the at least one outlet includes a first outlet and a second outlet, the first outlet oriented to distribute liquid on the first sidewall of the furrow, and the second outlet oriented to distribute liquid on the second sidewall of the furrow.

3. The liquid distribution apparatus of claim 1, wherein the at least one outlet includes a first tubular outlet and a second tubular outlet in a Y-shaped configuration with respect to the supply channel.

4. The liquid distribution apparatus of claim 1, wherein the at least one outlet includes a first outlet, a second outlet angularly oriented with respect to the first outlet, and a third outlet angularly oriented with respect to the first outlet, wherein the first outlet is oriented to distribute liquid on the first sidewall, the second outlet is oriented to distribute liquid on the second sidewall, and the third outlet is oriented to distribute liquid in the centrally located bottom portion of the furrow.

5. The liquid distribution apparatus of claim 4, wherein the at least one outlet includes a first tubular outlet, a second tubular outlet, and a third tubular outlet, in a ψ-shaped configuration with respect to the supply channel.

6. The liquid distribution apparatus of claim 4 including at least one plug coupled with the liquid distribution apparatus, the at least one plug for regulating the flow of liquid from the at least one outlet.

7. The liquid distribution apparatus of claim 6, wherein the at least one plug is retained in the at least one outlet, the plug moveable between a position allowing liquid to flow from the outlet and a position prohibiting the flow of liquid from the outlet.

8. The liquid distribution apparatus of claim 1, wherein the supply channel is a tubular structure including a ribbed portion adapted to fluidly engage the liquid supply tube.

9. The liquid distribution apparatus of claim 1, wherein the extension includes a first eyelet and a second eyelet, the liquid supply hose extending through the first eyelet and the liquid distribution apparatus extending through the second eyelet.

10. The liquid distribution apparatus of claim 9, the first eyelet being attached with the upper segment of the extension and the second eyelet being attached with the lower segment of the extension.

11. The liquid distribution apparatus of claim 1, wherein the liquid distribution apparatus is connected with the extension with at least one tie strap.

12. The liquid distribution apparatus of claim 1 wherein the at least one outlet is oriented to distribute liquid on at least one of the sidewalls of the said seed furrow at least ½" above the bottom portion of the seed furrow.

13. The liquid distribution apparatus of claim 1 wherein the at least one outlet is oriented to distribute liquid on at least one of the sidewalls of the seed furrow from about ½" to about ¾" above the bottom portion of the furrow.

14. A liquid distribution apparatus for use with a planter having a liquid supply hose for distributing a liquid into a furrow, the furrow having a centrally located bottom portion and a first sidewall and a second sidewall, the sidewalls extending upwardly and outwardly from the centrally located bottom portion of the furrow, the liquid distribution apparatus comprising:
   a supply channel adapted to fluidly connect with the liquid supply hose;
   a distribution channel in fluid connection with the supply channel, the distribution channel including a first outlet and a second outlet, the first outlet oriented to distribute liquid on the first sidewall of the furrow, and the second outlet oriented to distribute fluid on the opposing second sidewall of the furrow, wherein the first outlet and the second outlet are oriented to distribute the liquid on the sidewalls of the furrow more than about ½" above the centrally located bottom portion of the furrow.

15. The liquid distribution apparatus of claim 14, wherein the supply channel is a tubular structure including a ribbed portion adapted to fluidly engage the liquid supply hose.

16. The liquid distribution apparatus of claim 14, wherein the first outlet and the second outlet are oriented to distribute the liquid on the sidewalls of the furrow from about ½" to about ¾" above the centrally located bottom portion of the furrow.

17. The liquid distribution apparatus of claim 14 wherein the planter further includes a double disk opener and a furrow closer wheel, the liquid distribution apparatus being attached with the planter between the double disk opener and the furrow closer.

18. The liquid distribution apparatus of claim 14, the first outlet being tubular and the second outlet being tubular.

19. The liquid distribution apparatus of claim 18 wherein the first tubular outlet and the second tubular outlet define a Y-shaped configuration with respect to the supply channel.

20. The liquid distribution of claim 19, wherein the first tubular outlet is about ⅛" in diameter and the second tubular outlet is about ⅛" in diameter.

21. A liquid distribution apparatus for use with a planter having a liquid supply hose for distributing a liquid into a furrow, the furrow having a centrally located bottom portion and a first sidewall and a second sidewall, the sidewalls extending upwardly and outwardly from the centrally located bottom portion of the furrow, the liquid distribution apparatus comprising:
   a supply channel adapted to fluidly connect with the liquid supply hose;
   a distribution channel in fluid connection with the supply channel, the distribution channel including a first outlet and a second outlet, the first outlet oriented to distribute liquid on the first sidewall of the furrow, and the second outlet oriented to distribute fluid on the opposing second sidewall of the furrow, wherein the first outlet and the second outlet are at least about ⅛" in diameter.

22. The liquid distribution apparatus of claim 21 wherein the at least one outlet is oriented to distribute liquid on at least one of the sidewalls of the said seed furrow at least ½" above the bottom portion of the seed furrow.

23. The liquid distribution apparatus of claim 21, wherein the first outlet and the second outlet are oriented to distribute the liquid on the sidewalls of the furrow from about ½" to about ¾" above the centrally located bottom portion of the furrow.

24. The liquid distribution apparatus of claim 21, the first outlet being tubular and the second outlet being tubular.

25. The liquid distribution apparatus of claim 24 wherein the first tubular outlet and the second tubular outlet define a Y-shaped configuration with respect to the supply channel.

26. A liquid distribution apparatus for use with a planter having a liquid supply hose for distributing a liquid into a furrow, the furrow having a centrally located bottom portion and a first sidewall and a second sidewall, the sidewalls extending upwardly and outwardly from the centrally located bottom portion of the furrow, the liquid distribution apparatus comprising:
   a Y-shaped tube in fluid connection with the liquid supply hose for distributing liquid on the opposing sidewalls of the furrow:
   the Y-shaped tube including a first outlet adapted to distribute liquid on the first sidewall above the centrally located bottom portion of the furrow; and
   the Y-shaped tube having a second outlet adapted to distribute liquid on the second sidewall above the centrally located bottom portion of the furrow.

27. A seed placement apparatus having an integrated liquid distribution apparatus, the seed placement apparatus for use with a planter having a seed tube and a liquid supply hose for supplying a liquid to a furrow having a centrally located bottom portion and a first sidewall and a second sidewall, the sidewalls extending upwardly and outwardly from the centrally located bottom portion of the furrow, the seed placement apparatus comprising:

an extension defining a supply channel in fluid connection with a distribution channel, the supply channel adapted to fluidly connect with the liquid supply hose, and the distribution channel including at least one outlet oriented to distribute liquid on said sidewall of said furrow;

the extension defining an elongate flexible body member which provides a generally downwardly and rearwardly sweeping orientation, and also defining an upper and lower segment;

the upper segment attachable to the planter; and the lower segment configured to depend downwardly and rearwardly from the planter and extendible into the seed furrow, the lower segment terminating at a trailing end.

28. The seed placement apparatus of claim 27 wherein the trailing end is configured to be spaced above the centrally located bottom portion of the furrow.

29. The seed placement apparatus of claim 27 wherein the trailing end is configured to contact the bottom portion of the furrow.

30. The seed placement apparatus of claim 27 wherein the at least one outlet includes a first outlet oriented to distribute liquid on the first sidewall of the furrow, and a second outlet oriented to distribute liquid on the second sidewall of the furrow.

31. The seed placement of claim 27, wherein the at least one outlet includes:

a first outlet oriented to distribute liquid on the first sidewall of the furrow;

a second outlet oriented to distribute liquid on the second sidewall of the furrow; and a third outlet oriented to distribute liquid in the centrally located bottom portion of the furrow.

32. The seed placement apparatus of claim 28, wherein the extension is connected with the seed tube and extends rearwardly therefrom.

33. The seed placement apparatus of claim 28, wherein the extension further defines an upper segment and a lower segment, wherein the upper segment is attachable to the seed tube, and wherein the lower segment is configured to depend downwardly and rearwardly from the seed tube and extendible into the furrow, the lower segment having a lower surface having a downwardly convex shape, and the lower segment having a width dimension decreasing along its length, the width dimension substantially equal to but less than a decreasing width of the furrow as the lower segment extends into the furrow, and wherein the lower segment terminates at a trailing end, the trailing end configured to be spaced above the centrally located bottom portion of the furrow.

34. A liquid distribution apparatus for use with a planter having a liquid supply hose for distributing a liquid into a furrow, said furrow having a centrally located bottom portion and a first sidewall and a second sidewall, the sidewalls extending upwardly and outwardly from the centrally located bottom portion, the liquid distribution apparatus comprising:

a supply channel for receiving the liquid;

a distribution channel in fluid connection with the supply channel, the distribution channel including:

a first outlet oriented to distribute liquid on the first sidewall of the furrow;

a second outlet oriented to distribute liquid on the second sidewall of the furrow; and a third outlet third outlet oriented to distribute liquid in the centrally located bottom portion of the furrow.

35. The liquid distribution apparatus of claim 34, the first outlet being tubular, the second outlet being tubular, and the third outlet being tubular.

36. The liquid distribution apparatus of claim 34, wherein the first tubular outlet, the second outlet, and the third outlet are in a ψ-shaped configuration with respect to the supply channel.

37. The liquid distribution apparatus of claim 34, wherein the supply channel is a tubular structure including a ribbed portion adapted to fluidly engage the liquid supply hose.

38. The liquid distribution apparatus of claim 34 including at least one plug coupled with the liquid distribution apparatus, the at least one plug for regulating the flow of liquid from the at least one outlet.

39. The liquid distribution apparatus of claim 34, wherein the at least one plug is retained in the at least one outlet, the plug moveable between a position allowing liquid to flow from the outlet and a position prohibiting the flow of liquid from the outlet.

40. In combination with a seed embedding device for use in a seed planter having a seed delivery device and a liquid supply, the seed embedding device including an arm arranged to engage the ground in the furrow and being adapted to firmly embed dispensed seeds into the ground in the furrow, and a liquid passage disposed on said arm and having an inlet in fluid communication with the liquid supply and an outlet, the seed delivery device adapted to create a furrow in the ground and dispense seeds into the furrow, the improvement comprising:

a liquid distribution apparatus attached with the arm, the liquid distribution apparatus including:

a supply channel in fluid communication with the outlet;

a distribution channel in fluid connection with the supply channel, the distribution channel including a first outlet oriented to distribute liquid on the first sidewall of the furrow, a second outlet oriented to distribute liquid on the second sidewall of the furrow, and a third outlet oriented to distribute liquid in the centrally located bottom portion of the furrow.

41. The liquid distribution apparatus of claim 40, the first outlet being tubular, the second outlet being tubular, and the third outlet being tubular.

42. The liquid distribution apparatus of claim 40, wherein the first tubular outlet, the second outlet, and the third outlet are in a ψ-shaped configuration with respect to the supply channel.

43. The liquid distribution apparatus of claim 40, wherein the supply channel is a tubular structure including a ribbed portion adapted to fluidly engage the liquid supply hose.

44. The liquid distribution apparatus of claim 40 including at least one plug coupled with the liquid distribution apparatus, the at least one plug for regulating the flow of liquid from the at least one outlet.

45. The liquid distribution apparatus of claim 40, wherein the at least one plug is retained in the at least one outlet, the plug moveable between a position allowing liquid to flow from the outlet and a position prohibiting the flow of liquid from the outlet.

46. An extension having a liquid distribution apparatus, the extension for use with a furrow opener for properly placing seeds in a furrow and distributing liquid within the furrow, the furrow opener including a liquid supply tube, the seed furrow having a centrally located bottom portion and upwardly and outwardly extending sidewalls defining a maximum width dimension, and the sidewalls intersecting at a vertex in the bottom portion of the furrow and defining a minimum width dimension, such that the seed furrow has a decreasing width, said extension comprising:

means for reducing seed bounce; and means for distributing liquid in a furrow said means having two outlets.

47. The extension of claim 46 further including means for attaching the means for reducing seed bounce to the furrow opener.

48. An extension having a liquid distribution apparatus, the extension for use with a furrow opener for properly placing seeds in a furrow and distributing liquid within the furrow, the furrow opener including a liquid supply tube, the seed furrow having a centrally located bottom portion and upwardly and outwardly extending sidewalls defining a maximum width dimension, and the sidewalls intersecting at a vertex in the bottom portion of the furrow and defining a minimum width dimension, such that the seed furrow has a decreasing width, said extension comprising:

means for reducing seed bounce; and means for distributing liquid in a furrow, said means having three outlets.

49. The extension of claim 48 further including means for attaching the means for reducing seed bounce to the furrow opener.

* * * * *